US008520673B2

(12) United States Patent
Chen et al.

(10) Patent No.: US 8,520,673 B2
(45) Date of Patent: Aug. 27, 2013

(54) METHOD AND COMMUNICATION DEVICE FOR ROUTING UNICAST AND MULTICAST MESSAGES IN AN AD-HOC WIRELESS NETWORK

(75) Inventors: Wai Chen, Parsippany, NJ (US);
Taek-Jin Kwon, Morganville, NJ (US);
Toshiro Hikita, Fort Lee, NJ (US);
Ryokichi Onishi, Jersey City, NJ (US);
John Lee, Howell, NJ (US)

(73) Assignees: Telcordia Technologies, Inc., Piscataway, NJ (US); Toyota Infotechnology Center, U.S.A., Inc., Palo Alto, CA (US)

( * ) Notice: Subject to any disclaimer, the term of this patent is extended or adjusted under 35 U.S.C. 154(b) by 1843 days.

(21) Appl. No.: 11/585,047

(22) Filed: Oct. 23, 2006

(65) Prior Publication Data

US 2008/0095163 A1 Apr. 24, 2008

(51) Int. Cl.
*H04L 12/28* (2006.01)

(52) U.S. Cl.
USPC ............................................ 370/390; 370/312

(58) Field of Classification Search
USPC ................. 370/392, 229, 328, 352, 389, 474, 370/390, 432, 312; 709/241
See application file for complete search history.

(56) References Cited

U.S. PATENT DOCUMENTS

| | | | | | |
|---|---|---|---|---|---|
| 4,627,045 | A | * | 12/1986 | Olson et al. | 370/225 |
| 4,949,248 | A | * | 8/1990 | Caro | 709/203 |
| 5,613,206 | A | * | 3/1997 | Bantz et al. | 455/450 |
| 5,883,884 | A | * | 3/1999 | Atkinson | 370/279 |
| 6,754,188 | B1 | * | 6/2004 | Garahi et al. | 370/328 |
| 2002/0122410 | A1 | * | 9/2002 | Kulikov et al. | 370/349 |
| 2002/0126671 | A1 | * | 9/2002 | Ellis et al. | 370/390 |
| 2003/0125067 | A1 | * | 7/2003 | Takeda et al. | 455/522 |
| 2003/0204623 | A1 | * | 10/2003 | Cain | 709/241 |
| 2004/0013115 | A1 | * | 1/2004 | Su et al. | 370/392 |
| 2004/0018841 | A1 | * | 1/2004 | Trossen | 455/436 |
| 2004/0078485 | A1 | * | 4/2004 | Narayanan | 709/242 |
| 2004/0183726 | A1 | * | 9/2004 | Theobold | 343/700 MS |
| 2005/0078672 | A1 | * | 4/2005 | Caliskan et al. | 370/389 |
| 2006/0029074 | A2 | * | 2/2006 | Bauer | 370/390 |
| 2006/0056456 | A1 | * | 3/2006 | Ratiu et al. | 370/474 |

(Continued)

OTHER PUBLICATIONS

Wai Chen, Shengwei Cai DAd Hoc Peer-to-Perr Network Architecture for Vehicle Safety Communications Apr. 2005 IEEE Communications Magazine pp. 100-107.*

(Continued)

*Primary Examiner* — Dang Ton
*Assistant Examiner* — Mandish Randhawa
(74) *Attorney, Agent, or Firm* — Philip J. Feig

(57) ABSTRACT

A method and communication device for routing unicast and multicast messages. The method for routing a unicast message includes receiving a first control packet including routing parameters from a group header node, updating a routing table based upon the routing parameters, receiving a second control packet including additional routing parameters from a group node, updating the routing table based upon the additional routing parameters and generating a forwarding table from the routing table when both of the updated steps are completed. The unicast message is routed based upon the forwarding table. A method for routing a multicast message comprises receiving the multicast message, determining if a multicast group destination for the multicast message is in a multicast forwarding table (MFT), determining if the multicast message has been previously forwarded and forwarding the multicast message if the message was not previously forwarded and the multicast group destination is in the MFT.

3 Claims, 50 Drawing Sheets

(56) References Cited

U.S. PATENT DOCUMENTS

| | | | |
|---|---|---|---|
| 2006/0120396 A1* | 6/2006 | Hasegawa et al. | 370/432 |
| 2006/0245428 A1* | 11/2006 | Yanamoto et al. | 370/394 |
| 2006/0264182 A1* | 11/2006 | Morioka | 455/78 |
| 2006/0288094 A1* | 12/2006 | Asplund | 709/223 |
| 2007/0083410 A1* | 4/2007 | Hanna | 705/8 |
| 2007/0165633 A1* | 7/2007 | Ikegami et al. | 370/390 |
| 2007/0184859 A1* | 8/2007 | Kraft et al. | 455/466 |
| 2007/0274215 A1* | 11/2007 | Gusat et al. | 370/235 |
| 2007/0286093 A1* | 12/2007 | Cai et al. | 370/254 |
| 2009/0201844 A1* | 8/2009 | Bhatti et al. | 370/312 |
| 2009/0305712 A1* | 12/2009 | Franceschini et al. | 455/450 |

OTHER PUBLICATIONS

Tseng Y., Chao C., Wu S., Sheu J., Dynamic channel allocation with location awareness for multi-hop mobile ad hoc networks, Computer Communications, vol. 25, No. 7, May 1, 2002, pp. 676-688.*

Clausen et al., Optimized Link State Routing Protocol (OLSR), Oct. 2003.*

* cited by examiner

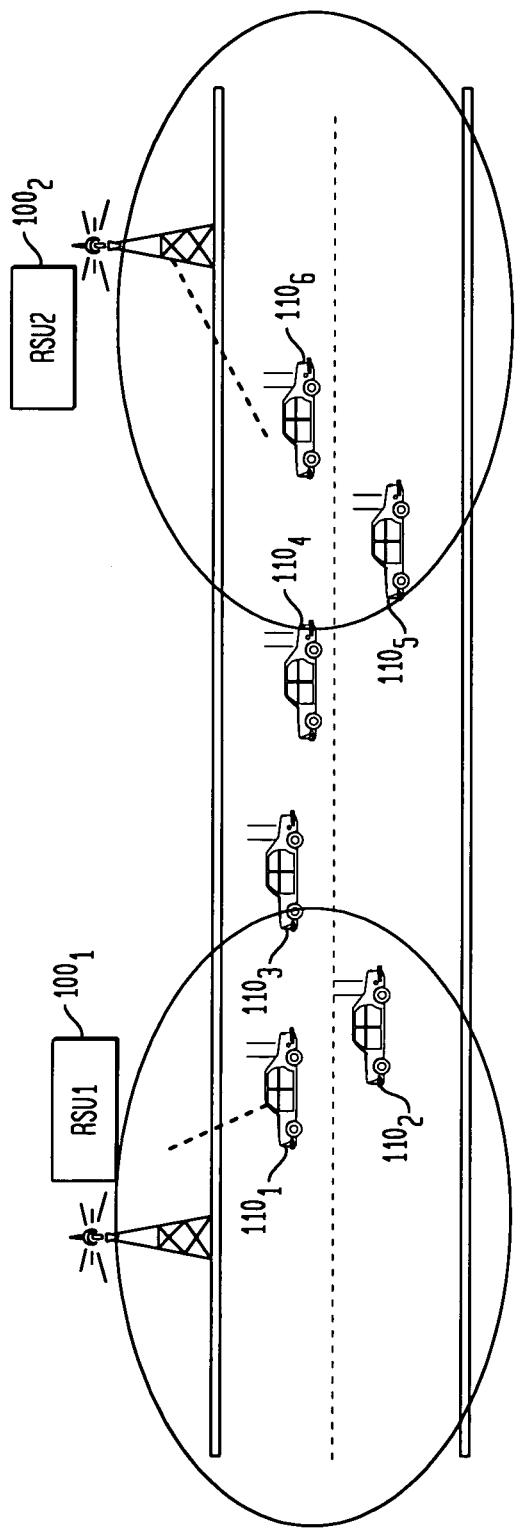

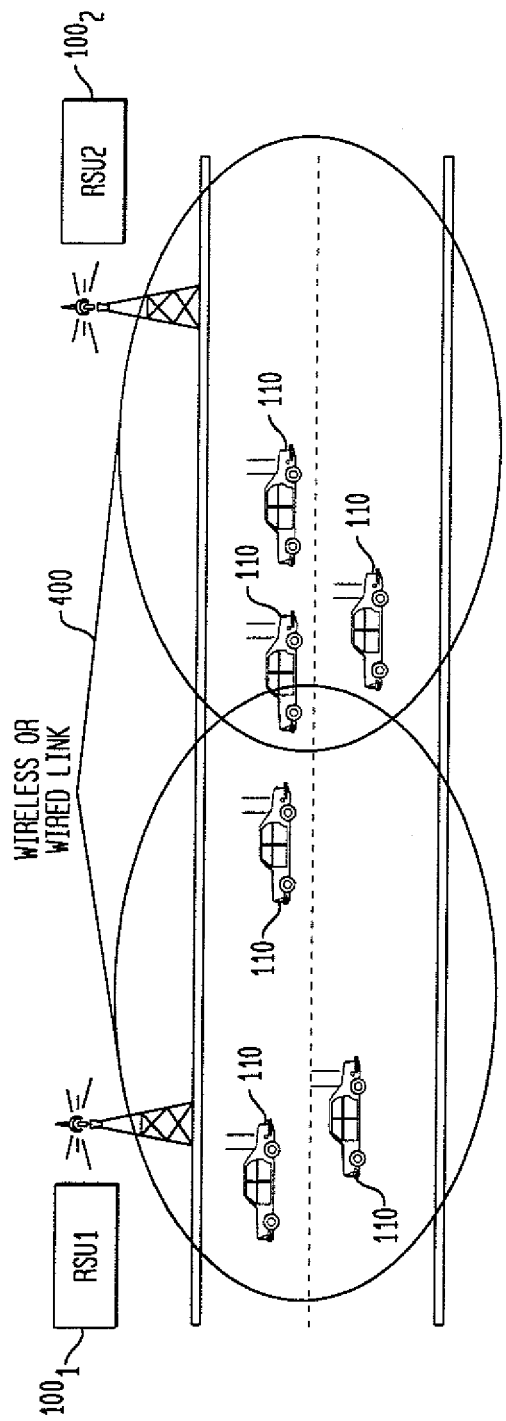

FIG. 28

| GID | GROUP HEADER ID (IPv6 ADDRESS) | | | | | | | |
|---|---|---|---|---|---|---|---|---|
| | SEQ. NO | NODE ID (IPv6 ADDRESS) | | | | | | |
| | NEXT-HOP RELAY ID (IPv6 ADDRESS) | | | | | | | |
| | ToMR | HC$_{GH}$ | CLASSIFICATION | | | | | |
| | LIST OF MULTICAST GROUPS | | | | | | | |
| | ACCUMULATED MEMBER LIST (OPTIONAL) | | | | | | | |
| | ADDITIONAL INFORMATION (OPTIONAL) | | | | | | | |

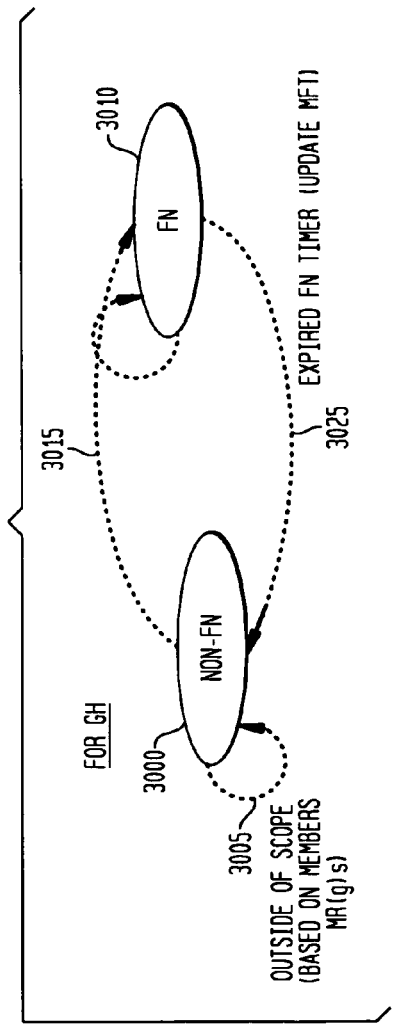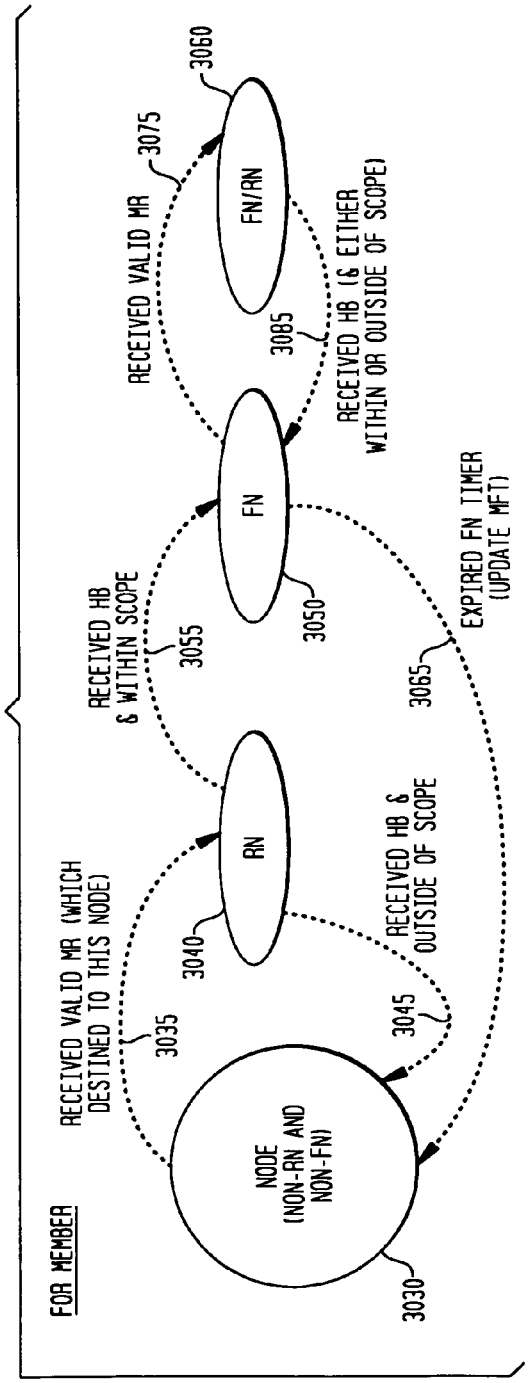

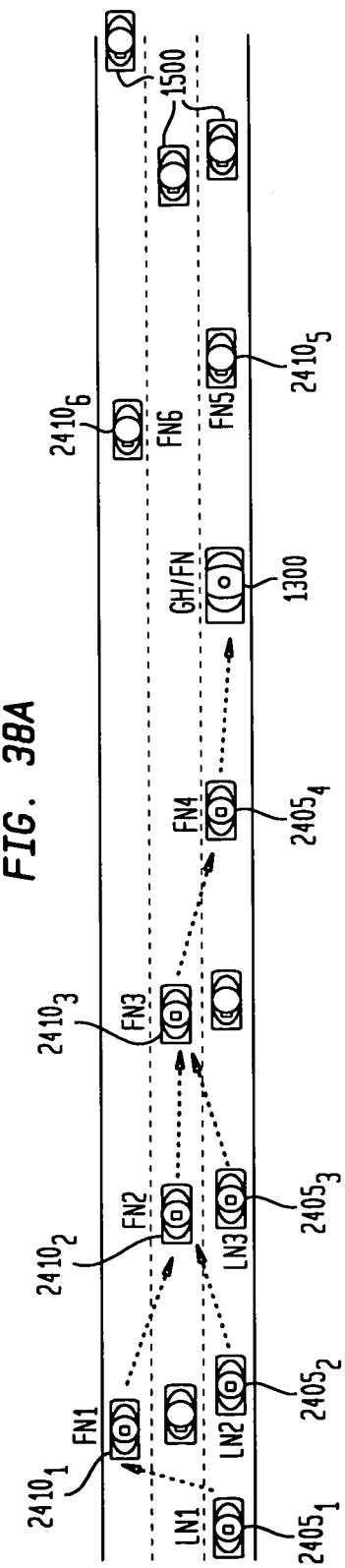
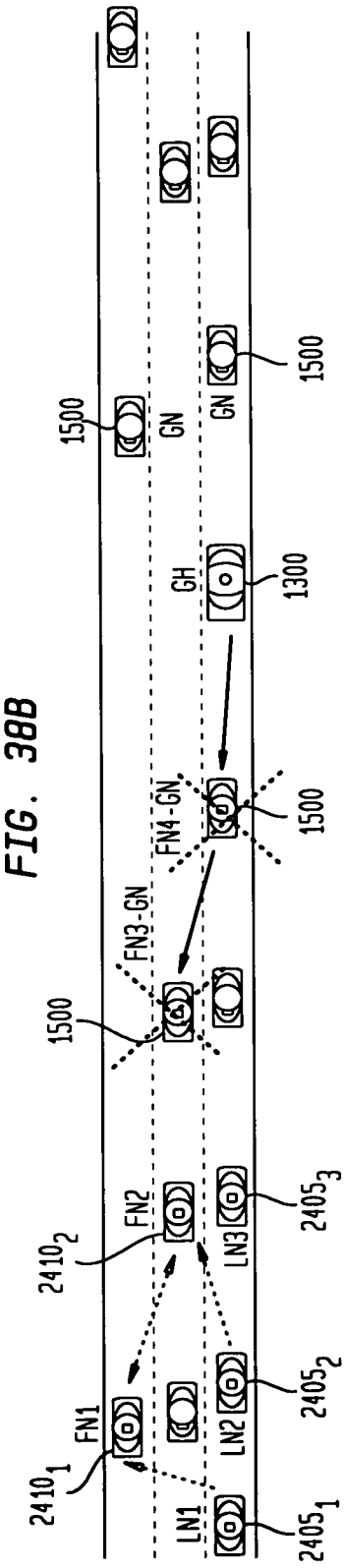
FIG. 38A
FIG. 38B

METHOD AND COMMUNICATION DEVICE FOR ROUTING UNICAST AND MULTICAST MESSAGES IN AN AD-HOC WIRELESS NETWORK

FIELD OF INVENTION

This invention relates to a network for communication in a mobile environment. More specifically, the invention relates to a method of processing communication packet, generating routing and forwarding tables and routing unicast and multicast messages.

BACKGROUND

Wireless technology has become common in all aspects of life today, whether it be a wireless home or office network, so-called "hotspot" networks at local cafes, fast food chains or hotels, or even citywide implementations of WiFi technologies. The aim of this wireless push in society is to provide accessibility to information and to increase the productivity that society as a whole has enjoyed through the wide acceptance and utilization of computer networks and especially the Internet. Wireless networking technology, such as 802.11a/b/g, allows WiFi-enabled devices to connect to each other as they would in a standard wired network without the restriction of wires. People are given the freedom to remain connected to a network regardless of their physical location within the network coverage area.

With this goal in mind, several cities have attempted to create a wireless network for the city. For example, on Jul. 29, 2004, Grand Haven, Mich. claimed the distinction of being the "first WiFi city in America" with its implementation of a citywide wireless network covering the 6 square miles of the city and extending 15 miles into Lake Michigan. Many city officials see WiFi as an infrastructure necessity, much like sewage, power, telephone and transportation, for attracting and retaining business. The benefits of such systems for the city administrators are many, ranging from providing communication among city employees to providing public service announcements, advisories and other useful information to the citizenry at large.

In this drive for greater wireless connectivity, one area of everyday life has lagged behind. The roads and highways of America have remained largely untouched by wireless technology beyond rudimentary satellite and cellular phone systems. However, there are many advantages to be gained from wireless network technology implementations on American roads. Among the most notable are traffic advisories, Amber alerts, weather advisories, etc., which could be relayed to all vehicles that may be affected on an immediate basis.

Further, networking automobiles together allows the relay of information about a vehicle that may affect other vehicles in the vicinity. For example, an automobile may suddenly brake; this action could be reported to all vehicles behind the braking automobile instantaneously, thus allowing the drivers of the other vehicles to take necessary action with less urgency. This aspect has clear implications for reducing traffic accidents and congestion. This type of wireless networking may appear in many aspects of vehicle safety applications, including, but not limited to, urgent road obstacle warning, intersection coordination, hidden driveway warning, lane-change or merging assistance.

Vehicle safety communications ("VSC") may be broadly categorized into vehicle-to-vehicle and vehicle-with-infrastructure communications. In vehicle-to-vehicle communication, vehicles communicate with each other without support from a stationary infrastructure. Vehicles communicate with each other when they are within the same radio range of each other or when multiple-hop relay via other vehicles is possible. In vehicle-with-infrastructure communication, vehicles communicate with each other with the support of infrastructure such as roadside wireless access points. In this case, vehicles may also communicate with the infrastructure only.

Key VSC performance requirements include low latency (on the order of 100 milli-seconds) and sustained throughput (or equivalently, the percentage of neighboring vehicles that successfully receive warning messages) in order to support various VSC applications such as collision avoidance.

Simply installing wireless antenna on a moving vehicle and then transmitting uncoordinated communications would not suffice for satisfying these requirements. Specifically, by transmitting uncoordinated data, the airwaves would be flooded with a plurality of messages, which would result in a jamming of the radio waves, as the radio bandwidth is limited.

As such, these vehicles would interfere with each other's transmission and compete with each other for radio bandwidth for transmission. Further, all messages would propagate in all directions without any consideration of a desired transmission direction. Additionally, each vehicle would not match other vehicles' network configurations.

The high mobility and lack of inherent relationships make a priori configuration of vehicles into vehicle groups problematic (e.g., a vehicle does not know anything beforehand about its neighbor). All information that is necessary for setting up safety communications must be exchanged in near real-time among vehicles, and vehicles in the groups must configure themselves in near real-time so that safety communication can take place. The high mobility of uncoordinated vehicles implies frequent change of neighbors or vehicle groups, and poses difficulties of using support-servers (for mobility, address, name, media session) within vehicle groups. These key differences make existing tactical ad-hoc networking technologies not directly applicable to vehicle groups for safety communications.

Using WiFi methods employed elsewhere, such as hotspots, are impractical because of coverage, data traffic volume and latency issues. A normal rush hour commute around a major city could yield a vehicle density of as much as 600 vehicles per 1200-meter length of a 3-lane highway. In addition, all these vehicles are moving through individual coverage areas at a rate of 30 to 60 mph. Most wireless systems are not equipped to handle such a large rate of change in their network.

Specifically, as a vehicle enters the coverage area, it would need to be identified and issued configuration instructions by a wireless access point or router. When a vehicle leaves the coverage area, the wireless access point or router would need to update its records to remove the vehicle form its network. Thus, the speed of a vehicle through a particular coverage area determines how often updating information, e.g. handshaking, needs to be broadcast by the wireless access point or router and responded to by all of the vehicles in range. All of these vehicles transmitting information at the same time could very easily overwhelm the system in short order.

Several attempts have been made to establish a vehicle-to-vehicle communication network. For example, FleetNet and CarTalk2000 have both developed a vehicle-to-vehicle communication network. Both of these systems use a GPS system in each vehicle for location information and to route messages. The FleetNet system uses position based routing and location awareness to relay messages. Specifically, as the backbone for their system, position data such as GPS information, plays a crucial role in the communication protocols deployed.

CarTalk 2000 also uses a position-based protocol. Each vehicle participating in the CarTalk2000-based inter-vehicle system must be equipped with GPS devices to detect its current position at any given time. However, a drawback to these systems is that the position information becomes outdated quickly, since the vehicles are moving at high speeds.

The exchange of constantly changing GPS information among vehicles, in order to perform GPS-positional routing, incurs too much protocol overhead and wireless bandwidth waste. As a result, such GPS-positional routing technology cannot achieve minimal communication latency or sustained multiple-hop throughput. Additionally, there is a need for a GPS to be installed in every vehicle in both Cartalk2000 and FleetNet.

Accordingly, there exists a need to create an ad-hoc network with both vehicles and roadside units as nodes of the network that is capable of achieving the stringent VSC performance requirements while achieving minimal communication latency or sustained multiple-hop throughput without requiring excessive bandwidth and significant protocol overhead.

BRIEF SUMMARY OF THE INVENTION

Disclosed is a method for routing packets of information between nodes within a local peer group in a wireless ad-hoc network. The method comprises receiving a first control packet including at least one routing parameter from a group header node, updating a routing table based upon the at least one routing parameter, receiving a second control packet including at least one additional routing parameter from a group node within the local peer group, and updating said routing table based upon said at least one additional routing parameter. The method further includes, once the updating steps are completed, generating a forwarding table from said routing table.

The unicast message is routed based upon the forwarding table.

The at least one routing parameter includes a group list, hop count and next hop to the group header. Updating the routing table based upon the first control packet includes modifying a destination list based upon the group list, initializing a next hop to a destination for all destinations except the immediate relay node that directly relayed the first control packet in said destination list as said group header, and modifying the next hop to the group header as the immediate relay node.

The updating of the routing table only occurs if the first and second control packets are in sequence and the method includes determining if the first and second control packets are in sequence.

Updating the routing table based upon the first control packet includes determining a source for the second control packet, determining a direct sender of the second control packet; modifying a next hop for the source via the direct sender based upon the at least one additional routing parameter in the second control packet; and modifying the next hop for the direct sender based upon the at least one additional routing parameter in the second control packet.

Also disclosed is a routing method for routing packets of information between nodes within a local peer group in a wireless ad-hoc network. The method comprises determining a type of control packet that is received by a node, determining if the control packet is received by the node in sequence; and updating a table based upon information contained in the control packet if the control packet is in sequence. The control packet can be a heartbeat control packet or a membership report. Each node in the local peer group can be a group header or a group node. If the node is a group node and the type of control packet is a heartbeat control packet, the updating step including modifying the table to include all members of a group membership list which is contained in the heartbeat control packet.

The method also includes determining if a node receives the control packet in sequence. This determination is based upon a comparison of a sequence number value contained in the control packet with a sequence number stored in memory. A control packet is received in sequence if the received sequence number value is greater than the sequence number stored in memory.

Also disclosed is a method of processing an incoming packet by a node in an ad-hoc network. The method includes receiving the incoming packet, determining if the incoming packet is destined for the node, determining a next hop to destinations based upon reading an entry in a routing table, if the incoming packet is not destined for the node and relaying the incoming packet to the next hop to destination. If the incoming packet is destined for the node, the node processes and consumes the incoming packet.

Also disclosed is a method for routing a multicast message in an ad-hoc wireless network. The method comprises the steps of receiving the multicast message for forwarding, determining if a multicast group destination for the multicast message is in a multicast forwarding table, determining if the multicast message has been previously forwarded, forwarding the multicast message if it is determined that the multicast message was not previously forwarded and if it is determined that the multicast group destination is in the multicast forwarding table and adding the multicast message to a sent list after the multicast message is sent.

The method further includes the step of determining if the multicast message is in a transmission queue, wherein if the multicast message is not in the transmission queue, the multicast message is added to the transmission queue for forwarding, and if the multicast message is in the transmission queue, the multicast message is discarded.

The multicast forwarding table can be generated by assigning a classification for each node within a local peer group, determining a hop count from a group header for each node, the group header is a node selected from all nodes within the local peer group;

collecting multicast membership information, and selecting forwarding nodes in a mesh for a multicast group based upon the collected multicast membership information and hop count from group header. Each selected forwarding node stores a multicast group identification in the multicast forwarding table. The classification, hop count from group header and multicast membership information is broadcast from the group header to other nodes within the local peer group.

The multicast routing table can also be generated based upon a membership report including multicast membership information relayed to a group header, all nodes relaying the membership report to the group header from a multicast member become forwarding nodes for a multicast group that includes the multicast member. Each forwarding node records the multicast membership information in the multicast forwarding table as the multicast group destination.

The group header based upon the hop count from the group header for each multicast member adjusts the number of forwarding nodes for a multicast group. The adjustment prunes all forwarding nodes between the group header and a multicast member determined to be the closest multicast member of a specific multicast group to the group header. The group header also prunes itself. When a forwarding node is pruned, the forwarding node deletes the multicast membership information corresponding to the pruned multicast group, from the multicast group destination in the multicast forwarding table.

Also a forwarding node becomes a non-forwarding node for a multicast group node when a preset timer expires without receiving a membership report including the multicast membership information corresponding to the multicast group.

The method of routing a multicast message further includes selecting a transmission channel for each node having the multicast group destination listed in the multicast forwarding table and selecting a reception channel, for each node having the multicast group destination listed in the multicast forwarding table. The transmission and reception channels can be selected to alternate. For example, the transmission and reception channels are selected to alternate in a single alternate pattern. Alternatively, the transmission and reception channels are selected to alternate in a double alternate pattern.

The method further includes storing the sent multicast message in memory for a predetermined time, detecting if the sent multicast message is received from a neighboring forwarding node within the predetermined time and repeating the forwarding step if the sent multicast message is not detected within the predetermined time. The multicast message is discarded from memory if the sent multicast message is detected within the predetermined time.

Also disclosed is a wireless communication device. The device includes a means for receiving the multicast message for forwarding, means for determining if a multicast group destination for the multicast message is in a multicast forwarding table, means for determining if the multicast message has been previously forwarded, means for forwarding the multicast message if it is determined that the multicast message was not previously forwarded and if it is determined that the multicast group destination is in the multicast forwarding table; and means for adding the multicast message to a sent list after the multicast message is sent. The device further includes a means for storing the multicast forwarding table and the sent list.

Also disclosed is a means for receiving the incoming packet, means for determining if the incoming packet is destined for the node, means for determining a next hop to destinations based upon reading an entry in a routing table, if the incoming packet is not destined for the node and means for relaying the incoming packet to the next hop to destination.

Each of the wireless communication devices can be installed into a moving vehicle.

Also disclosed is a computer readable medium comprising a set of computer readable instructions capable of being executed by at least one processor in a wireless communication device of a moving vehicle for controlling the at least one processor to route messages.

BRIEF DESCRIPTION OF THE DRAWINGS

These and other features, benefits, and advantages of the present invention will become apparent by reference to the following figures, with like reference numbers referring to like structures across the views, wherein:

FIG. 3A illustrates an example of an ad-hoc network with isolated roadside units in accordance with an embodiment of the invention;

FIG. 4 illustrates an example of an ad-hoc network with linked roadside units in accordance with an embodiment of the invention;

FIG. 28 illustrates an example of a Membership Report packet used for creating a multicast tree in accordance with the embodiment depicted in FIG. 25;

FIG. 30A is a functional state transition chart for a Group Header in accordance with the embodiment depicted in FIG. 25;

FIG. 30B is a functional state transition chart for a Group Member in accordance with the embodiment depicted in FIG. 25;

FIG. 38A illustrates a multicast group 2400 formed in accordance with the second embodiment of the invention;

FIG. 38B illustrates a multicast group 2400 formed in accordance with the third embodiment of the invention;

DETAILED DESCRIPTION OF THE INVENTION

In accordance with the invention, the ad-hoc network is divided into two types of nodes: a roadside unit (hereinafter "RSU") and a moving vehicle. The RSU is a stationary node while vehicles can be moving in groups.

Figure 1:
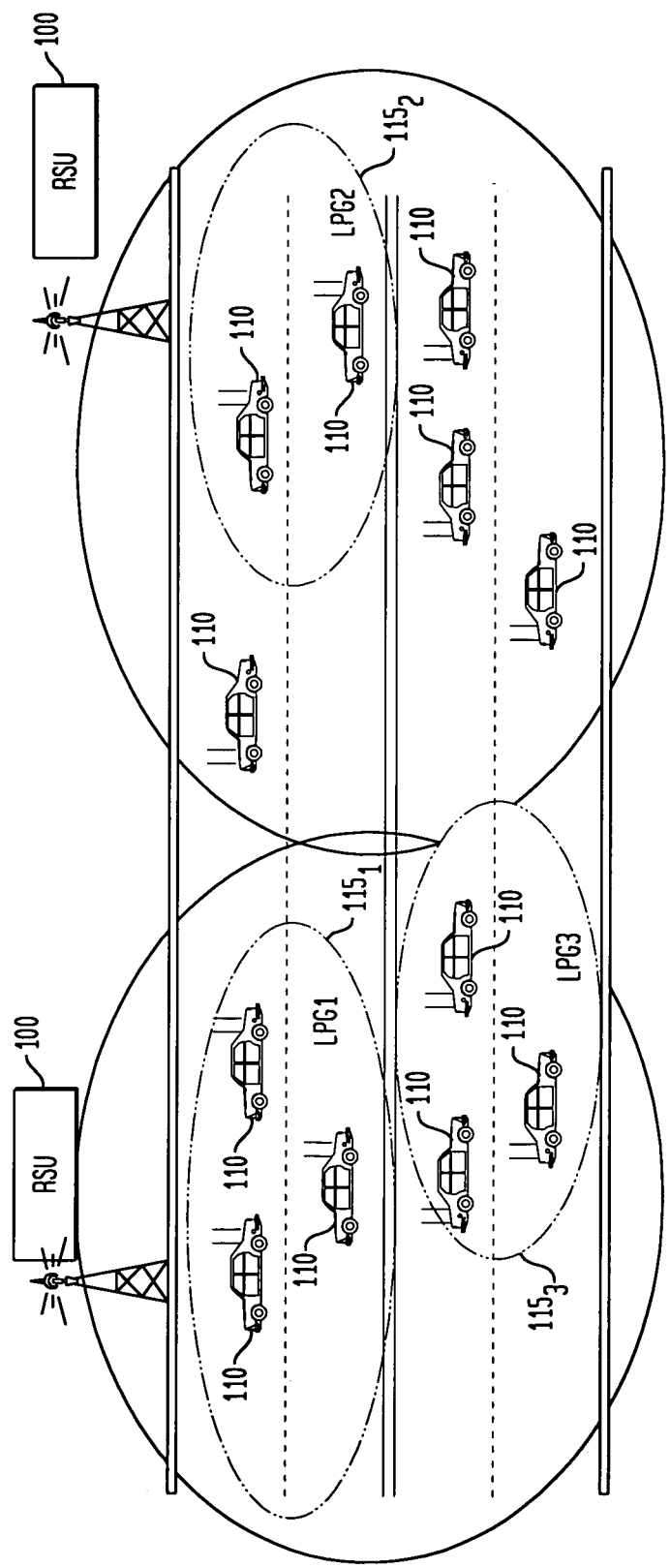
FIG. 1 illustrates an example of multiple LPGs in the vicinity of a roadside unit in accordance with the invention.

FIG. 1 illustrates an example of the ad-hoc network in accordance with the invention. The RSU 100 is located along the side of a roadway. The number of RSU 100 used in the network will depend on several factors such as the range of the radio antenna of the RSU 100, desired communication range, number of moving devices, topology of the land, the environmental conditions, traffic patterns and population density. FIG. 1 illustrates two RSUs 100. The encircled area represents the radio range for each RSU 100. Each RSU 100 can be used to communicate with moving-vehicles 110 traveling either alone or a group of vehicles.

The moving vehicles 110 can be organized into manageable groups. These groups are used to coordinate transmission of data between the nodes. The groups are built based upon the relative location of neighboring nodes or based upon a fixed location. This grouping or Local Peer Group ("LPG") is the basis for routing radio signals within a single LPG 115, as well as between multiple LPGs.

FIG. 1 illustrates three LPGs 115. Each LPG 115 consists of at least one moving vehicle 110. FIG. 1 shows that LPG 1 115$_1$ included three moving vehicles, LPG 2 115$_2$ includes two and LPG 3 115$_3$ includes three moving vehicles. The RSUs 100 can exist within the LPGs 115 and act as a special LPG node or exist as a separate node outside the LPG 115. When the RSU 100 is used in conjunction with the LPG 115 and not a node within the LPG 115, the RSU 100 can act as a boundary node for inter LPG communication. Typically, the radio coverage of one RSU 100 will be larger than the size of one LPG, i.e., more than one LPG 115 will be within the radio range of one RSU 100. The case is illustrated in FIG. 1. Accordingly, packets from one LPG 115 can be broadcast to another LPG 115 using the RSU 100. In this case, the RSU 100 will include information regarding the LPGs stored in its memory.

The moving vehicles 110 communicate with each other over the vehicle-vehicle (V-V) channels. The moving vehicles communicate with the roadside unit via the vehicle-to-roadside (V-R) channel. Additionally, the RSUs 100 communicate with each other via a R-R channel or R-B channel (backbone). Since R-R communications would use a dedicated channel or wired backbone, the communication would not interfere with V-V or V-R communication. There are several alternatives for channel sharing between the V-V and V-R channels. In the preferred embodiment, there is a dedicated channel for V-R communication. The remaining channels will be shared for V-V and/or V-R communication. The V-R channel can be in the same RF frequency band as the other channels. Alternatively, the V-R channel can be in a difference RF frequency band allowing for different communication range and data rates.

In another embodiment, all channels are dynamically shared for both V-V and V-R. This approach allows for optimized performance. However, complexity is introduced in probing and selecting non-interfering channels.

According to another embodiment, there is a dedicated channel only assigned for V-R with others channels shared for only V-V. Alternatively, a dedicated channel for V-R is used with a second dedicated channel for V-V. The remaining other channels will be shared for V-V and V-R communications. For purposes of the proceeding description of the invention, the preferred embodiment of the channel assignment will be used. The RSU 100 can have many functions such as a router, an applications server or a combination thereof.

Figure 2:
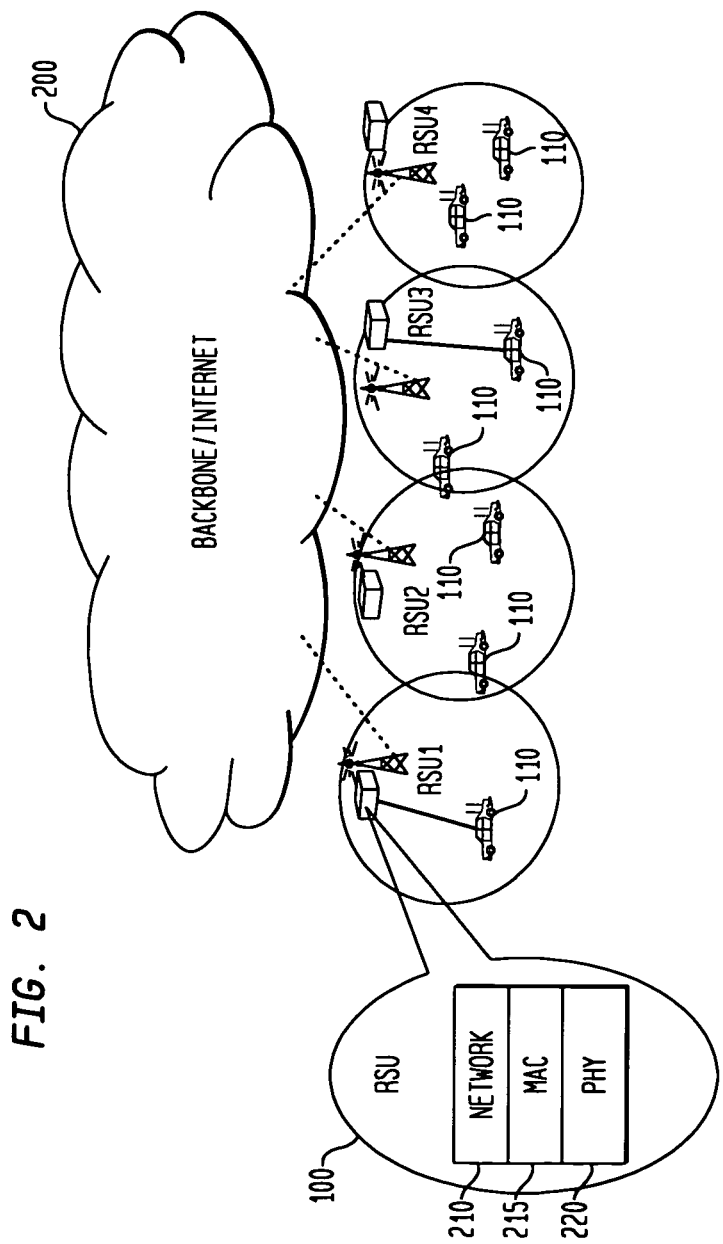
FIG. 2 illustrates an ad-hoc network including a roadside unit acting as a router in accordance with an embodiment of the invention.

FIG. 2 illustrates an example of an ad-hoc network when at least one RSU 100 functions as a router. The ad-hoc network includes the RSUs 100 a backbone 200, e.g. Internet and the moving vehicles 110. The RSU 100 will include three network hierarchical layers: network layer 210, a MAC layer 215 and a physical layer 220.

The physical layer 220 includes devices such as hubs, repeaters and wireless radios. The physical layer 220 functions include the transmission of signals, representing the high layer data, over a communications channel such as the physical radio link.

The MAC (Media Access Control) layer 215 handles the procedures for transferring data between network entities and to detect and possibly correct errors that may occur in the physical layer 220. For example, in IEEE 802.11 the MAC layer 215 manages and maintains communications between 802.11 stations (radio network cards and access points) by coordinating access to a shared radio channel and utilizing protocols that enhance communications over a wireless medium. The 802.11 MAC layer 215 uses an 802.11 Physical (PHY) Layer, such as 802.11b or 802.11a or 802.11p, to perform the tasks of carrier sensing, transmission, and reception of 802.11 frames.

The network layer 210 performs functions for end-to-end communication among network entities. For example, the functions include routing of messages from source node to destination node, multicasting of messages from source node to destination nodes in the same multicasting group, or mobility (location) management of the network entities for routing or multicasting purpose. The network layer 210 discovers and maintains unicast/multicast routes as data paths and also provides data delivery methods among end users in accordance with the unicasting and multicast procedures and protocols described herein. The end users can be either moving vehicles 110 or RSUs 100.

The RSU 100 can route data to all moving vehicles 110 within its radio coverage. Furthermore, depending on the relative locations of the RSUs 100, the RSU 100 can route data between the RSUs 100, e.g., R-R communication. Additionally, the RSU 100 can route data from/to the backbone 200, e.g., route data from backbone to the moving vehicle 110. As depicted in FIG. 2, the moving vehicle 110 travels through the radio range of multiple RSUs 100 in the network which would cause frequent IP handoffs.

There are several potential deployment configurations for the RSUs 100. In an embodiment, the RSUs 100 are positioned in isolated locations. In this embodiment, RSUs 100 have no connection to other RSUs 100 because the RSUs 100 are out of range from each other. The routing function of the RSUs 100 is only provided with that radio range of the RSU. Deployment of isolated RSUs 100 may have limited benefits. One benefit is that if the RSUs 100 are sparely deployed, there is no channel interference. The same V-R channel can be used for communication in multiple RSUs 100. Additionally, the cost of deploying the RSUs 100 is minimal. A few number of RSUs 100 can be used to provide service in certain problematic areas, e.g., busy intersections, known trouble spots or accident-prone spots. Preferably, this embodiment will be used for an initial stage deployment. However, the RSUs 100 are unconnected and cannot assist moving vehicles 110 within nearby RSUs 100 or provide any information regarding the nearby RSUs. Additionally, moving vehicles 110 may have to duplicate information at each RSU 100 to make sure information is propagated to all RSUs 100 within the neighborhood.

FIG. 3A illustrates two isolated RSUs 100. RSU1 $100_1$ can communicate with moving vehicle 1 $110_1$, vehicle 2 $110_2$ and but not vehicles 3-6 $110_{3-6}$ and RSU2 $100_2$. Similarly, RSU2 $100_2$ can communicate with vehicles 5 $110_5$, and vehicle 6 $110_6$, but not with vehicles 1-4 $110_{1-4}$.

In another embodiment, a single RSU 100 can be deployed with multiple remote access points. In this configuration, an RSU 100 controls multiple wireless access points (APs) in roadways. The RSU 100 communicates with moving vehicles 110 or an entire LPG 115 through the APs. The network layer peer for a vehicle is an RSU and the peer for MAC layer and Physical layer of a moving vehicle 110 is the AP. For 802.11a or 802.11p communications, the moving vehicles 110 use the APs. To handle network layer communications the moving vehicles 110 work primarily with the RSU 100. The AP handles the MAC layer 215 and Physical layer 220 functions for the RSU 100. The RSU 100 itself only handles the network layer functions 210. By implementing APs, the service area of an RSU 100 is increased.

AN RSU 100 with multiple wireless access points can include a switch or a broadcast Bus to achieve routing functionality between more than one AP.

Figure 3B:
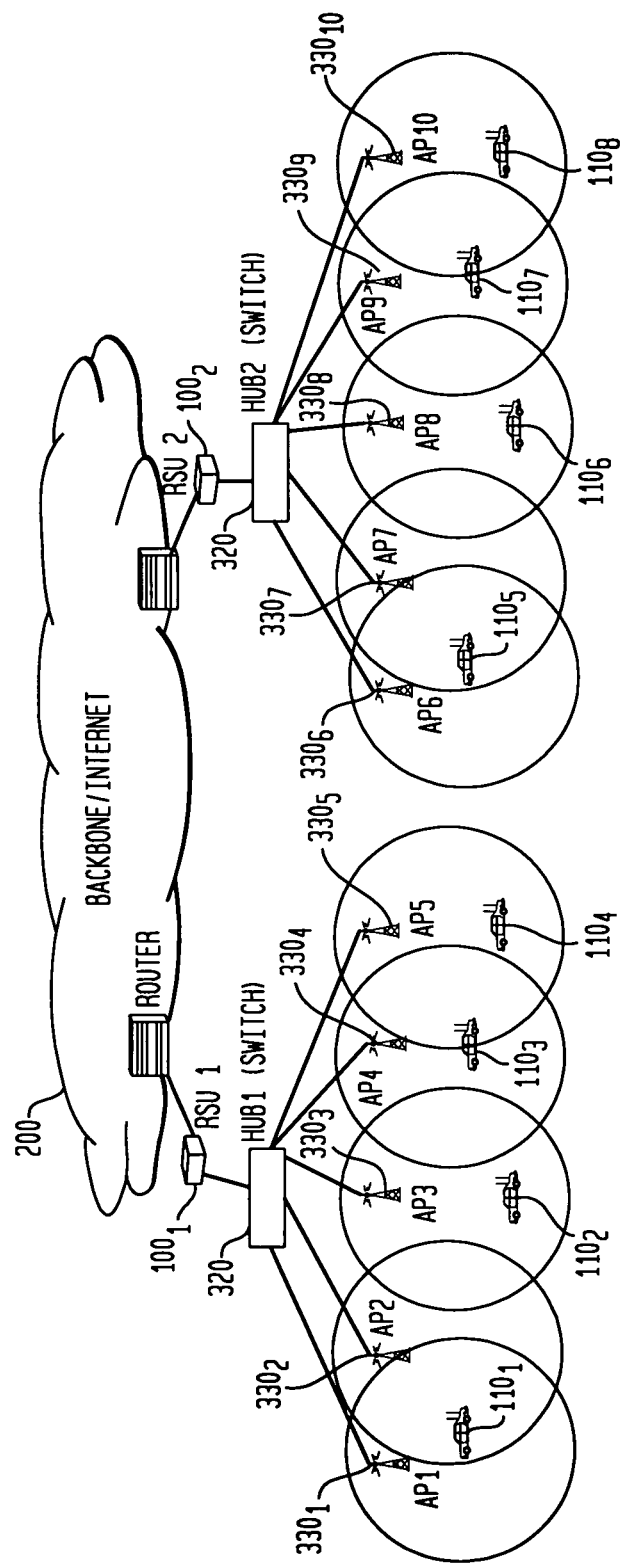
FIG. 3B illustrates an example of an ad-hoc network with multiple roadside units in conjunction with the roadside units' remote access points in accordance with an embodiment of the invention.

FIG. 3B illustrates the ad-hoc network for multiple RSUs 100 with routing functionality using multiple access points which are switch based. As depicted, RSU1 $100_1$ controls five APs (collectively AP 330). RSU2 $100_2$ also controls five APs (collective AP 330). A hub switch 320 is located between each RSU 100 and the APs 330 so that only one AP 330 is responsible for communication, i.e., receiving and forwarding, data, to and from a moving vehicle 110. When a moving vehicle 110 is within the wireless coverage area of an AP, the MAC layer 215 and physical layer 220 create an association of the moving vehicle 110 with that specific AP 330 via beacons and handshakes. In addition, the RSU 100 can obtain the information from the AP 330 about the associated moving vehicles within each AP's coverage area. For example, AP 5 is the access point for all vehicles within its radio range. Each AP includes two hierarchical layers, the physical layer and MAC layer.

This configuration supports unicast routing, multicast routing and mobility detection. For unicasting, each RSU 100 knows the next hop for messages destined to each moving vehicle 110 based upon the forwarding table created and stored in memory for each node within the network. Even if the RSU 100 is not a node within a LPG 115, the RSU 100 can overhear the heartbeat control message 1700 on its V-R channel. This information can be used by the RSU 100 for routing from the RSU 100 or APs 330 to a LPG 115 and the moving vehicles 110. The next hop is the AP 330 that is associated with the moving vehicle 110. In other words, the APs 330 are the MAC proxy for the moving vehicles. Upon receiving the messages from the RSU 100, the switch 320 forwards the message to a particular AP 330 associated with a particular moving vehicle 110: Using the hub switch 320, the Unicast message is only sent to the designated AP 330 and is never broadcast to all APs.

For example, the next hop for moving vehicle 4 110$_4$ is AP 5 330$_5$. Therefore, RSU1 100$_1$ records AP 5 330$_5$ as the next hop for moving vehicle 4 110$_4$ in its memory. In other words, all messages destined for moving vehicle 4 110$_4$ will be routed through AP 5 330$_5$ while vehicle 4 110$_4$ is within range of AP5 330$_5$.

For multicast operations, only the APs 330 associated with moving vehicles 110 that join a multicast group 2400 become a multicast forwarding node for the multicast group 2400. Multicast groups 2400 will be described later in greater detail. The switch 320 knows which APs 330 are forwarding nodes and the multicast packets are delivered to only those forwarding nodes. A forwarding node is a node that forwards multiple messages to the destination nodes, which are in a multicast group 2400.

For example, if a multicast message is destined for vehicles 2 110$_2$ and vehicle 4 110$_4$, vehicle 2 110$_2$ and vehicle 4 110$_4$ join a multicast group 2400. RSU1 100$_1$ knows that AP3 330$_3$ and AP5 330$_5$ are the forwarding nodes for this multicast group 2400, as the next hop information is recorded in the RSU1 100$_1$. RSU1 100$_1$, AP3 330$_3$ and AP5 330$_5$ become forwarding nodes for the multicast message. The switch 320 only delivers the multicast message to AP3 330$_3$ and AP5 330$_5$. This configuration also supports mobility detection. The next hop information for unicasting and forwarding node information for multicasting is continuously updated. The APs 330 or the moving vehicles 110 perform mobility detection. In an embodiment, the APs 330 detects mobility based upon the use of a periodic beacon. The beacon will include the AP identification. The moving vehicles 110 will respond to the periodic beacon. If the AP 330 receives the response, the AP 330 will maintain itself as the next hop or forwarding node for the moving vehicle. On the other hand, if the AP 330 does not receive a response, the AP 330 will inform the RSU 100 that the moving vehicle has moved out of the radio range of the AP. The RSU 100 will update that next hop and forwarding node information for the vehicle.

In another embodiment, the moving vehicle 110 will affirmatively change the next hop and forwarding node information stored in the RSU 100. In this embodiment, the moving vehicle 110 will decide which AP 330 should be the next hop or forwarding node based upon a received SNR value. The moving vehicle can make this decision based upon two separate criteria. In an embodiment, the moving vehicle can compare the receive signal's SNR with a predetermined threshold value. If the SNR is above the threshold value, then the moving vehicle 110 will declare the channel no longer available and elect a different AP 330 for the next hop or forwarding node 2410. Alternately, the moving vehicle 100 can select the strongest channel, i.e., signal from neighboring APs 330 based upon a comparison of signal strengths received from all APs 330 within the moving vehicle's radio range. The moving vehicle 110 will send a message updating the next hop and forwarding node information to the new AP 330. The new AP 330 will inform the RSU 100 of the mobility such that the information recorded in the RSU 100 can be modified. The movement of the moving vehicle 110 causes the handoff between the APs 330. However, the moving vehicle is still within radio range of the same RSU 100. In other words, in this architecture the handoff is performed below the IP layer, only MAC information such as MAC address is updated.

For example, if moving vehicle 4 110$_4$ moves from AP5 330$_5$ to AP4 330$_4$, AP4 330$_4$ becomes a new MAC proxy for vehicle 4 110$_4$ and informs its proxy status to RSU1 100$_1$. Afterwards RSU1 100$_1$ forwards to AP4 330$_4$ messages destined to vehicle 4 110$_4$. Since the handoff between APs 330 under one RSU 100 doesn't involve any IP layer operation, IP layer handoff happens less frequently and takes place only when a moving vehicle 110 moves from one RSU 100 to another.

Figure 3C:
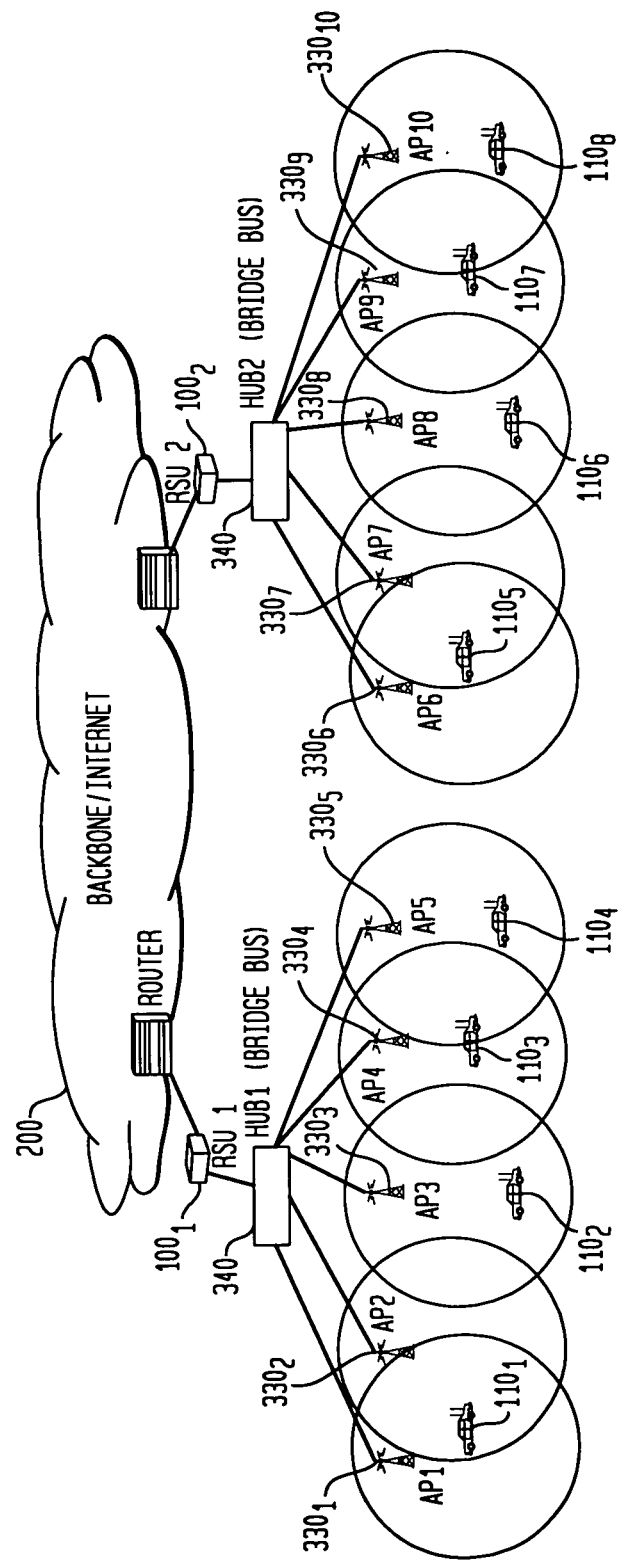
FIG. 3C illustrates a second example of an ad-hoc network with multiple roadside units in conjunction with the roadside units' remote access points in accordance with an embodiment of the invention.

FIG. 3C illustrates the ad-hoc network for multiple RSUs 100 with routing functionality using multiple access points that are broadcast bus-based. As depicted, RSU1 100$_1$ controls five APs (collectively AP 330). RSU2 100$_2$ also controls five APs (collective AP 330). Instead of a switch 320, as depicted in FIG. 3B, a bridge bus 340 connects an RSU 100 and its APs 330 in the architecture depicted in FIG. 3C. Unlike the previous architecture which is switch-based (FIG. 3B), messages sent by an RSU 100 toward the moving vehicles 110 are delivered to all the APs 330 under the RSU 100. However, by using a bridge bus 340 only the APs 330 associated with the destination, i.e., moving vehicle 110, forwards the message to the moving vehicle 110.

While this configuration supports unicast routing, multicast routing and mobility detection, the RSUs are not used to control, maintain or manage any of these features. An advantage of the embodiment is that RSU1 100$_1$ doesn't need to maintain the information about any AP association with the vehicle. The forwarding operation is simplified using the bridge bus 340, as it minimizes the overhead for maintaining the next hop information and forwarding node information. However, there is an increase in overheads on APs 330 and APs 330 face unnecessary traffic.

In unicasting operation, a message destined to one moving vehicle 110 is forwarded to all the APs under RSU1 100$_1$ control. RSU 100 only records the moving vehicle's MAC address as a direct connect, e.g., no next hop or forwarding node information. Only the AP 330 that has the MAC address for the destination vehicle will forward the message. For example, if a message is destined for vehicle 4 110$_4$, RSU1 100, forwarded the message to all the APs 330, but only AP5 330$_5$ can forward the message to moving vehicle 4 110$_4$.

Similarly, with the multicast operation described above with respect to FIG. 3B, only the APs 330 associated with the vehicles which have joined a multicast group 2400 become a forwarding node 2410 for the multicast group 2400. However, unlike the configuration described in FIG. 3B, not only the forwarding APs but other APs (i.e., no vehicle with the multicast membership under these APs) receive the multicast packets. The RSU 100 does not record any information regarding the forwarding nodes. For example, a multicast message is destined for moving vehicles 2 110$_2$ and vehicle 4 110$_4$, vehicles 2 110$_2$ and vehicle 4 110$_4$ join a multicast group 2400. RSU1 100$_1$ routes the message to AP1-5 330$_{1-5}$. However, only AP3 330$_3$ and AP 5 330$_5$ forward the message to vehicles 2 110$_2$ and vehicle 4 110$_4$, respectively.

For mobility detection, using a bridge bus 340 instead of a switch 320 has the advantage that the detection is quicker. This is because the RSU 100 is not involved with the detection process nor is the RSU 100 informed. Therefore, messages between the AP 330 and RSU 100 are avoided. The handoff is completed between a mobile vehicle and the associated APs.

The mobility detection is performed in the same manner as described above, however, only the MAC address cache in the APs 330 is updated.

The above identified embodiments have been described where the RSUs 100 are located in isolation from each other, however, in another embodiment of invention, the RSUs 100 can be located within radio range of each other. In this embodiment, the RSU 100 are linked together to form an RSU network. The linked RSU network can be densely or sparsely populated. These RSUs 100 have communication links between each other and provide functions outside the RSU range through coordination with other RSUs 100. When the RSUs 100 are interconnected, the RSUs 100 can share all of the information. Moving vehicles 110 do not have to send duplicate information to each passing RSU 100. The liked RSUs 100 can exchange location information, IP and MAC channel information to assist the moving vehicles to pre-configure the connection for neighboring RSUs 100. Furthermore, the linked RSUs 100 can be used to route packets such as accident information from one area to another. However, there is a tradeoff for linked RSUs 100, MAC channel interference. For sparely populated RSUs 100, the MAC channel interference is minimal; the same V-R channel can be used for any RSU. However, if there are densely populated RSUs 100 within a given area, there is a potential for MAC channel interference that requires channel assignment for the V-R channels.

FIG. 4 illustrates an example of ad-hoc network with a sparsely populated linked RSUs 100. RSU1 $100_1$ and RSU2 $100_2$ are wirelessly or wire linked 400 to each other. Therefore, information can be shared by the two RSUs $100_1$ and $100_2$. Since the two RSUs $100_1$ and $100_2$ are sparsely populated within the area, the same V-R channel can be used. Additionally, the radio range or coverage for the two RSUs $100_1$ and $100_2$ can be selected to cover a large area without a concern of interference. This configuration would be typically used is a rural or unpopulated area.

Figure 5:
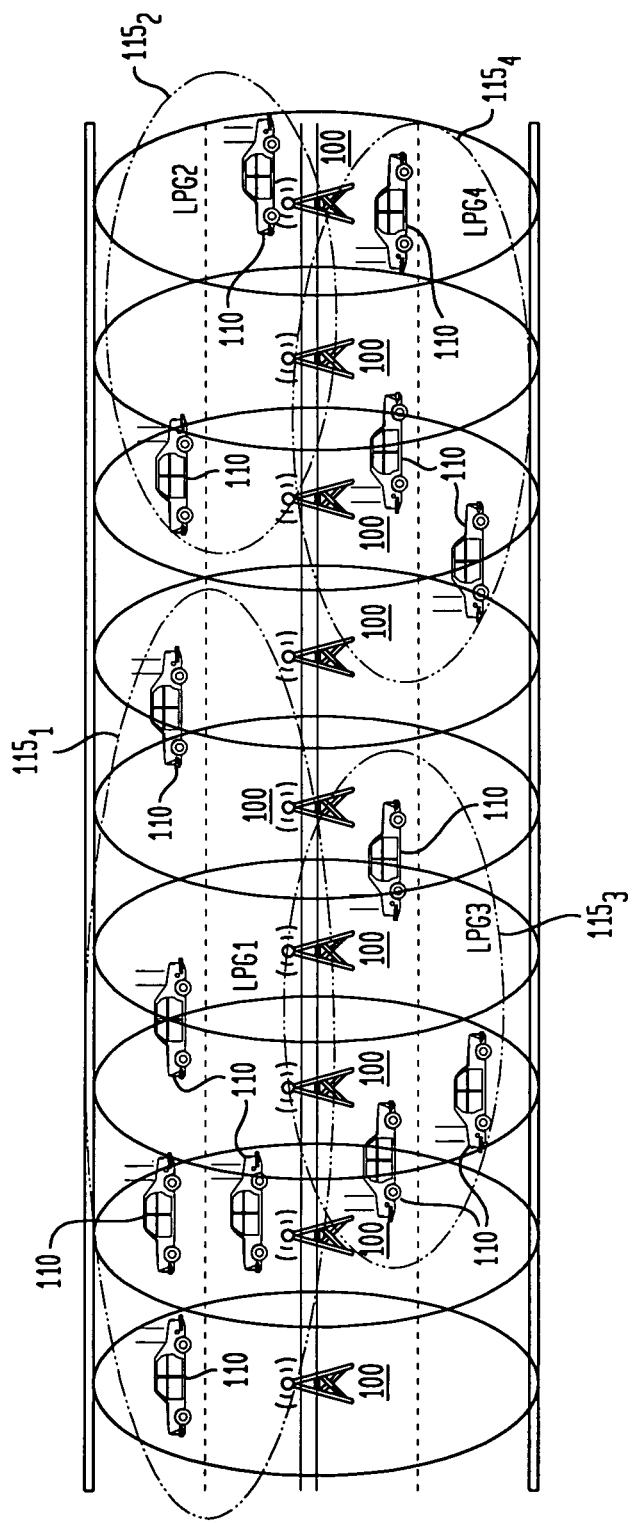
FIG. 5 illustrates a second example of an ad-hoc network with linked roadside units in accordance with an embodiment of the invention.

FIG. 5 illustrates an ad-hoc network with densely populated interconnected RSUs 100. As depicted in FIG. 5, the ecliptic shaped lines represent the radio range of each RSU 100. The radio range of each RSU 100 is selected to be smaller than the sparsely populated RSU example and is designed to handle fewer moving vehicles 110 simultaneously. However, this design will result in short vehicle connection time with each RSU 100, channel contention, frequent handoffs and little time for address assign and authentication. A handoff will have to take place every few seconds, which causes the moving vehicle 110, to establish a new address, a new connection and go through the security mechanisms at every handoff.

Figure 6:
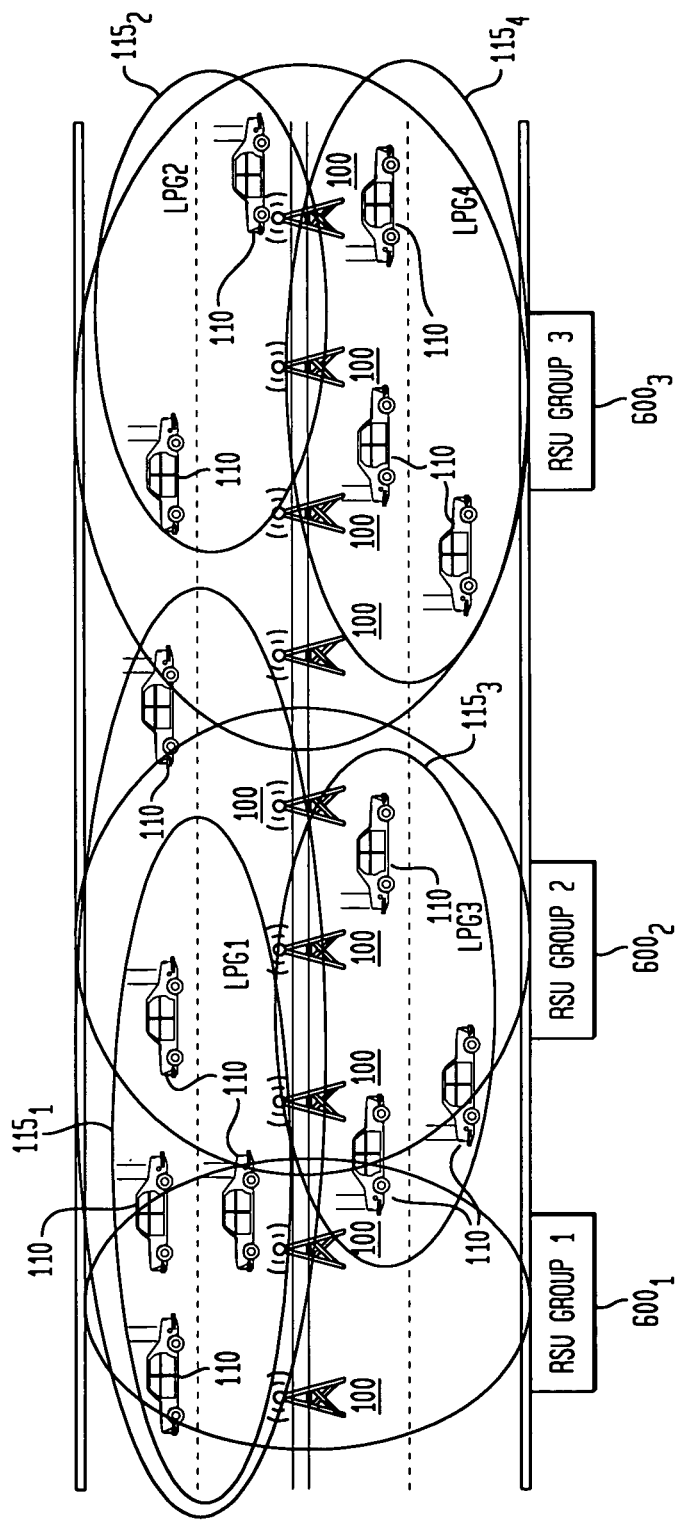
FIG. 6 illustrates an example of three roadside unit groups in accordance with an embodiment of the invention.

In order to avoid these problems, an RSU group will be formed. An RSU group is formed from more than one RSU 100. FIG. 6 illustrates a plurality of RSU groups $600_{1-3}$, respectively. Instead of dealing with an RSU 100 individually, a moving vehicle 110 will deal with the RSU group $600_{1-3}$ as one functional unit. Some of the RSU group $600_{1-3}$ operations are channel reservation and coordination, authentication and handoff handshake. For the downlink, in order to minimize data loss, the same downlink stream can be sent by the RSU group 600 or subgroup. The same set of configuration parameters with several RSUs 100 will be used for neighboring RSUs that form the RSU group 600. This will avoid constant handoff and configuration changes. When a moving vehicle 110 enters an RSU group, e.g., $600_1$, the moving vehicle will perform channel reservations, authentication and handshake only once.

The RSU groups will be used for V-R and V-backbone communication, and emergency communication. The RSU groups can also be used to assist in the formation of a local peer group (LPG), tracking, coordination and optimization thereof.

As mentioned above, when a moving vehicle 110 enters an RSU 100 or RSU group $600_{1-3}$, the moving vehicle 110 sends a channel reservation request to the RSU 100 or RSU group $600_{1-3}$. The first RSU 100 within the RSU group, i.e., $600_1$ will assign the channel and timeslot for the entering moving vehicle. This assignment is for the use in V-R communications. The channel will be selected from multiple channels to avoid any interference. Each moving vehicle 110 is assigned a specific sub-channel available for the RSU group 600.

For channel access, there are two possible schemes: synchronous and asynchronous access. In one embodiment, synchronous access is used. Each moving vehicle 110 is assigned a fixed-size time slot within a sub-channel. For example, a vehicle is assigned to Channel 4, Time Slot 2 while second vehicle is assigned to Channel 4, Time Slot 5. The vehicles communicate only when it is their turn, but remains silent otherwise. Within a time slot, a portion of the bandwidth is reserved for uplink communication and the rest for downlink. In accordance with this scheme each moving vehicle 110 has equal access to the airwaves. An advantage of the use of synchronous access is that no time is wasted on contention resolution. The "hidden terminal" problem also does not exist if adjacent RSU groups use non-overlapping channels.

In another embodiment, asynchronous scheme is used. Each moving vehicle 110 is assigned to a sub-channel. Moving Vehicles 110 within a sub-channel contend for channel access through the use of contention resolution, e.g., CSMA scheme. This scheme is random access based.

Figure 7:
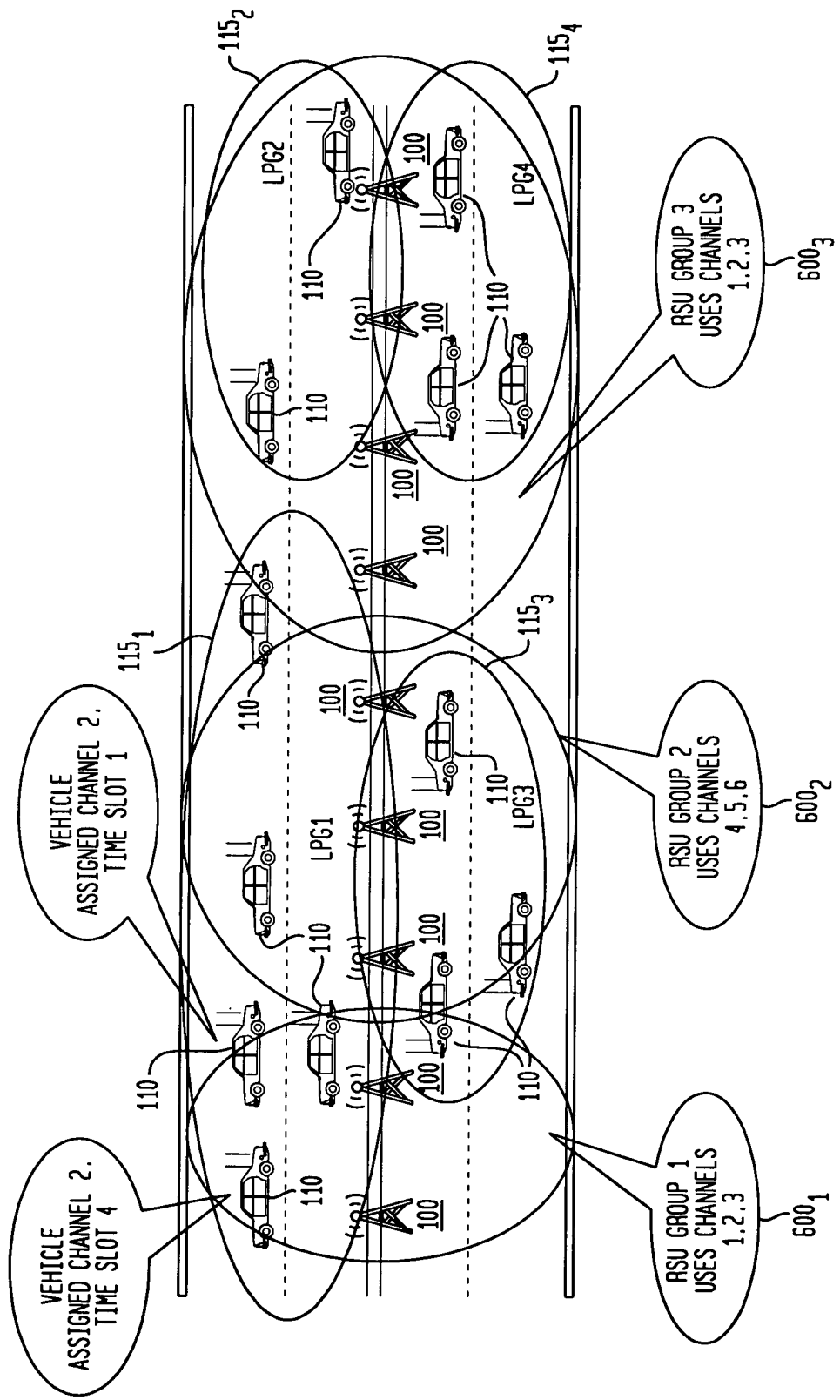
FIG. 7 illustrates an example of the channel assignment for the three roadside unit groups in FIG. 6.

FIG. 7 illustrates the channel assignment for multiple RSU groups 600. A network provider or an RSU group management entity can perform the channel assignment to an RSU group 600. As depicted in FIG. 7, RSU Group1 $600_1$ is assigned channels 1-3, RSU Group2 $600_2$ is assigned channels 4-6 and RSU Group3 $600_3$ is assigned channels 1-3. Adjacent RSU groups 600 use different sub-channels so moving vehicles 110 within an RSU group 600 will not be able to become a hidden terminal to vehicles in another RSU group 600. RSU Group1 $600_1$ and RSU Group3 $600_3$ can be assigned the same channel because of their relative location. There would be no channel interference caused by RSU Group1 $600_1$ and RSU Group3 $600_3$. Within an RSU group 600, each moving vehicle 110 is assigned to a sub-channel (channel) as well as a time slot. This ensures that only one moving vehicle 110 will be transmitted at any one time. For example, in FIG. 7 a first vehicle is assigned channel 2, time slot 4 and the second vehicle is assigned channel 2, time slot 1.

Figure 8:
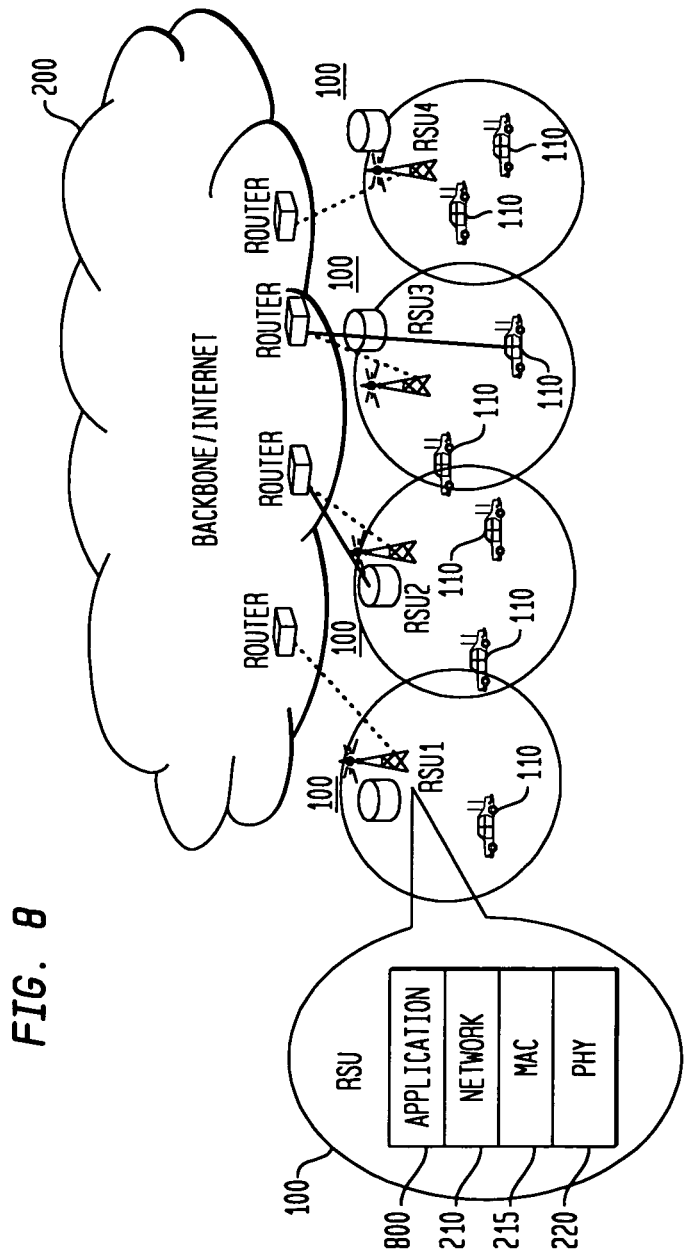
FIG. 8 illustrates an example of an ad-hoc network with a roadside unit acting as an application server in accordance with an embodiment of the invention.

FIG. 8 illustrates an ad-hoc network where the RSU 100 only acts as an application/information server. The ad-hoc network includes the RSUs 100, a backbone 200, e.g., Internet and the moving vehicles 110. The RSU 100 will include four network hierarchical layers, network layer 210, a MAC layer 215, a physical layer 220, and application layer 800. The backbone 200 will include at least one router.

In this configuration, the RSUs 100 will not have any routing function. The RSU 100 will act as an end-host of a public domain. The RSU 100 will be an application server, information storage device or service provider, for example, local advertisement, real-time traffic management or map updates, etc. Each moving vehicle 110 will be assigned a private IP address by the RSU 100 and will have access to the backbone 200 using the RSU 100. The RSU 100 will provide Network Access Translation of the private IP to provide the access to the backbone 200. When the RSU 100 only acts as an application server, the RSU 100 cannot support or detect mobility of the moving vehicle 110.

Figure 9:
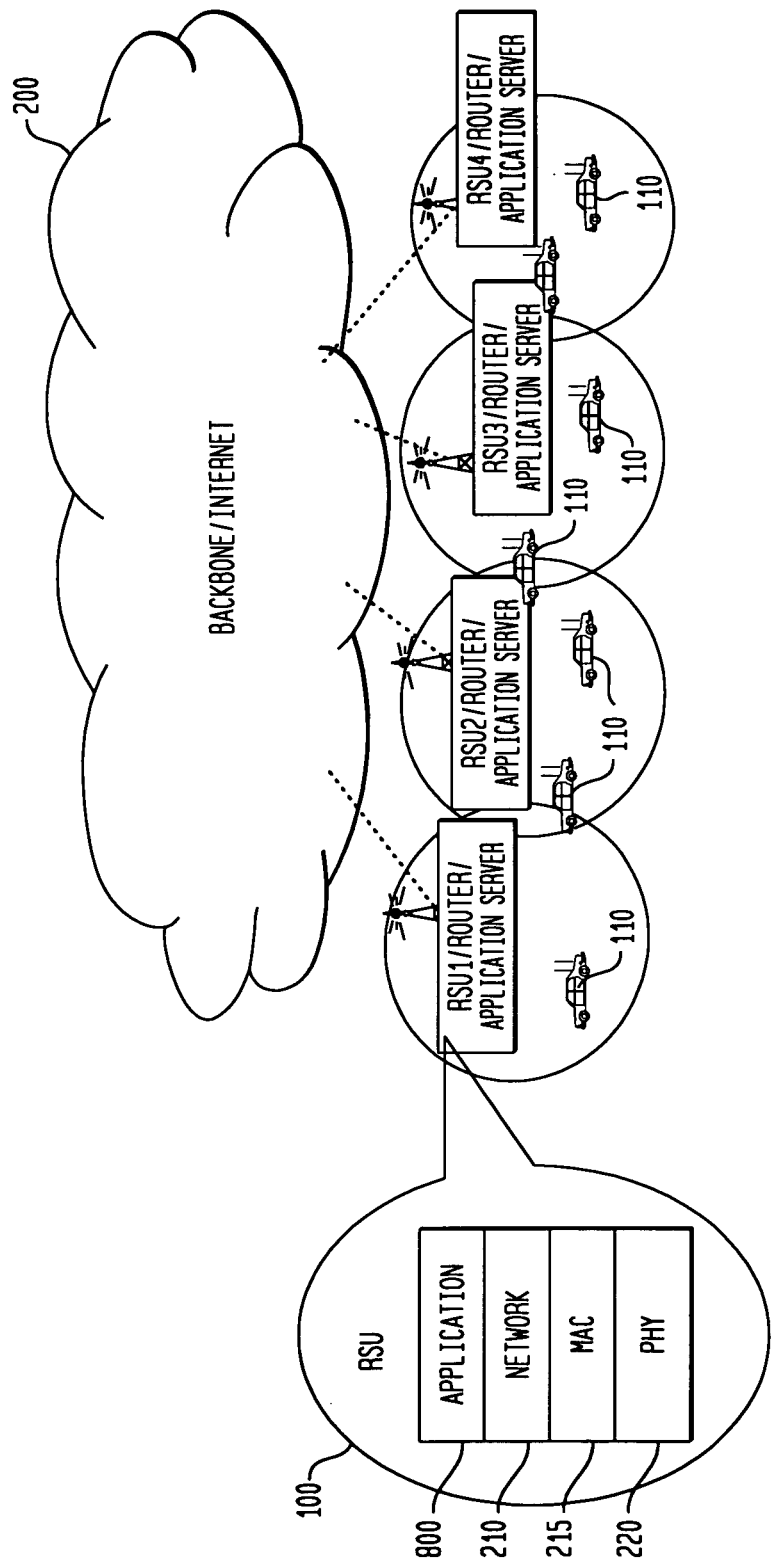
FIG. 9 illustrates an example of an ad-hoc network with a roadside unit acting as an application server and a router in accordance with an embodiment of the invention.

FIG. 9 illustrates an ad-hoc network where the RSU 100 acts as both an application/information server and a router. The ad-hoc network includes the RSUs 100, a backbone 200, e.g., Internet and the moving vehicles 110. The RSU 100 will include four network hierarchical layers: network layer 210, a MAC layer 215, a physical layer 220, and application layer 800, as well as a router co-located with the RSU 100.

This architecture does not require NAT or the assignment of a private IP address. Vehicles can be assigned a public IP address making it easier to access the Internet. The RSU 100 required for this architecture will have heavy computing power since it functions as both a router and application server. The RSU 100 can be used with or without remote APs 330.

Figure 10:
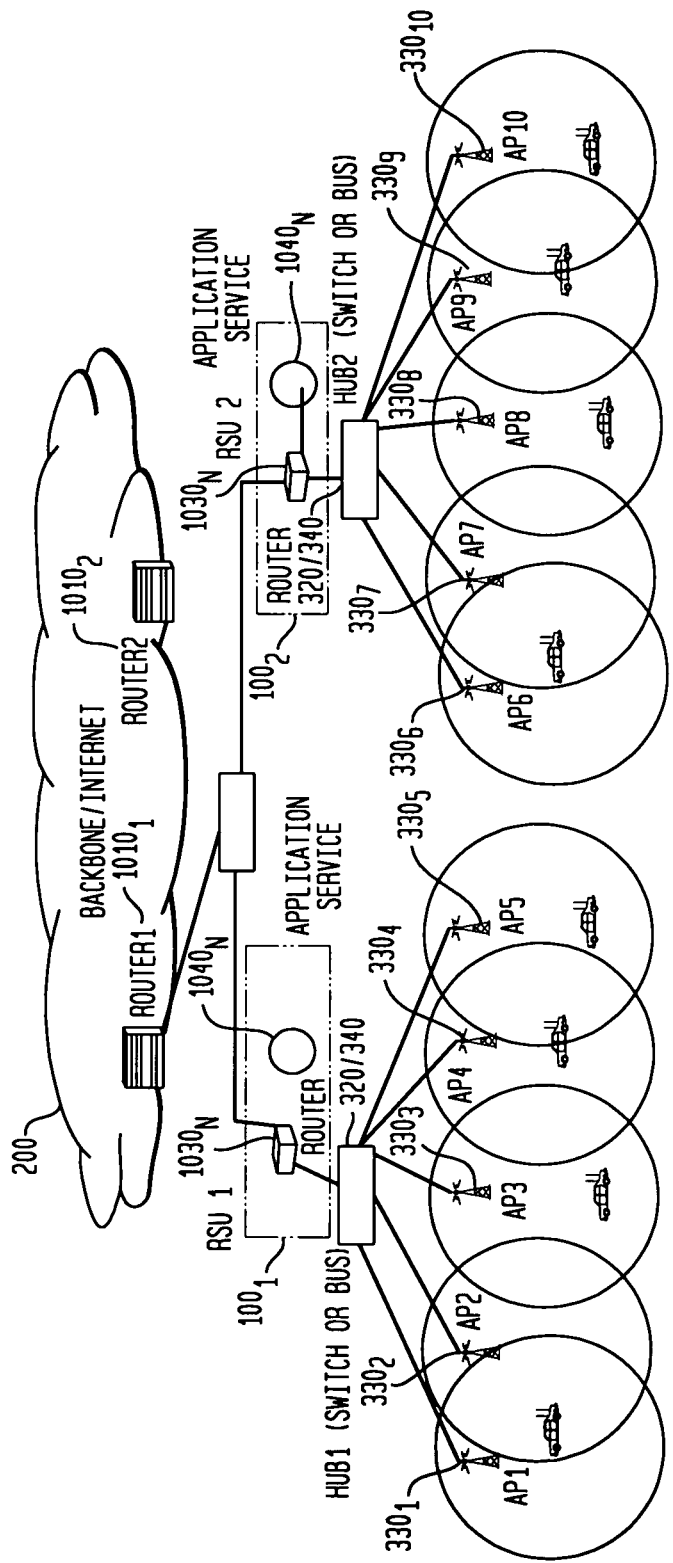
FIG. 10 illustrates a second example of an ad-hoc network with a roadside unit acting as an application server and a router in accordance with an embodiment of the invention.

FIG. 10 illustrates an example of an ad-hoc network with an RSU 100 functioning as both a router and application server. As depicted in FIG. 10, RSU1 100$_1$ and RSU2 100$_2$ each will have access to router 1010 and 1020 in the backbone 200. RSU1 100$_1$ and RSU2 100$_2$ consist of a router 1030 and application service 1040. Additionally, the network includes remote AP1-5 330$_{1-5}$ for RSU1 100$_1$ and AP6-10 330$_{6-10}$ for RSU2 100$_2$. FIG. 10 is similar to FIGS. 3B and 3C except that the RSUs 100 have router and application functions, instead of the only routing functions illustrated. Additionally, the depicted configuration in FIG. 10 illustrates that the hub can be either a switch 320 (as shown in FIG. 3B) or a bridge bus 340 (as shown in FIG. 3C). The selecting of either the switch 320 or bridge bus 340 will depend on several design factors, e.g., system engineering design parameters such as latency performance and capacity utilization and system requirements such as cost or services to be supported.

In another embodiment, the architecture depicted in FIGS. 4-7 can be modified to include the functionality of application server and router for the RSUs 100 by adding application service 1040 to the RSUs 100.

In an embodiment of the invention, RSUs 100 can be nodes within a LPG 115. The purpose of the LPG 115 is to build degrees of coordination among neighboring nodes. These neighboring nodes are moving devices or fixed stationary nodes with wireless communications capabilities. A moving wireless device or node can be a PDA, laptop, cell phone, or a moving vehicle with a wireless device either attached or embedded. In the preferred embodiment, the moving wireless device is a moving vehicle 110 with associated communications devices, which are installed in the vehicles, or independently brought into the vehicles, as well as pedestrians with communication devices. The wireless devices herein are collectively referred to any nodes or moving vehicles 110. Intra-LPG communication is used to communicate between nodes within immediate vicinity that have organized themselves a local peer group. Inter-LPG communication is used to communicate between nodes close neighborhoods, i.e., between nodes that belong to different local peer groups in the neighborhood.

There are several types of LPGs 115, stationary LPGs, dynamic LPGs, and hybrid LPGs. A stationary LPG is defined by a specific location or area, i.e., if a node is in an area defining, e.g., area A, the node is in LPG A. If a node is in different area, e.g., area B, the node is in LPG B and so on. The particular size of a stationary LPG is a design choice, depending on various factors, e.g., range of the radio antenna, communication range, number of moving devices, topology of the land, the environmental conditions, traffic patterns and population density. The location and size of the stationary LPG is fixed. However, each stationary LPG might be of a different size since traffic patterns and population (moving vehicles 110) density is different in different places. If an RSU 100 is within the predefined LPG 115, the radio range of the RSU 100 will define the size of the stationary LPG.

By using an RSU 100, a moving vehicle 110 will be able to detect the location of the stationary LPG by hearing either a heartbeat control packet 1700 from the RSU 100, or a beacon from the APs 330. The moving vehicles 110 will change stationary LPGs as the moving vehicles 110 change their position. Alternatively, a moving device will include a database of LPGs 115 and their locations. In another embodiment, if there are multiple RSUs 100 within a given area, at least one RSU 100 can provide information regarding the relative position or locations of other RSUs 100 in the neighborhood to facilitate handoff between multiple LPGs 115 by enabling the moving vehicle 100 to locate an LPG 115 quickly.

Stationary LPGs have a significant advantage of supporting integration with wireless infrastructure to provide backbone access or inter-LPG communication even when some LPGs 115 are empty or do not have many moving vehicles 110 within the LPG 115. Each stationary LPG is assigned a unique identifier to facilitate communication. Since every stationary LPG area is well defined, formations and naming the LPG 115 is easier than the dynamic LPG. Additionally, rules regarding merging and splitting an LPG 115 are not a concern when using a stationary LPG.

A second type of LPG 115 is a dynamic LPG. As opposed to a stationary LPG, a dynamic LPG is formed based upon the radio coverage of neighboring nodes so that a node can coordinate communications without worrying about exact location of the other nodes.

Since the dynamic LPG is formed based on radio coverage, moving vehicles 110, within the LPG 115 can always communicate with each other and to an RSU 100 via single or multiple-hop transmission. One node within the LPG 115 is able to control the size of the dynamic LPG, in order to keep the number of nodes within each LPG 115 or, alternatively, the number of radio hops from this node to the edge of the dynamic LPG reasonably small so that the communication can be performed efficiently with low latency. This node is called a group header (GH) as will be described later in detail. Additionally, in contrast with a stationary LPG, the dynamic LPG ensures that communication is always possible within each LPG 115. In a dynamic LPG, an LPG 115 can be formed outside the RSU 100 radio range, unlike with stationary LPGs.

In one embodiment, an ad-hoc peer-to-peer network can be created from one or more stationary LPG or one or more dynamic LPG. In another embodiment, the ad-hoc peer-to-peer network can be created from both stationary LPGs and dynamic LPGs as a hybrid LPG network. A Hybrid LPG network combines the benefits of the stationary LPG and dynamic LPG while removing the problems caused by each taken separately.

The hybrid approach would take advantage of the roadway topology. Specifically, when infrastructure is not available, a dynamic LPG is used to form the network. When infrastructure becomes available in some areas, a stationary LPG can be used to form the network with dynamic LPGs and infrastructure. For example, infrastructure, such as roadway infrastructure, would enable roadway-vehicle communication or roadway-assisted communication.

In one embodiment, the RSU 100 can be a node within the LPG 115 and perform similar network functions as the moving-vehicles 110. The RSU 100 can join an LPG 115 as either a Group Header (GH) 1300 node or a Group Node (GN) 1500. A GH 1300 is a moving device or node within the LPG 115 that is designated to maintain and control the LPG 115 without any ordering of the nodes or any infrastructure. Typically, there is only one GH 1300 within an LPG 115. All other nodes within the LPG 115 are a general node or a group node ("GN") 1500. The GN 1500 joins the LPG 115 through the GH 1500.

Each RSU 100 is capable of operating as a GH 1300 or GN 1500 in addition to a router and application server as described above. As such, each RSU 100 includes elements or means and networking protocols that allow the node to function or operate as a GH 1300 or GN 1500, respectively. Therefore, even when an RSU 100 operates as either a GH 1300 or GN 1500, all of the structural elements or means are present for both the GH 1300 and GN 1500, but only specific elements function based upon the mode of operation. An RSU 100 will therefore include both hardware and software to provide the functionality of a GH 1300 or GN 1500.

Figure 11:
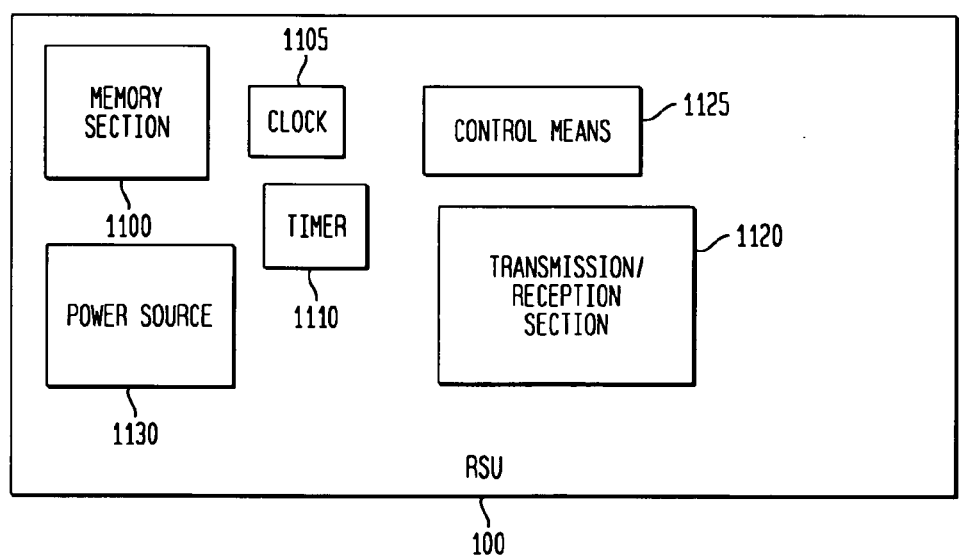
FIG. 11 is a block diagram of the roadside unit.

FIG. 11 illustrates a block diagram of basis elements of the RSU 100. The RSU includes a memory section 1100, a clock 1105, a timer 1110, a transmission/reception section 1120, a control means 1125 and a power source 1130. The memory section 1100 can be any type of memory including DRAM, SRAM or Flash. In a preferred embodiment, the short-term memory is cache. The memory section 1100 stores information regarding the LPG such as the GID 1705, Group Header ID 1710, the group listing, a predetermined maximum LPG size, the number of nodes in the LPG, and other types of control parameters.

The clock 1105 is used to maintain the timing for the RSU 100. Specifically, the clock 1105 functions as an internal clock and is used as a basis for setting a timer 1110. The timer 1110 is used to determine when to broadcast the various messages, i.e., determines a heartbeat interval (T) in the case of a GH 1300 or a reply message in the case of a GH 1300. The control means 1125 or microprocessor controls all of the processes of the RSU 100 including generation of the message, routing, and timer. Additionally, the control means 1125 is also responsible for header resolution, which will be described later in detail. The transmission and reception section 1120 in combination with the control means 1125 is responsible for creating or generating the message from data, which is stored in the memory section 1100.

The RSU 100 periodically transmits a beacon or heartbeat control packet 1700 to all moving vehicles 110 and other RSUs within the RSU's radio range. This period is a fixed interval. The value of the heartbeat interval (T) is selectable based on design or operational needs.

When an LPG 115 moves near an RSU 100, a GH 1300 is elected based upon header resolution protocols. A moving vehicle that is GH 1300 of an LPG 115 sends out a heartbeat control packet 1700 on both the V-V and V-R channels. The RSU 100 acting as a GH 1300 as well only sends out its heartbeat on the V-R channel. When more than one GH 1300 sends a heartbeat control packet 1700, e.g., GH 1300 from LPG 115 and RSU 100, header resolution occurs. This is to avoid having multiple GHs 1300 within the same LPG 115, since multiple GHs 1300 in the same LPG 115 will result in redundant (potentially even confusing) control signals being transmitted or broadcast within the LPG 115 and waste bandwidth and capacity. Header resolution functions to select one GH 1300 from at least two GHs.

Figure 12:
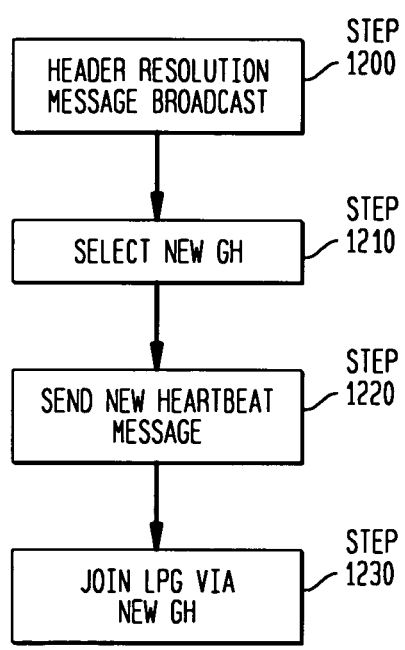
FIG. 12 is a flow chart of the header resolution method in accordance with an embodiment of the invention.

FIG. 12 illustrates the header resolution method. At step 1200, both the GH 1300 of the LPG 115 and the RSU 100 generate a header resolution message, upon receipt of each other's heartbeat control packet 1700. This informs the RSU 100 and any GH 1300 to operate in header resolution mode. A new GH is selected based upon a pre-determined selection criterion, as step 1210. In a preferred embodiment, an RSU 100 will be selected as the new GH. The RSU 100 will then send a new heartbeat control packet 1700 to any node within radio range indicating that the RSU 100 is the GH 1300, at step 1220. The heartbeat control packet 1700 is once again sent via the V-R channel. The other nodes will join the LPG 115 via the RSU 100, at step 1230.

Figure 13:
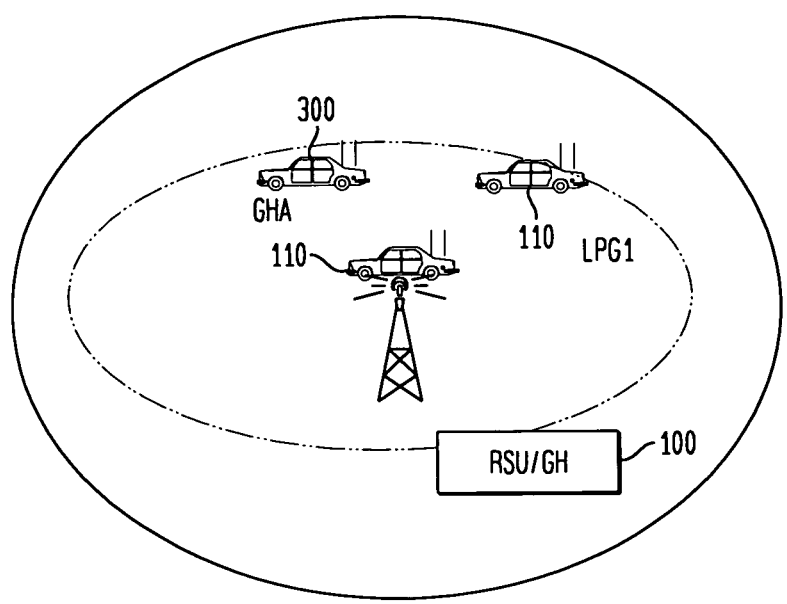
FIG. 13 illustrates an example of a dynamic Local Peer Group having a roadside unit as its group header.

FIG. 13 illustrates the formation of an LPG 115 with an RSU 100 when a dynamic LPG comprising only moving vehicles 110 moves in proximity to the RSU 100. In the dynamic LPG case, a LPG 115 can be formed outside the RSU 100 coverage area 1310. A GH 1300 is selected initially from at least one moving vehicle 110. When the LPG 115 moves inside the RSU radio range, the RSU 100 joins the LPG 115. The RSU 100 initially acts as a GH 1300 and sends out a heartbeat control packet 1700. Header resolution will occur between RSU 100 and GHA 1300$_A$. In the preferred embodiment, the RSU 100 has priority over GHA 1300$_A$ and would become the only GH 1300 for the LPG 115.

When a LPG 115 moves in proximity to multiple RSUs 100, e.g., linked RSUs 100 or RSU group 600, only one RSU 100 will be the GH 1300. The other RSUs become GN 1500. Again header resolution occurs and selection RSU GH can be based on pre-defined priority or by some hash function of the RSU IP addresses or by the seniority of the GH 1300 (e.g., the ages of the GHs are compared and the GH with the highest age is selected as the winning GH).

One RSU 100 can be in more than one LPG 115. Typically, each LPG 115 can have one RSU 100 in it which will be acting as the GH 1300. One RSU 100 can also become GH 1300 for multiple LPGs 115 within its coverage. Other RSUs in the same LPG 115 could become GNs 1500.

In an embodiment, multiple LPGs 115 having the same GH 1300, i.e., RSU 100 can be kept as separate LPGs with the same RSU 100. Alternatively, the multiple LPGs can merge together to form one larger LPG 115. If the size of the LPG 115 exceeds the maximum size limit, the LPG splits into two separate LPGs.

In the stationary LPG case, LPGs 115 do not exist outside the radio range of the RSU 100. Therefore, the LPG is defined by the RSU location. A moving vehicle would join the LPG as a GN via the RSU 100. The RSU 100 would automatically be the GH. The RSU GH would be known apriori, discovered through other RSUs 110 or discovered through receipt of the RSU GH heartbeat control packet 1700. With stationary LPGs, there is no need for header resolution between an RSU 100 and a moving vehicle since the moving vehicles 110 do not form LPGs themselves, and therefore, no GH, outside the RSU radio range.

Figure 14:
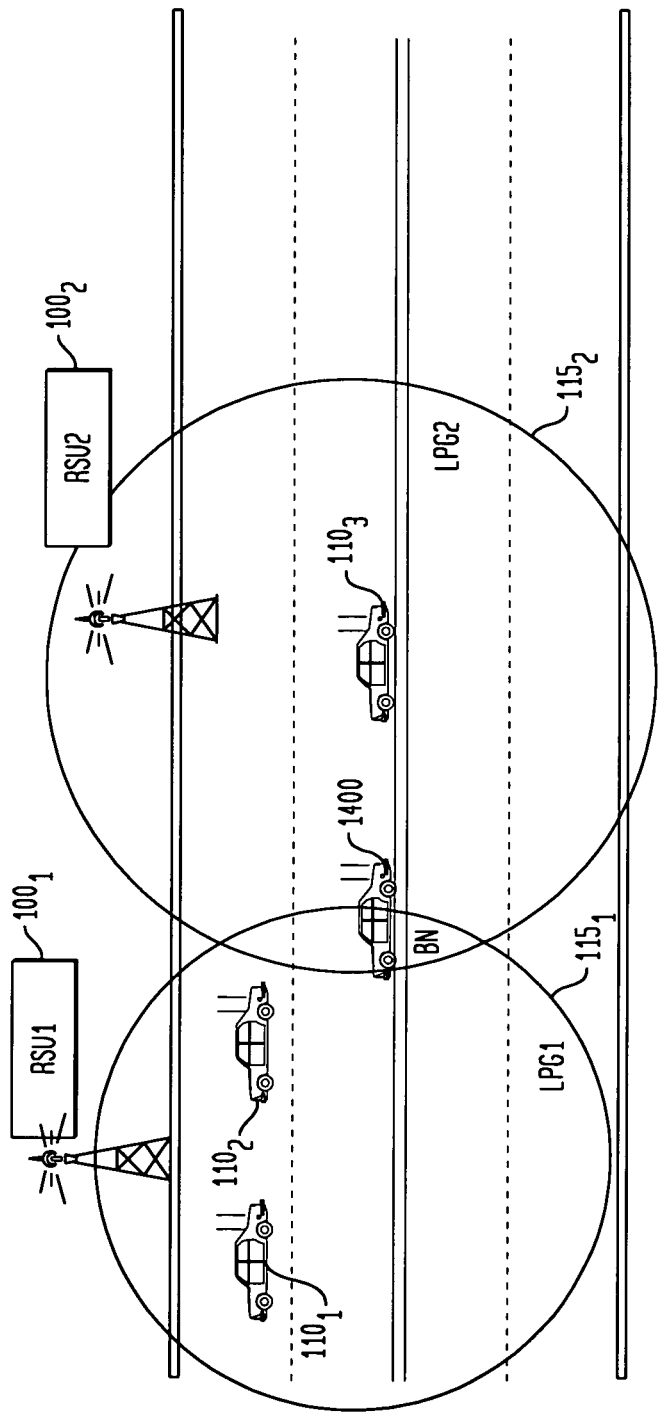
FIG. 14 illustrates an example of a two stationary Local Peer Group, each having a roadside unit as its group header.

FIG. 14 illustrates the formation of two stationary LPGs 115. As depicted, RSU1 100$_1$ and RSU1 100$_2$ each have a predefined radio range. When moving vehicles 1 and 2 (110$_1$ and 110$_2$) move within radio range, the vehicles (110$_1$ and 110$_2$) join LPG1 115$_1$ vian RSU1 100$_1$. Similarly, moving vehicle 3 110$_3$ joins LPG2 115$_2$ vian RSU2 100$_2$. Vehicle BN 1400 can hear multiple RSUs 100$_1$ and 100$_2$ and becomes a boundary node between the two LPGs. The boundary node acts as the inter-LPG relay point. In this case, vehicle BN 1400 can choose which LPG (LPG1 115$_1$ and 115$_2$) to join.

In the case of a hybrid LPG, the RSU 100 demarks the stationary LPG location. The location of the RSU 100 is known and, therefore, the location of the stationary LPGs are known. When outside of the stationary LPG area, moving vehicles 110 form a dynamic LPG having a GH 1300 that is a moving vehicle 110. When one or more nodes within the dynamic LPG come(s) into contact with an RSU 100, the entire LPG joins the stationary LPG and, in the preferred embodiment, becomes GNs 1500 with the RSU 100 as the GH 1300.

In one embodiment, intra-LPG communication will occur using the V-V channel between the dynamic LPG members. Inter-LPG communication will be between members of different dynamic LPGs and the RSU 100 using the V-R and V-V channels.

In another embodiment, the RSU 100 can join the LPG 115 as a GN 1500. In this embodiment, header resolution between a moving vehicle GH 1300 and an RSU 100 will result in the vehicle GH 1300 being selected as the new GH for the LPG 115.

Figure 15:
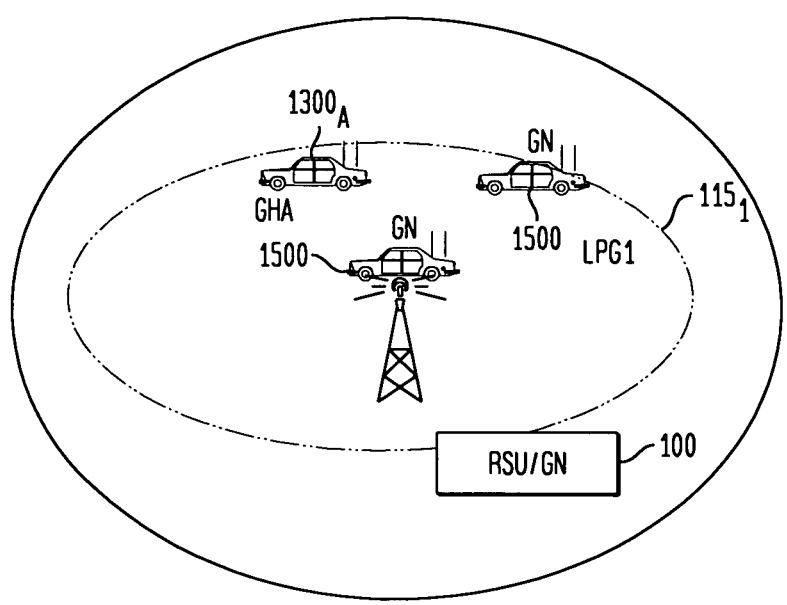
FIG. 15 illustrates an example of a dynamic Local Peer Group having a roadside unit as a group node.

FIG. 15 illustrates the formation of an LPG1 115$_1$ with an RSU 100 when a dynamic LPG comprising only moving vehicles 110 moves in proximity to the RSU 100. A GH 1300 is selected initially from at least one moving vehicle 110. As depicted in FIG. 15, the GH 1300 is GHA 1300$_A$. When the LPG 115 moves inside the RSU radio range, the RSU 100 joins the LPG 115 to form LPG1 100$_1$. The GHA 1300$_A$ initially acts as a GH 1300 and sends out a heartbeat control packet 1700. Header resolution will occur between RSU 100 and GHA 1300$_A$. In accordance with this embodiment, GHA 1300$_A$ has priority over RSU 100 and would become the only GH 1300 for the LPG1 115$_1$. The dashed line in FIG. 15 represents the new LPG. RSU 100 would join the LPG1 115$_1$ as RSU GN 1500.

When LPG1 115$_1$ comes into contact with other RSUs 100, all RSUs 100 become GN 1500 of LPG1 115$_1$. If the maximum size for the LPG 115 is reached, the LPG will split into more than one LPG. In the stationary LPG case, LPGs do not exist outside the radio range of the RSU 100. Therefore, the LPG 115 is defined by the RSU location. A moving vehicle 110 would join the LPG 115 as a GH 1300. The RSU 100 would be a GN 1500 within the LPG 115. The RSU GH would be known apriori, discovered through other RSUs 110 or discovered through receipt of the RSU GH heartbeat control packet 1700. With stationary LPGs, there is no need for header resolution between an RSU 100 and a moving vehicle 115.

Figure 16:
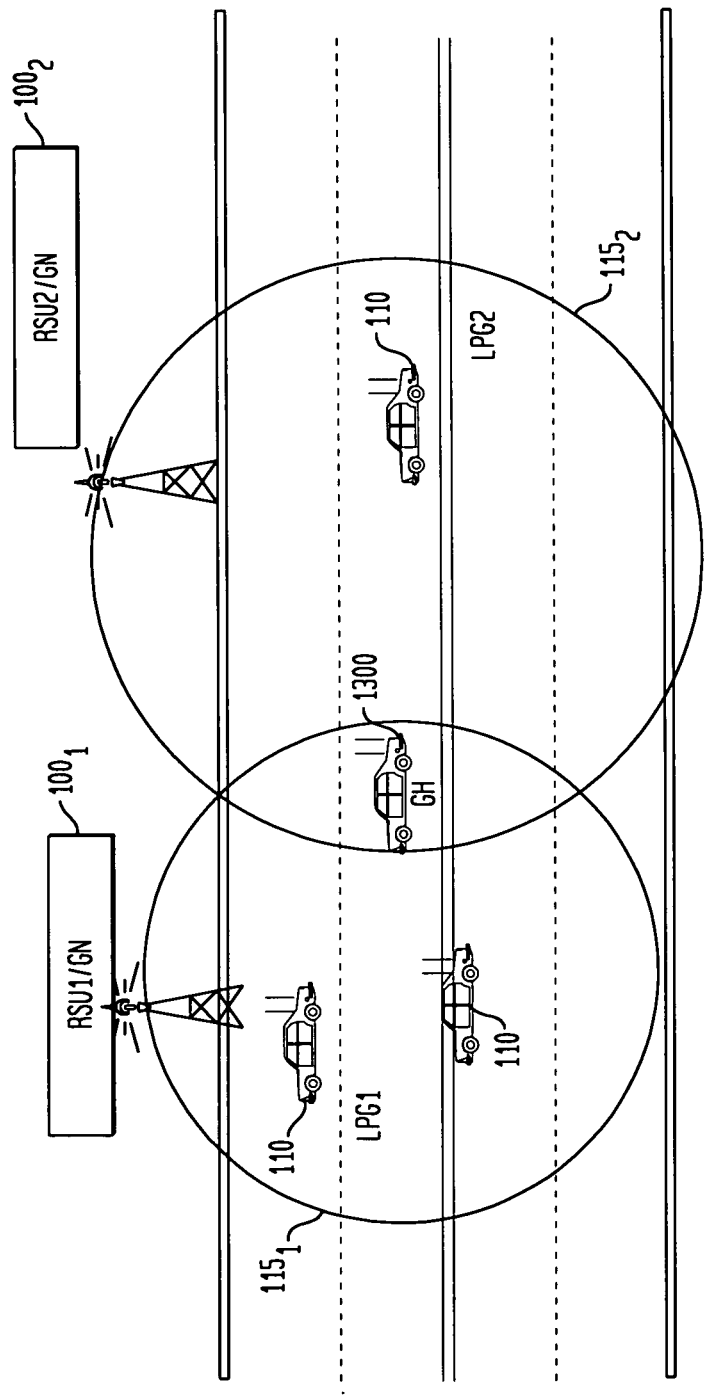
FIG. 16 illustrates an example of a two stationary Local Peer Group, each having a roadside unit as a group node.

FIG. 16 illustrates the formation of two stationary LPGs 115 where the RSUs 100 become the GNs 1500. As depicted, RSU1 100$_1$ and RSU2 100$_2$ each have a predefined radio range. Only the GH 1300 periodically sends out a heartbeat control packet 1700 to maintain the formation of an LPG 115. GNs 1500 will set a timer to wait for the next heartbeat control packets 1700. In this case, a moving-vehicle GH 1300 periodically sends out heartbeat control packet 1700. When each RSU 100 (acting as a GN) receives the heartbeat control packet 1700 (i.e., within the radio range of the GH), it will set a timer to wait for the next heartbeat control packet 1700. If the heartbeat control packet 1700 is not received within the HB period, then one of the GNs 1500 takes over the GH functions for the LPG 115. When there is more than one GH 1300 within a local vicinity, a GH will hear heartbeat control packets 1700 for the same LPG 115 which it did not originate. In this case, only one GH 1300 should be selected to maintain the LPG 115 in the local vicinity. The header resolution procedure is used among competing GHs to select the winning GH.

After formation, the GH 1300 (moving vehicle) sends out the heartbeat control packet 1700 on the V-V and V-R channels. All GNs 1500 forward the heartbeat control packet 1700 on the V-V and V-R channels. If the heartbeat control packet 1700 is heard, a node, whether moving vehicle or RSU 100, joins the LPG 115 via a join message.

In another embodiment, the RSU 100 can join a LPG 115 as a special relay node (RYN). The RSU 100 will join the LPG via the GH 1300. The GH 1300 will add the RSU 100 to a membership list as a special node. The RYN, i.e., special relay node would only be used for vehicles in the LPG 115 as a backup path, or as a path for duplicate streams or multipath streams. In this case the RYN is part of the LPG 115 but does not relay all messages, or actively participle in all formation or organizational control messages. Thus, as LPGs move in and out of RSU 100 areas, the LPG structure can be maintained. A RYN can have a special status indicator showing its ability or willingness to be used as a relaying node. This special status indicator can be used to control the load on the RSU 100 and avoid major bottleneck. If the load on the RSU 100 is high, a bottleneck will occur. When the load on the RSU 100 is high, the RSU 100 will cause the special status indicator to indicate that the RSU 100 is not willing to be a relaying node. Therefore, the RSU 100 or RYN can remain in the routing table 2300 but may not be always active. In one embodiment, the RSU 100 or RYN can proactively broadcast the special status indicator to all nodes within its radio coverage range. The node will update the routing table 2300 to include the status of the RSU 100 or RYN, i.e., the routing table 2300 will include an additional entry for status, active or not.

In another embodiment of the invention, the status indicator can include a parameter for selectively determining which type of packets can be routed by the RSU 100 or RYN. For example, the RSU 100 might only be able to relay multicast packets but not unicast packets. The RSU 100 or RYN can proactively broadcast the status indicator with the type of packet information to all nodes within its radio coverage range. All nodes will update the routing table 2300 to include the type of information that the RSU 100 or RYN, i.e., the routing table 2300 will include an additional entry for type, unicast, multicast or broadcast. A node, whether it is an RSU 100 or moving vehicle 110, whether acting as a GH 1300 or GN 1500 can be used to route a message. There are two main types of routing: unicasting and multi-casting.

Unicasting

The unicast routing protocol is based upon creating a routing table 2300 within each node. The routing table 2300 includes at least a destination and a next hop for messages or packets. All moving vehicles 110 in an LPG 115 perform routing functions and help other vehicles to communicate with either a single hop or a multi-hop. The intra-LPG routing table 2300 is constructed by exchanging control packets in a broadcasting mode using LPG formation messages. No additional control messages are needed for unicast routing. The same control packets that are used for LPG 115 formation is used for creating, maintaining and updating the routing table 2300 for the routing protocol. The routing table 2300 is used for intra-LPG routing. The LPG identifier is embedded in every control packet to prevent propagating foreign control packets to unnecessary nodes. All foreign control packets will be terminated or not relayed.

The control packet messages are the heartbeat (HB) from the GH 1300 and the membership report (MR) from GN 1500. The heartbeat control packet 1700 defines the region of an LPG.

Figure 17:
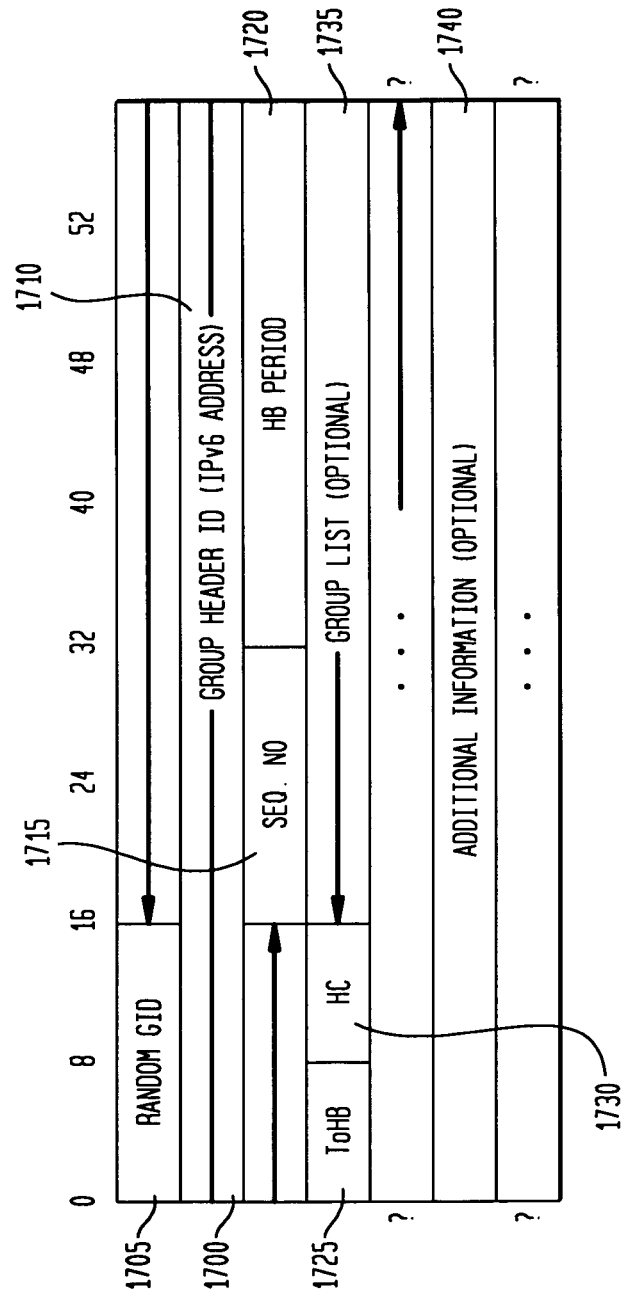
FIG. 17 illustrates an example of a heartbeat control packet used for forming a Local Peer Group and generating a unicast routing table 2300 in accordance with an embodiment of the invention.

FIG. 17 illustrates an example of the format for the heartbeat control packet 1700. The heartbeat control packet 1700 includes a unique identifier that includes both a LPG identifier or GID 1705 and the Group Header ID 1710.

A GID 1705 and the Group Header ID 1710 identify each LPG 115. There are several possible formats for the GID 1705. In an embodiment, the GID 1705 can be an identification number randomly selected for the LPG 115. Alternatively, the GID 1705 can be an identification number assigned based upon an order of formation of the LPG. For example, the first LPG can have the GID 1705 of LPG1, the second would be LPG2 and so on. However, as the GH 1300 changes, the GID 1705 would change as well, and would result in a node not being able to tell if its LPG changes or just the D for the LPG 115. On the other hand, the GID 1705 can be fixed to the original ID when a GH leaves. However, this might lead to GID 1705 duplication when a single LPG splits. Two or more groups will have the same GID 1705. In an embodiment the GID 1705 is encoded based upon both LPG ID and GH ID numbers to uniquely identify the LPG 115.

A GH 1300 is given a Group Header ID 1710. Initially, the GID 1705 is tied to the Group Header ID 1710. Therefore, the Group Header ID 1710 initially is used as a portion of the GID 1705, but as the GH changes, the GID 1705 changes to include the new Group Header ID 1710. Each GH is assigned a Group Header ID 1710. The Group Header ID 1710 is assigned based upon a (public or private) IP address. As depicted in FIG. 17, the Group Header ID 1710 is an IPv6 IP address. In another embodiment, the Group Header ID 1710 can be an IPv4 address.

The heartbeat control packet 1700 also includes a sequence number (Seq. No.) 1715. The Seq. No. 1715 is used to track the order of the heartbeat control packet 1700 to determine if a received heartbeat control packet 1700 is new or fresh. A GN 1500 remembers the Seq. No 1715 of the received heartbeat control packet 1700. A new or fresh heartbeat control packet 1700 is indicated by a first heartbeat control packet 1700 with the next Seq. No. 1715. The sequence number 1715 is also used to determine which heartbeat control packet 1700 should be relayed (to the next hop nodes), i.e., a first come relay only (FCRO) strategy can be used. Only new (i.e., fresh) heartbeat control packets 1700 should be relayed. A node remembers the previous sequence number and then compares the incoming sequence number of the heartbeat control packet 1700 to determine if the heartbeat control packet 1700 is new or fresh. If the Seq. No. 1715 of the heartbeat control packet 1700 with the proper GID 1705 is greater than the currently stored sequence number, it is a new or fresh heartbeat control packet 1700 and is then relayed when FCRO is used. The sequence number previously stored in the GN will be discarded and replaced with the new Seq. No. 1715.

The heartbeat control packet 1700 further includes information regarding the heartbeat period (HB period) 1720. This period is a fixed interval (T). The value of the interval (T) is selectable based on design or operational needs. The HB period 1720 indicates to all GNs 1500 when the next heartbeat control packet 1700 will be broadcast. If a GN 1500 does not receive a heartbeat control packet 1700 within the HB period 1720, the GN 1500 will transmit a new heartbeat control packet 1700 such that a heartbeat control packet 1700 is continuously transmitted. If the original GH 1300 is still in the LPG 115, then header resolution will occur. To reduce the control overhead, the GH 13 can adjust the HB period 1720. The adjustment can be based upon, size of the LPG, location, load, speed and number of nodes within the LPG.

The heartbeat control packet 1700 will also include the type of heartbeat control packet 1700, e.g., heartbeat with complete group list, incremental group list or no group list. In one embodiment, the heartbeat control packet 1700 will include a complete group list in every packet. Using a complete group list is the most accurate way to control routing and maintain a correct list of group members; however, there is a significant amount of bandwidth needed for the heartbeat control packet 1700 with a complete group. The heartbeat interval (T) can be adjusted to reduce the control overhead. In another embodiment, every n-th heartbeat control packet 1700 will include a complete group list. For example, each third heartbeat control packet 1700 includes a complete group list. This will reduce the bandwidth for the average heartbeat control packet 1700. However, since most of the nodes within the LPG 115 are moving at a rapid pace, the received group list might be stale. In other words, by the time the new group list is received by a node, several members of the group might be in another LPG 115. In another embodiment, a progressive or incremental group list can be distributed. A group list will only be distributed when there is a change in the membership in the group list. Progressive or incremental group lists may also suffer from a stale membership list. Alternatively, the type of heartbeat control package 1700 can be a hybrid group list update. A progressive group list can be included in the heartbeat control packets 1700 when there is a change in membership and additionally a complete group list can be included every n-th heartbeat control packet 1700. ToHb 1725 will indicate the type of heartbeat control packet 1700. The type of heartbeat control packets 1700 is influenced by the topology change rate of the LPG 115 and frequency of broadcast of the heartbeat control packet 1700. As the topology change rate of an LPG 115 increases, there is a greater need for a complete group list being included in all heartbeat control packets 1700. As the frequency of broadcast of the heartbeat control packet 1700 increases, the need for a complete group lists being included in all heartbeat control packets 1700 decreases.

The heartbeat control packet 1700 will include the hop count (HC) 1730 from the GH. Initially, the HC 1730 is set at a predetermined value, e.g., 1. Every time the heartbeat control packet 1700 is relayed by a node, the relay node increases the HC 1730 value by 1, i.e., HC=HC+1. The HC value can be used to limit the LPG size, to indicate the staleness of the information within the heartbeat control packet 1700 and to control routing of the control packets to reduce overhead. For each LPG, there is a maximum hop count for routing, e.g. 10. Once the HC 1730 is incremented to the maximum hop count, the control packet, e.g., the heartbeat control packet 1700 will not be relayed.

The usage of a maximum hop count, HC 1730 and Seq. No. 1715 prevent the infinite duplications of flooding of the control packet within the LPG 115. Flooding is a packet delivery method where packets are delivered using all nodes within a group. Flooding generates an unnecessary number of duplicate relays when the network density is high. Each and every node within a network participates in the flooding packet relay and each node relays these packets onto all of its links.

The hop count can also be used for a relay strategy. In an embodiment, the heartbeat control packet 1700 can be relayed if the heartbeat control packet 1700 has the shortest hop count. This method will guarantee the correct hop count, however, there will be a waiting delay. Since the node has to determine the shortest hop count for the heartbeat control packet 1700, the node has to wait until the node receives the heartbeat control packet 1700 from all upstream nodes before the node relays the heartbeat control packet 1700. Accordingly, a combined relay strategy can be implemented using both the shortest hop count and first come relay only strategy set forth above. A heartbeat control packet 1700 will be relayed using the first come relay only strategy until a node receives a shorter hop heartbeat control packet 1700. When a node A forwards the heartbeat control packet 1700 it will include its ID information in the message so that next hop nodes know who relayed the heartbeat control packet 1700. The node forwarding the packet (node A) also then becomes the MR relay node (to send the MR 1800 towards the GH 1300) for next hop nodes, which received the heartbeat control packet 1700 from node A.

As set forth above, a heartbeat control packet 1700 can also include a Group List 1735. A Group List 1735 can include information regarding the members of the LPG 115, such as the number of members in the LPG 115, IP addresses for each number, the hop count from the GH, and a classification.

A classification can be a code that references a relative direction from the GH node, e.g., uplink, downlink and peer. A peer classification indicates that a node is within the same wireless coverage area from the GH, i.e., all of the peer nodes have the same hop count from the GH. Upstream nodes are determined by the heartbeat control packet 1700. Downstream nodes are determined based upon a membership report (MR). Upstream transmission represents communication towards the GH 1300 and downstream transmission represents communication away from the GH 1300. This classification is a relative term. Each GN 1500 can classify its neighbors into three different classes. If the membership report of another GN has 1 less hop count (HC) than the HC of the GN, the GN is an upstream node. If the HC 1700 is the same with its own HC 1700, the GN 1500 is a peer. If the HC 1700 is 1 greater than its own HC 1700, the GN is a downstream node.

Figure 18:
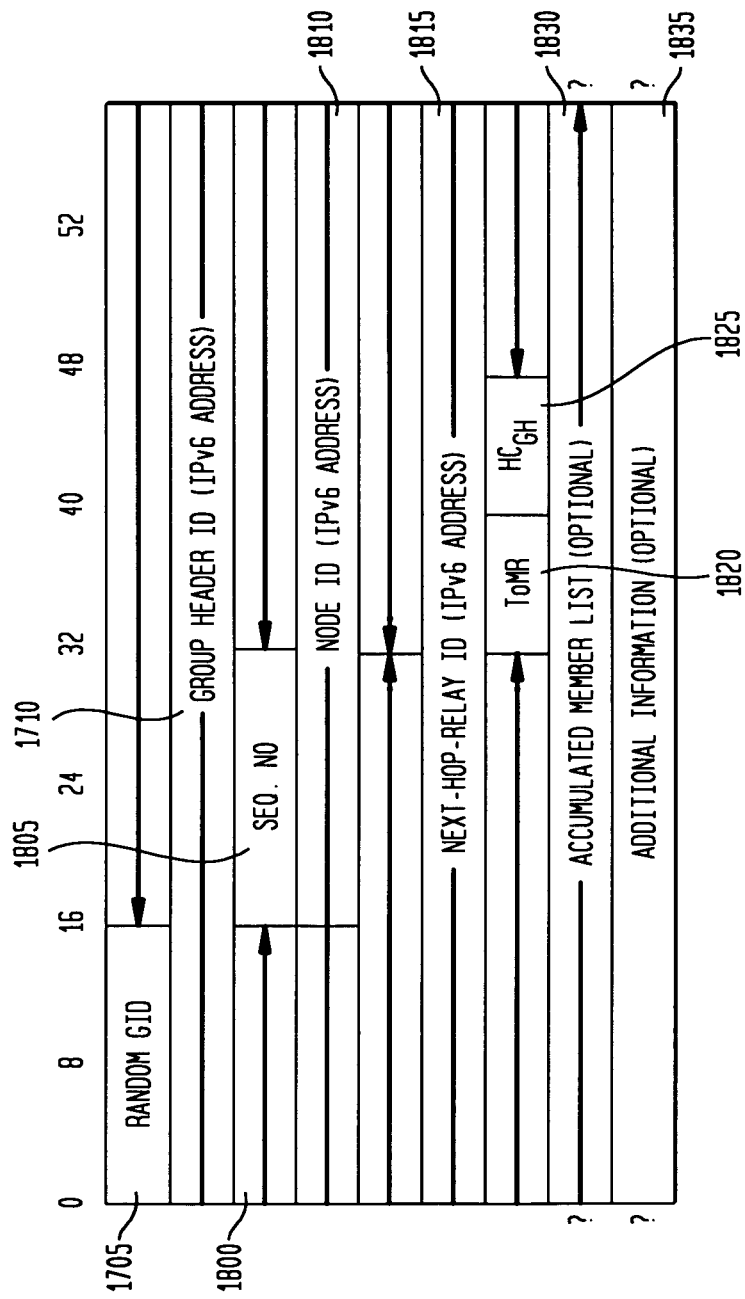
FIG. 18 illustrates an example of a Membership Report packet used for forming a Local Peer Group and generating a unicast routing table 2300 in accordance with an embodiment of the invention.

FIG. 18 illustrates a membership report (MR) 1800. An MR 1800 is a control packet broadcast by the GN 1500 for receipt by the GH 1300. The MR 1800 includes collectable routing information such as a membership list, downstream node identifications and next hop for downstream nodes. An MR 1800 includes some of the same information as the heartbeat control packet 1700: the GID 1705 and the Group Header Id 1710. The MR 1800 will also include an MR Seq. No 1805. The MR Seq. No. is similar to the Seq. No for the heartbeat control packet 1700 and is used to maintain order of the MR's. The MR. Seq. No. 1805 is the MR order for one particular node. Typically, the MR Seq. No. 1805 has the same value with the Seq. No. 1715 of the heartbeat control packet 1700 that triggered the MR 1800.

The Node ID 1810 of the originating node is also included in the MR 1800, i.e., node that generated the MR 1800.

The MR 1800 also includes Next-hop relay ID 1815. The Next-hop relay ID 1815 is relay instructions for the MR 1800 towards the GH 1300. The next hop information is determined directly from the received heartbeat control packet 1700. When a node receives a new or fresh heartbeat control packet 1700, it recovers the previous relaying node's identification from the IP layer and MAC layer before any packet processing. The previous relaying node's identification is stored in memory and used as the Next-hop relay ID 1815 for the MR 1800. When a node forwards a heartbeat control packet 1700, the node includes its ID in the packet. The receiving next hop node will store this ID when the node receives a new or fresh heartbeat control packet 1700, as the next hop relay ID to reach the GH 1300. A new or fresh heartbeat control packet 1700 is the one which has a newer sequence number with lowest HC.

The MR 1800 also includes a "Type of MR indicator" ToMR 1820. There are two types of MRs 1800: a single member and aggregated multiple member report. A single member MR only includes an MR 1800 from the originating node. An aggregated multiple member report includes the MR 1800 of more than one node. The aggregate report can be used to reduce the overhead and bandwidth needed for control packets. One MR 1800 is sent containing multiple MRs.

Additionally, the MR 1800 can include a Hop count from the GH ($HC_{GH}$) 1825. ($HC_{GH}$) 1825 is the HC value from the GH 1300 to the originating node of the MR 1800. In another embodiment, the MR 1800 can include an accumulated membership list 1830 and other additional information 1135. The accumulated membership list 1830 will include the IP address of the member of the LPG, number of members and corresponding hop counts.

The MR 1800 can be delivered or relayed to the GH 1300 using a reverse path or reverse flooding method. A reverse path method relays the MR 1800 towards the GH 1300 using the same path that was used for relaying the heartbeat control packet 1700. When an MR 1800 is relayed, the relaying node replaces the NEXT-Hop Relay 1815 with its next hop towards the GH. Only the node that has the corresponding ID relays the MR 1800 packet. This method assumes symmetry in transmission. If asymmetry links are present, the Reverse flooding method is used, i.e., every node between the originating node and the GH 1300 relays the MR 1800.

Each node uses both the heartbeat control packet 1700 and the MR 1800 to create a routing table 2300 which can be used as a forwarding table for LPG based routing. In the preferred embodiment, each heartbeat control packet 1700 includes a complete group list and is responded to, with MR 1800, by all GNs 1500 within the LPG 115. The heartbeat control packet 1700 is relayed using a first come relay only method and the MR 1800 is relayed towards the GH 1300 using the reverse path method as a single MR.

Figure 19:
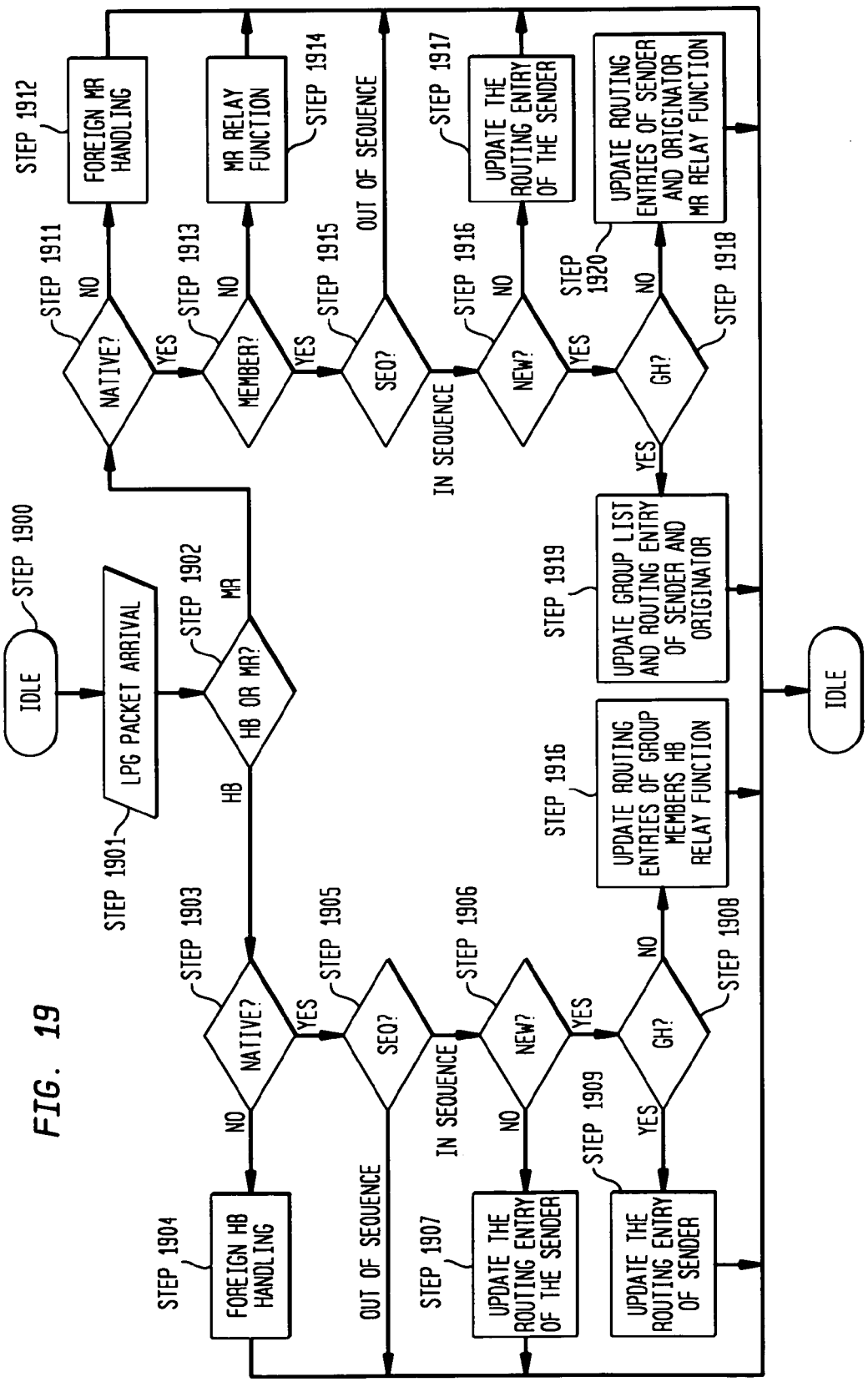
FIG. 19 is a flow chart for generating and maintaining a unicast routing table 2300.

FIG. 19 illustrates the LPG based routing method for a unicast message. Initially, each node is idle step 1900. When a packet arrives, step 1901, the node determines whether the packet is a heartbeat control packet 1700 or an MR 1800, at step 1902. Depending on the type of control packet, the node performs special packet processing. If the control packet is a heartbeat control packet 1700, the node processes the packet starting with step 1903. The node determines if the packet is native, step 1903. A packet is native if the packet is for the same LPG 115, i.e., the packet has the same GID 1705. The node will compare the GID 1705 with the group identification stored in memory. If the GID 1705 does not match the identification stored in memory, the node will initiate Foreign HB handling, at step 1904. Typically, foreign HB handling will result in the node ignoring the packet. If the GID matches the identification stored in memory, the node will then determine if the heartbeat control packet 1700 is in sequence. The node will compare the Seq. No. 1715 with the sequence number in memory. If the Seq. No. 1715 is less than the value stored in memory, the node will ignore the packet, at step 1905. If the Seq. No. 1715 is greater than the value stored in memory, the heartbeat control packet 1700 is in sequence and the node will then determine if the heartbeat control packet 1700 is new, at step 1906 by comparing the current sequence number to the last stored sequence number. If the node determines that the message is not new, only the routing entry of the sender is updated, step 1907. The heartbeat control packet 1700 is not relayed. If the node determines that the message is new, then depending on whether the node is a GH 1300 or GN 1500, the node will perform one of two functions. The determination of the node type is performed at step 1908. If the node is a GH 1300, then the node will update the routing entry of the sender, at step 1909. The heartbeat control packet 1700 is not relayed and the node will become idle 1900. However, if the node is a GN 1500, then the node will update the routing table 2300 for all group member entries and relay the heartbeat control packet 1700, at step 1910. Updating the routing table 2300 will be described later in greater detail.

If the control packet is an MR 1800 the node processes the packet starting with step 1911. The node determines if the packet is native, step 1911. The node will compare the GID 1705 with the group identification stored in memory. If the GID does not match the identification stored in memory, the node will initiate Foreign MR handling, at step 1912. If the GID matches the identification stored in memory, the node will then determine if the node that sent that MR 1800 is a member of the LPG 115. The node will compare the Node ID 1810 with a membership list stored in memory. If there is no match, then the node will only relay the M 1800, at step 1914. The MR will be relayed so that a new group node can join the LPG without having to wait for a complete heartbeat cycle. If the node that sent the MR 1800 is not listed in the join list, the node can be considered a joining node. There are no routing entries in the routing table 2300 for a joining node. In one embodiment, the node can forward the MR 1800 towards the GH 1300. The node will not update any entry in the routing table 2300. In another embodiment, the node can add the originating node (of the MR) to the destination list, i.e., reserve a routing entry for the originating node. The node can save the relaying node information as the next hop and when the new heartbeat control packet 1700 is received with the originating node as a member, the node can automatically update the routing table 2300 with the information already stored in memory. When the new routing entry is finalized, the originating node can be classified as a downstream node.

If there is a match, then the node will determine if the MR 1800 is in sequence, at step 1915. The node will compare the MR Seq. No 1805 with the sequence number in memory. If the MR Seq. No 1805 is less than the value stored in memory, the node will ignore the packet and become idle 1900. If the MR Seq. No 1805 is greater than or equal to the value stored in memory, the MR 1800 is in sequence and the node will then determine if the MR 1800 is new, at step 1916 by checking whether the node has already received the MR 1800 from the originator with the current sequence number (by comparing with the last stored sequence number). If the node determines that the message is not new, only the routing entry of the sender is updated, step 1917. The MR 1800 is not relayed. If the node determines that the message is new, then depending on whether the node is a GH 1300 or GN 1500, the node will perform one of two functions. The determination of the node type is performed a step 1918. If the node is a GH 1300, then the node will update the routing entries of the immediate sender and originator, at step 1919. The MR 1800 is not relayed and the node will become idle 1900. However, if the node is a GN 1500, then the node will update the routing table 2300 for sender and originator and relay the MR 1800, at step 1920. Updating the routing table 2300 will be described later in greater detail.

Figure 20:
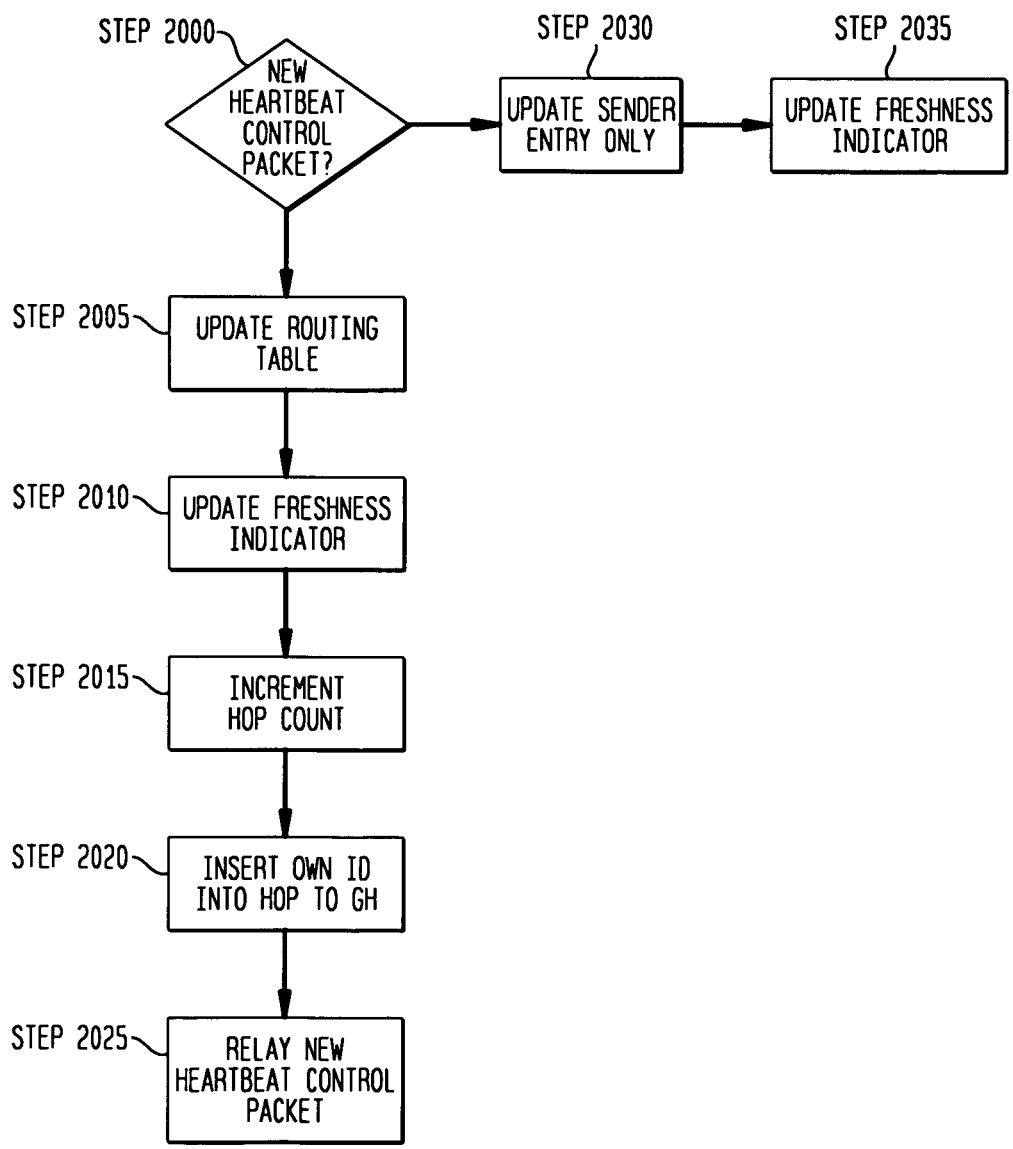
FIG. 20 is a flow chart for the process of routing a unicast packet in accordance with an embodiment of the invention.
Figure 21:
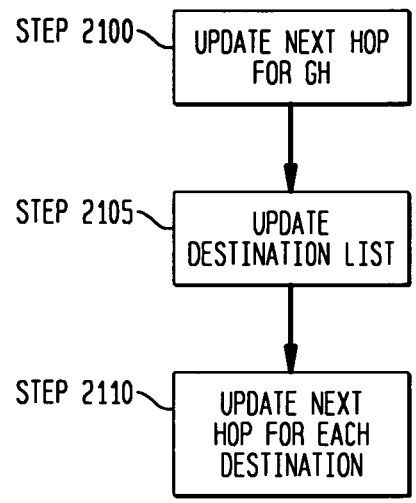
FIG. 21 is a flow chart for the process of updating the unicast routing table 2300.

FIGS. 20-21 illustrate the method of updating the routing table 2300 when the node receives a heartbeat control packet 1700. If the node receives a fresh heartbeat control packet 1700, at step 2000, then the routing table 2300 is updated, at step 2005. When a fresh heartbeat control packet 1700 is received, a node can determine where the packet came from, i.e., immediate relay node. The relay node is the next hop for the GH. The node updates the next hop for GH value, at step 2100. Next, the node will add or update the destination list, at step 2105. The destination list is a list of all members of the LPG 115. The process includes removing routing destination for ex-members of the group and inserting routing entries for new members. The node will then set the next hop for all destinations as the GH 1300, at step 2110. The GH 1300 is initially the next hop for all destinations. The next hop will change as more information regarding the LPG 115 becomes available. The node will then update the freshness indicators for the information at step 2010. Specifically, the node will reset the timer for keeping track of the heartbeat control packets. The node will also store the sequence number in memory, and discard stale information. The node will then increment the hop count by 1, at step 2015. Additionally, before the node relays the heartbeat control packet 1700, the node will insert its own IP address into the packet as the next hop to GH, at step 2020. The node relays the message after the packet processing described in steps 2000-2020, at step 2025.

If the node receives a duplicate heartbeat control packet 1700, at step 2000, only the immediate senders' entries in the routing table 2300 are updated, at step 2030. The update includes the update process described in FIG. 21 at steps 2100-2110. Additionally, the freshness indicators are also updated at step 2035.

Whenever a fresh MR 1800 is received, the node modifies the routing table 2300 using information from the MR 1800. The MR 1800 provides additional routing information resulting in better routing route. Each node can hear the MR from all downstream, one-hop-away upstream or peer nodes. For downstream and upstream nodes, the node can hear the MR 1800 for all nodes within one hop. The routing table 2300 is updated by setting the next-hop for the corresponding routing entry to the relay node of the MR. The node checks the routing entry for the originator of the MR. If the next-hop is not the relay node, the entry is modified. Additionally, the immediate sender's routing entry is updated and a direct connect, i.e., next hop for the destination, is the destination. The freshness indicator for the routing entry which is associated with the MR 1800 is updated and the sequence number for the originating node that sends the MR 1800 is updated. The routing table 2300 is only complete after both a heartbeat control packet 1700 and an MR 1800 is received. Accordingly, the routing table 2300 is only used for forwarding messages after the table is complete. During the update process, the prior routing table 2300 is used as the forwarding table.

The forwarding table is the routing information used for packet forwarding. After the construction of the internal routing table 2300 is complete, the node resets the forwarding table to enable packet forwarding using the new routing data.

Figure 22:
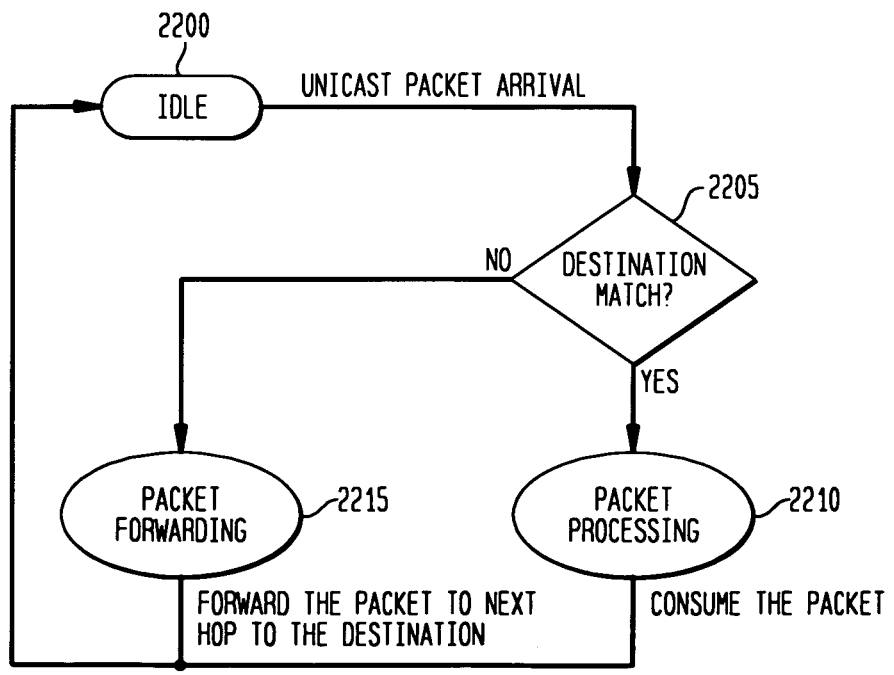
FIG. 22 is a finite state machine for routing of the unicast packet.

FIG. 22 illustrates a finite state machine for unicast IP packet forwarding. The initial state for a node is idle 2200. When a unicast packet arrives, the node determines if the final destination of the packet is that node, state 2205. If the final destination matches, i.e., destination address of the packet matches the nodes IP address, the node consumes the packet, state 2210. The IP packet is processed. If the packet is not destined for the node, the node forwards the packet, state 2215. Specifically, the node first updates the routing tables 2300 with information from the IP packet and then looks up the destination address in the forwarding table which forwards the packet to the next hop neighbor listed in the forwarding table.

Figure 23:
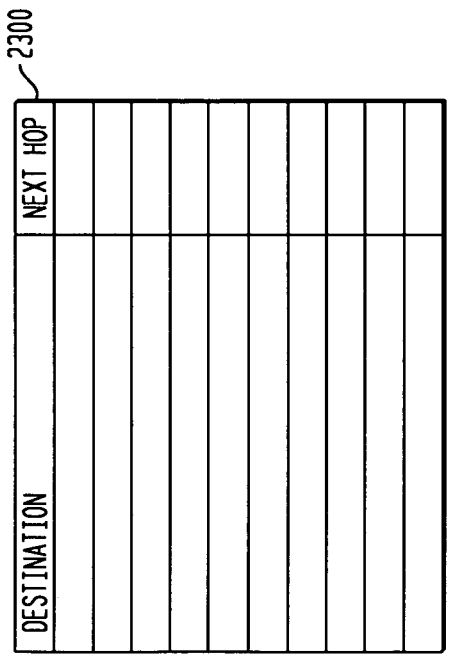
FIG. 23 illustrates an example of the internal unicast routing table 2300 in accordance with an embodiment of the invention.

FIG. 23 illustrates an example of the format of the internal routing table 2300. The IRT 2300 is a database stored in memory. The first column of the IRT 2300 lists all of the routable entries or destinations in the LPG. The second column lists the next hop for each destination. In another embodiment, the IRT 2300 can include a sequence number or time stamp to maintain or indicate the freshness of the information and a node classification, i.e., upstream, peer, downstream, joining.

Multicasting

In another embodiment, the LPG network is capable of supporting multicast message functionality. In unicasting, because a sending node (e.g., the witness of the accident) sends or directs a message to one particular receiver, multiple messages are needed to send the same information to number receivers. This results in the consumption of a large network bandwidth and message delays. For example, in unicasting, if there are six different recipients for a particular message, six different and duplicate messages are transmitted on the link between the sender and its neighboring nodes, i.e., recipients. The network is used six times for the transmission of the same message and the recipient of the sender's last transmission needs to wait longer. In addition, the sender must know each recipient in advance, i.e., IP addresses for each recipient.

In multicast transmission, the sender does not generate duplicate copies of the message; it sends one message to all the recipients. The network bandwidth is significantly saved with multicasting. For example, if a sender needs to send one message to six one-hop neighboring receivers, the sender will produce one multicast message to all six receivers. The total bandwidth used will be reduced to ⅙. Additionally, the nodes do not need to be completely organized beforehand, i.e., each node does not need to know every other node's address, only needs to know the multicast group 2400 identification or IP address for the multicast group 2400. Every node within the multicast group 2400 will receive the multicast message. Further, the multicasting tree or mesh described below can support all multicast members in the multicast group to be source nodes and communicate with each other. There is no need to create separate multicast trees, one tree for each source node to communicate with the other nodes.

Unlike unicasting, multicasting deals with multiple sources and receivers per multicast session. For example, an RSU 100 attempts to disseminate a piece of urgent information to a plurality of school buses. In order to deliver the information promptly, the paths among the school buses involved must be established prior to the transmission of the message. In multicasting, the routing path among multicast members is based upon a multicast tree. A multicast tree or mesh is built using a proactive multicast routing method and can account for the dynamic changes in the ad hoc network due to the mobility of most of the nodes. In accordance with the invention, the trees or meshes are adjusted quickly to avoid the multicast message being delayed and lost.

In the ad-hoc network in accordance with the invention, participants are typically connected by either a single hop, i.e., direct neighbors or multi-hop. A multicast group 2400 is created from multicast members, which are called leaf nodes. Any node between each leaf can be selected as multicast forwarding nodes (FN) 2410 and used to forward multicast packets to the associated multicast members.

Figure 24:
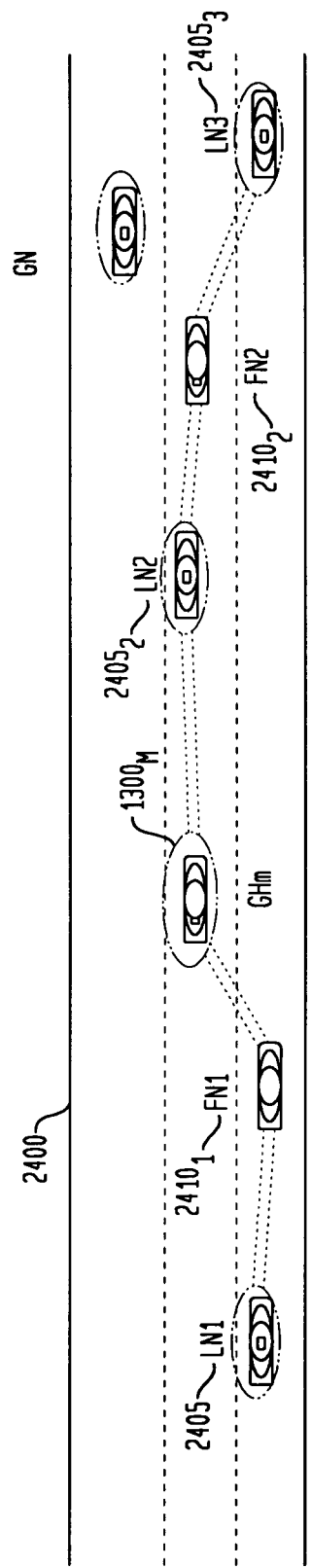
FIG. 24 illustrates an example of a multicast group 2400.

FIG. 24 illustrates an example of a multicast group 2400. The multicast group 2400 includes three multicast members LN1 2405$_1$, LN2 2405$_2$, and LN3 2405$_3$. The multicast group 2400 also includes forward nodes FN1 2010$_1$, and FN2 2010$_2$. In this example, the group header GH 1300 is also a forwarding node 2410. The remaining nodes depicted in FIG. 24, are group nodes 1500. All nodes in a LPG 115 are capable of being either leaf node 2405 or forwarding nodes 2410, or both. The multicasting tree is created based upon similar control and formation packets, which have been already described above. The multicasting tree leverages information included in the control packets without a significant increase in bandwidth and extra information in the control packets. The control packets include the heartbeat control packets 1700 and MR 1800. The multicast tree provides paths from any source, i.e., leaf to all the receivers, i.e., other leafs.

To establish a multicast session, nodes interested in a multicast session launch a multicast application program corresponding to the multicast session. The application program is stored in memory. Accordingly, the nodes become leaf nodes and release signals (MRs 1800) indicating their interest to join the session to the LPG 115. These signals initiate the generation of a multicast tree for the multicast session.

Upon receipt of the initiating signal, a node becomes an FN 2410 for the multicast session. The FN 2410 can accept and forward multicast packets associated with the multicast session.

With reference to FIG. 24, LN1-3 2405$_{1-3}$ join a multicast session (e.g., a weather service session) and become leaf nodes 2405 by launching the multicast application program associated with the multicast session. FN1 2410$_1$, GH 1300, LN2 2405$_2$, and FN2 2410$_2$, are selected as FNs 2410 to form a multicast tree for the multicast session, which spans all the leaf nodes LN1-3 2405$_{1-3}$.

Figure 25:
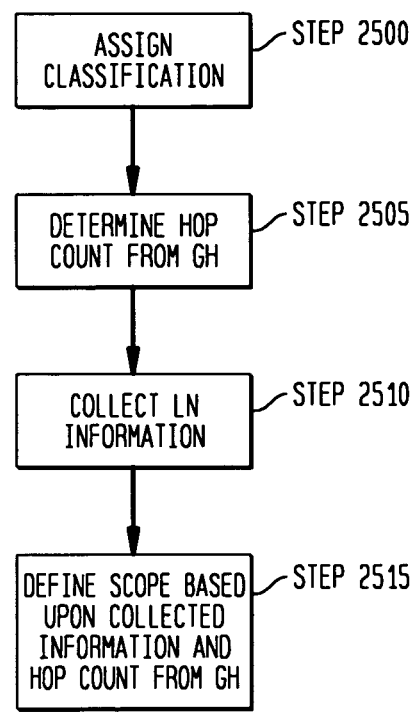
FIG. 25 is a flow chart for creating a multicast tree according to one embodiment of the invention.

In accordance with the invention, the multicast tree can be created in two ways. FIG. 25 illustrates one method for forming the multicast tree according to an embodiment of the invention. In this embodiment, the GH controls the creation of the multicast tree. At step 2500, the GH must assign a classification for each node within the LPG 115. The classification is based upon whether a node is upstream or downstream from the GH 1300. If a node is upstream from the GH 1300, a first classification is assigned to the node, and if a node is downstream from the GH 1300, a second classification is assigned to the node. For example, one classification could be blue and blue would be assigned to all the nodes located on the one side of the GH 1300, and the other classification could be red and red would be assigned to all the nodes on the other side of the GH 1300. The GH 1300 will broadcast a heartbeat control packet 1700 including the classification to all nodes within the LPG 115. At step 2505, every node determines the hop counts from the GH. Hop count from the GH is determined directly from the heartbeat control packet 1700. At step 2510, the GH 1300 will collect information regarding the leaf nodes 2405. This information is determined directly from the membership report. At step 2515, the GH 1300 defines the scope of the multicast session that the leaf nodes 2405 are involved in, based on the information collected. Specifically, the GH 1300 processes all the MRs 1800, and finds out which nodes are the leaf nodes 2405 (i.e., members of a multicast session), their classifications and hop distances. For example, red and 4 hop distance, blue and 1 hop. The scope limits the range of multicast forwarding. Relay nodes within the scope defined by the GH 1300 for the multicast session become FNs 2410. The set of FNs 2410 represents a multicast mesh.

Figure 26:
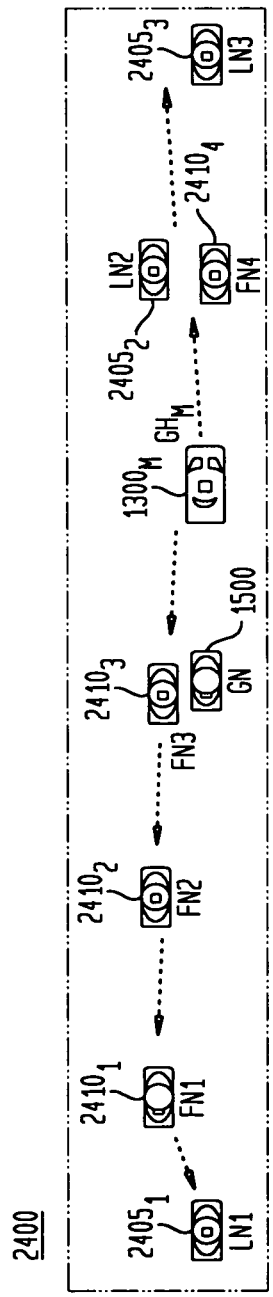
FIG. 26 illustrates an example of a multicast group 2400 formed in accordance with the embodiment depicted in FIG. 25.

FIG. 26 illustrates an example of the multicast group 2400 in accordance with this embodiment. The shaded region represents the scope of the multicast group 2400. In this example, leaf node LN1 2405$_1$ is on one side of the GH 1300$_m$ and leaf nodes LN2 2405$_2$ and LN3 2405$_3$ are on the other side. The classification of LN1 2405$_1$ would be a first classification, i.e., red and the classification of leaf nodes LN2 2405$_2$ and LN3 2405$_3$ would be a second classification, i.e., blue. On the red side, the furthest leaf node is three hops away from GH 1300 and on the blue side, the furthest leaf node is 2 hops away. Therefore, the scope of the multicast group 2400 is from 3 hops red to 2 hops blue. This scope information is advertised to the relay nodes through the heartbeat control packet 1700. Once a relay node receives the scope information, it determines whether it become an FN 2410 or not. As shown in FIG. 26, those relay nodes within the range from 3 hops red to 2 hops blue become the FNs 2410 of the multicast session. Leaf node LN2 2405$_2$ is both a leaf node and an FN 2410. A multicast message is routed using the shortest paths between members.

Figure 27:
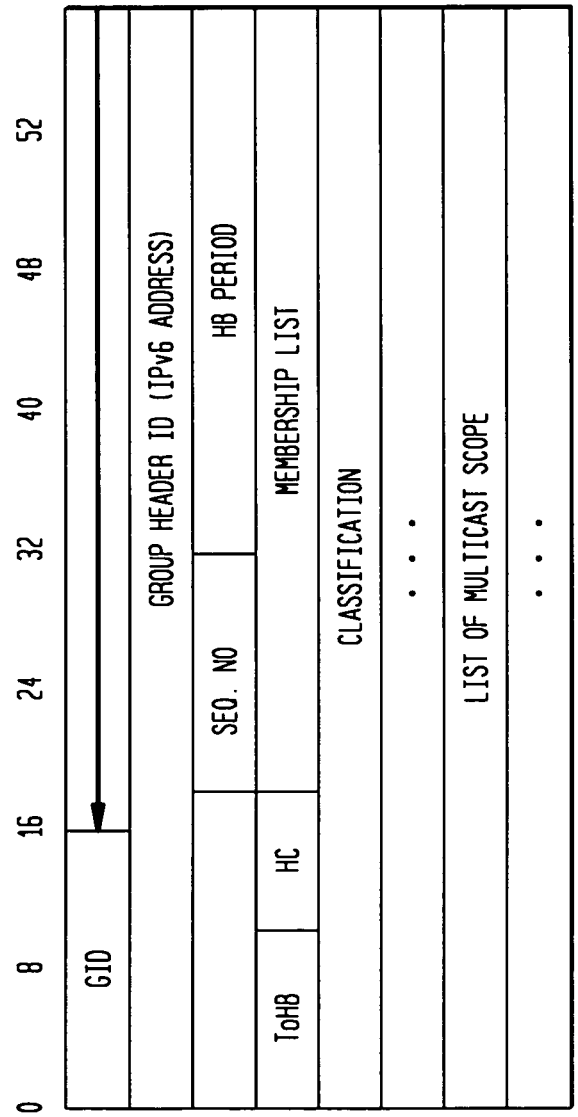
FIG. 27 illustrates an example of a heartbeat control packet used for creating a multicast tree in accordance with the embodiment depicted in FIG. 25.

As stated above, the multicast tree is created based upon the heartbeat control packets 1700 and the MRs 1800. GH 1300 broadcasts a heartbeat control packet, at predefined intervals. A heartbeat control packet 1700 is delivered to all the nodes in a LPG 115. In response to the heartbeat control packet 1700, each node sends an MR 1800 to the GH 1300. The nodes that relay an MR 1800 toward the GH 1300 are relay nodes (RNs). For multicasting, the contents of heartbeat control packet 1700 and MR 1800 are updated to include multicast-related information. Specifically, classification information and multicast scope information are added in a heartbeat control packet 1700 and member's classification and hop distance for a GH are included in an MR 1800. FIGS. 27 and 28 are examples of the heartbeat control packet 1700 and MR 1800 used to create the multicast tree.

Upon receiving a heartbeat control packet 1700, a node obtains its classification, its hop distance, as well as the multicast scope information. Based on scope information in a heartbeat control packet 1700, relay nodes determine if they need to become FNs 2410. Specifically, the relay nodes within the scope become FNs 2410. All FN 2410 for a multicast session are reflected in a multicast forwarding entry for that multicast session as an entry in a Multicast Forwarding Table (MFT) 3100. The MFT 3100 reflects the structure for the multicast tree. The MFT 3100 is updated every heartbeat cycle, i.e., after every heartbeat control packet 1700 and MR 1800. In other words, the multicast tree and MFT 3100 is updated to reflect nodes joining and leaving as well as mobility of the multicast member.

Figure 29:
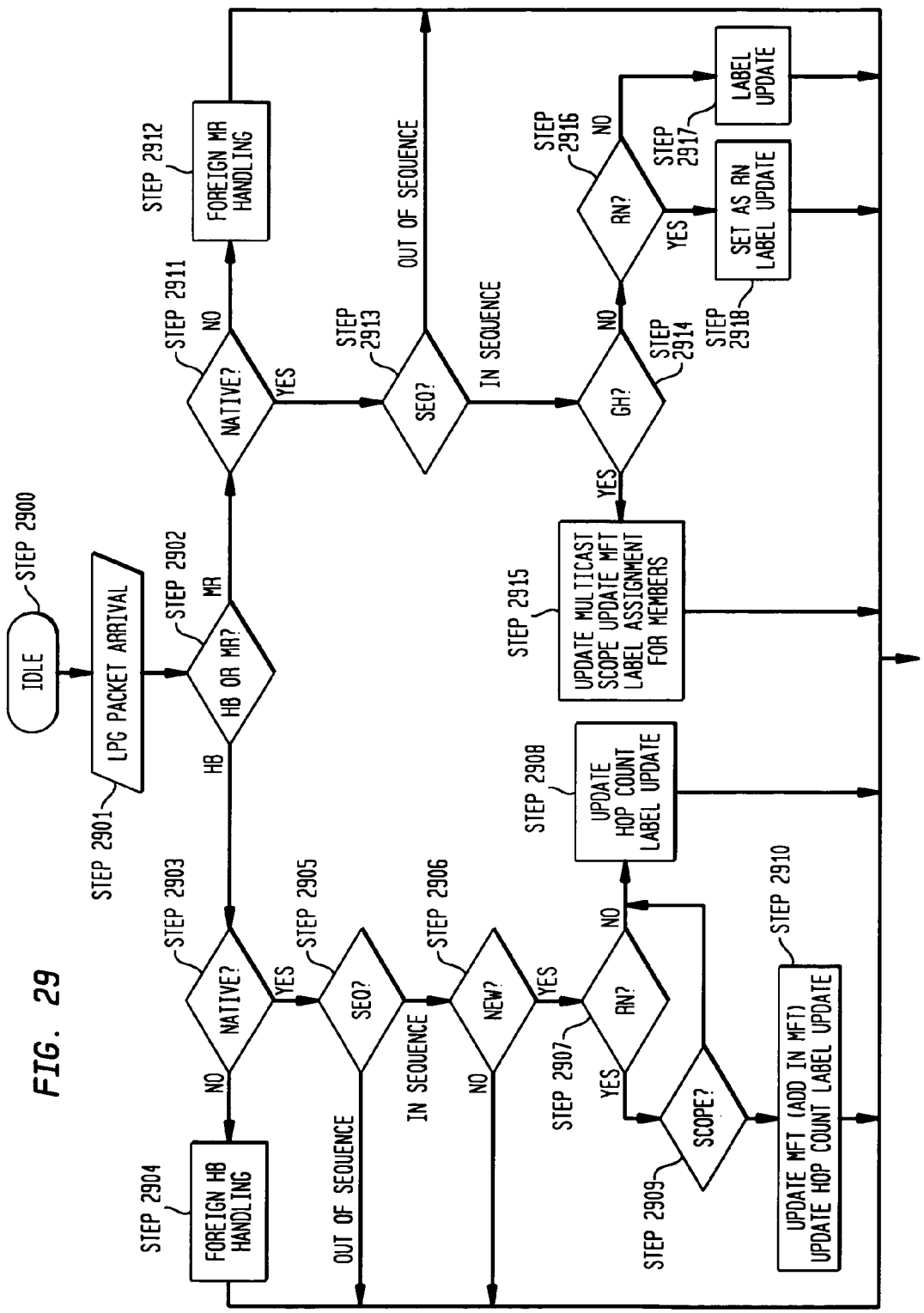
FIG. 29 is a flow chart for generating and maintaining a multicast forwarding table in accordance with the embodiment depicted in FIG. 25.

FIG. 29 illustrates the LPG based routing method for a multicast messaging in accordance with this embodiment of the invention. Initially, each node is idle 2900. When a packet arrives 2901, the node determines whether the packet is a heartbeat control packet 1700 or an MR 1800. Depending on the type of control packet, the node performs special packet processing. The node determines the type of control packet as step 2902. If the control packet is a heartbeat control packet 1700 the node processes the packet starting with step 2903. The node determines if the packet is native, step 2903. A packet is native if the packet is for the same LPG 115, i.e., the packet has the same GID 1705. The node will compare the GID with the group identification stored in memory. If the GID does not match the identification stored in memory, the node will initiate Foreign heartbeat control packet 1700 handling, at step 2904. Typically, foreign HB handling will result in the node ignoring the packet. If the GID matches the identification stored in memory, the node will then determine if the heartbeat control packet 1700 is in sequence. The node will compare the Seq. No. with the sequence number in memory. If the Seq. No. is less than the value stored in memory, the node will ignore the packet, at step 2905. If the Seq. No. is greater than and equal to the value stored in memory, the heartbeat control packet 1700 is in sequence and the node will then determine if the heartbeat control packet 1700 is new, at step 2906 (i.e., sequence number greater than the last stored sequence number). If the node determines that the message is not new, the node will ignore the message and become idle, i.e., return to step 2900. If the heartbeat control packet 1700 is new, then the node will determine if the node is a relaying node (RN), at step 2907. If the node is not an RN, then the node will update information in memory such as hop count from GH and classification, at step 2908. On the other hand, if the node is an RN, the node will determine if the node is within the scope, at step 2909. The GH 1300 defines the scope based on the received MRs 1800. The GH 1300 becomes an FN 2410 if the GH is located within the defined scope. If the RN is within the scope, then the RN becomes an FN and adds the identification of the multicast session, i.e., class D multicast IP address to the MFT 3100, at step 2910. Additionally, the node, now an FN 2410 updates the hop count information and classification, if necessary. If the RN is not within the scope, then the RN will update information in memory such as hop count from GH and classification, at step 2909.

If the control packet is an MR 1800 the node processes the packet starting with step 2911. The node determines if the packet is native, step 2911. The node will compare the GID 1705 with the group identification stored in memory. If the GID does not match the identification stored in memory, the node will initiate Foreign MR handling, at step 2912. If the packet is native, the node will then determine if the MR 1800 is in sequence, at step 2913. The node will compare the Seq. No. with the sequence number in memory. If the Seq. No. is less than the value stored in memory, the node will ignore the packet, at step 2913. If the Seq. No. is greater than or equal to the value stored in memory, i.e., the MR 1800 is in sequence, then the node will decide if the node is a GH 1300, at step 2914. If the node is a GH 1300, the node will collect the information contained in the MRs 1800 and the scope, at step 2915. Specifically, the MR 1800 includes classification information, hop count to GH information and multicast group 2400 membership information. Using this information, prior to transmitting a heartbeat control packet 1700, the GH 1300 can adjust the scope of the multicast group 2400, if necessary. Additionally, the GH 1300 will modify the MFT 3100, i.e., add itself as an FN 2410. Lastly, the GH 1300 will change the classification of nodes, if necessary, to account for mobility.

On the other hand, if the node is not a GH, the node will then determine if the node is an RN, at step 2916. If the own node's ID of the node is equal to the Next-Hop Relay ID (e.g., IP address) in the MR 1800, the node is the RN for the MR 1800. Every node maintains its node status such as GH, RN, and FN. If the node is not an RN, then the node will just update the classification information, at step 2917. If the node is an RN, the node will set its node status as RN and update the classification information, at step 2918.

FIGS. 30A and 30B illustrate a functional node state transition chart for both a GH 1300 (FIG. 30A) and for an RN (FIG. 30B). GH 1300 can be in either an FN 2410 or not, i.e., Non-FN 3000 or FN 3010 state. If GH 1300 is positioned outside of the scope of a multicast group 2400, it will be in a Non-FN state 3000 for the multicast group 2400 via transition 3005. If the GH 1300 is within the scope of the multicast group 2400, the GH 1300 will transition to an FN 2410 state 3010 via transition 3015. Once in FN state 3010, the FN 2410 will set an FN timer. The FN timer is used to control the time that a node is an FN 2410. The timer is set to a predefined period of time. While in an FN state 3010, a node FN only moves to a Non-FN state when the FN timer expires, through transition 3025.

A node other than a GH can be in one of four states. A regular node (i.e., both non-RN and non-FN) 3030, RN state 3040, FN state 3050, and FN/RN state (both FN and RN) 3060. The Received Valid MR in FIG. 30B means that the received MR 1800 is destined for the node. When a regular node (state 3030) receives an MR 1800, the node transitions to an RN (state 3040) via transition 3035. Once an RN (state 3040), upon receipt of a heartbeat control packet 1700, the RN will either transition to an FN 2410 (state 3050) via 3055 or back to a regular node (state 3030) via transition 3040. If the RN is within the defined scope, the RN will become an FN (state 3050) via transition 3055. However, if the RN 3040 (state 3040) is not within the scope, the RN will transition to regular node state 3030. AN FN (state 3050) will change its state back to a regular node when its timer expires, through transition 3065. AN FN 2410 can be both an RN and an FN. If the FN (state 3050) receives a different MR 1800 then the FN 2410 will transition to state 3060 via transition 3075 to become both an RN/FN (state 3060). The node will remain in state 3060 as both an FN/RN until it receives a new heartbeat control packet 1700 (transition 3085).

Figures 31, 32:
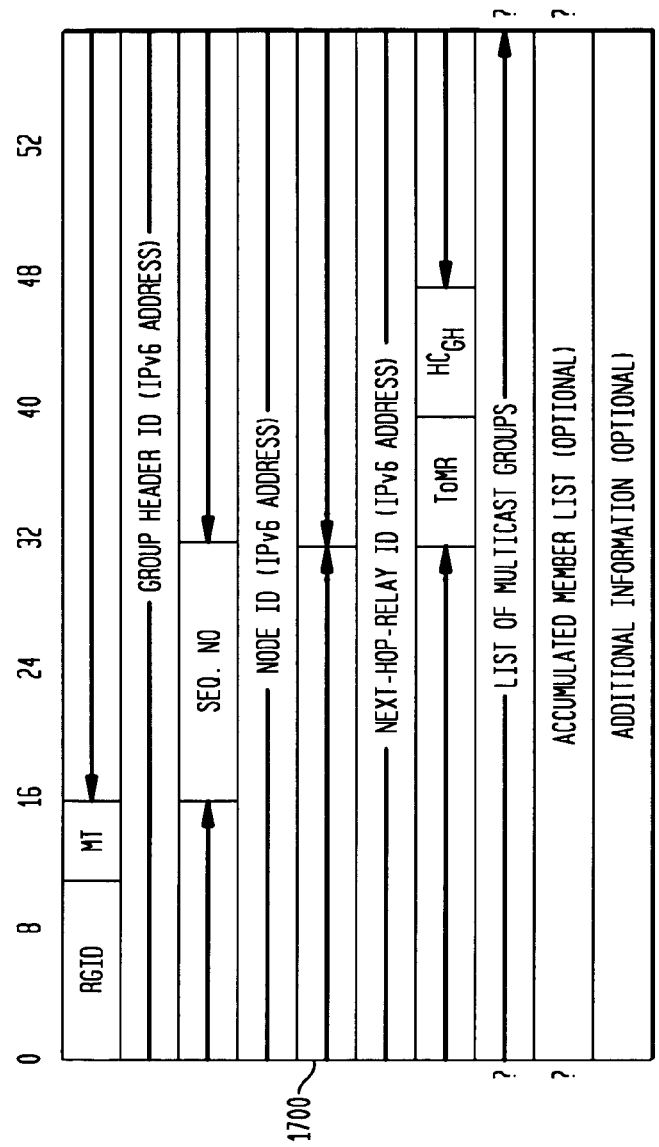
FIG. 31 illustrates an example of a multicast forwarding table in accordance with the invention.
FIG. 32 illustrates an example of a Membership Report packet used for creating a multicast tree in accordance with a second embodiment of the invention.

FIG. 31 illustrates an example of the MFT 3100 used for multicast routing in accordance with the invention. An entry of MFT 3100 consists of a multicast group address (e.g., class D IP address) and outgoing interfaces. If a multicast group 2400 is listed in the MFT 3100 for a node, the node will be an FN 2410 for that multicast group 2400. Each FN 2410 stores the MFT 3100 in memory. Accordingly, upon receipt of the multicast packets from the sources or the neighboring FNs 2410, it forwards the multicast packets For a non GH, the MFT 3100 is only updated based upon the heartbeat control packet 1700, the multicast group 2400 address for the multicast session is added as an entry of the MFT 3100 and the affiliated timer (i.e., FN timer for that entry) starts (or restarts in case of renewing the entry). If the timer expires (i.e., renewing doesn't take place), the entry will be removed from the MFT 3100. The GH 1300 updates the MFT 3100 when it receives the MR 1800.

The MFT 3100 is updated each heartbeat control cycle. A heartbeat control cycle includes the time for both one set of heartbeat control packet 1700 and MR 1800. Due to the fact that the nodes are mobile, the set of relay nodes may change for each heartbeat control cycle. Since, in this embodiment, multicast FNs 2410 are a subset of RNs, and the RNs can change frequently, a multicast mesh and MFT 3100 must be updated every heartbeat control cycle. The change of the multicast membership is reflected on the mesh and MFT 3100 at the next HBC (heart beat cycle).

AN FN timer is associated with each entry in MFT 3100. The period of time will be a multiple of the heartbeat interval or just a little greater than the heartbeat interval. The FN timer will renew if the FN 2410 is still within the scope. The FN timer will expire if the node does not receive a valid MR 1800 and a heartbeat control packet 1700, which indicates that the node is within the scope within the predefined period of time. If the FM timer for an entry listed in MFT 3100 expires, the entry will be removed from MFT, i.e., the node becomes a NON-FN for the multicast session represented by that entry.

The mobility of a leaf node 2405 is detected through MR 1800 and heartbeat control packet 1700 transmission. Approximately two HBCs (heartbeat cycles?) are required to detect the movement of a leaf node 2405 and update the mesh, i.e., MFT 3100.

In second multicast embodiment, GH 1300 will not define the scope of the multicast group 2400. In this embodiment, all RNs between a multicast member and a GH 1300 become FNs 2410. In this embodiment, the formation of a multicast group 2400 is quicker since the GH 1300 does not define the scope. A multicast member indicates the multicast membership information in its MR 1800. The member sets Leaf Node status in the MR 1800 as the multicast status. Upon receiving the MRs 1800, the RNs become FNs 2410 for the associated multicast groups 2400. AN FN 2410 sets FN status in its own MR 1800. According to this multicast embodiment, there is no need for any additional information to be added to the heartbeat control packet 1700. The packet can be the same as depicted in FIG. 17. The MR 1800 will be similar to the MR 1800 depicted in FIG. 18, however, information regarding multicast membership, e.g., engaging multicast group 2400s, and the nodes status, i.e., FN 2410 or leaf node 2405 will be added.

FIG. 32 illustrates an example of the modified MR 1800 in accordance with the second embodiment. In this embodiment, a node status only changes based upon an MR 1800.

Figure 33:
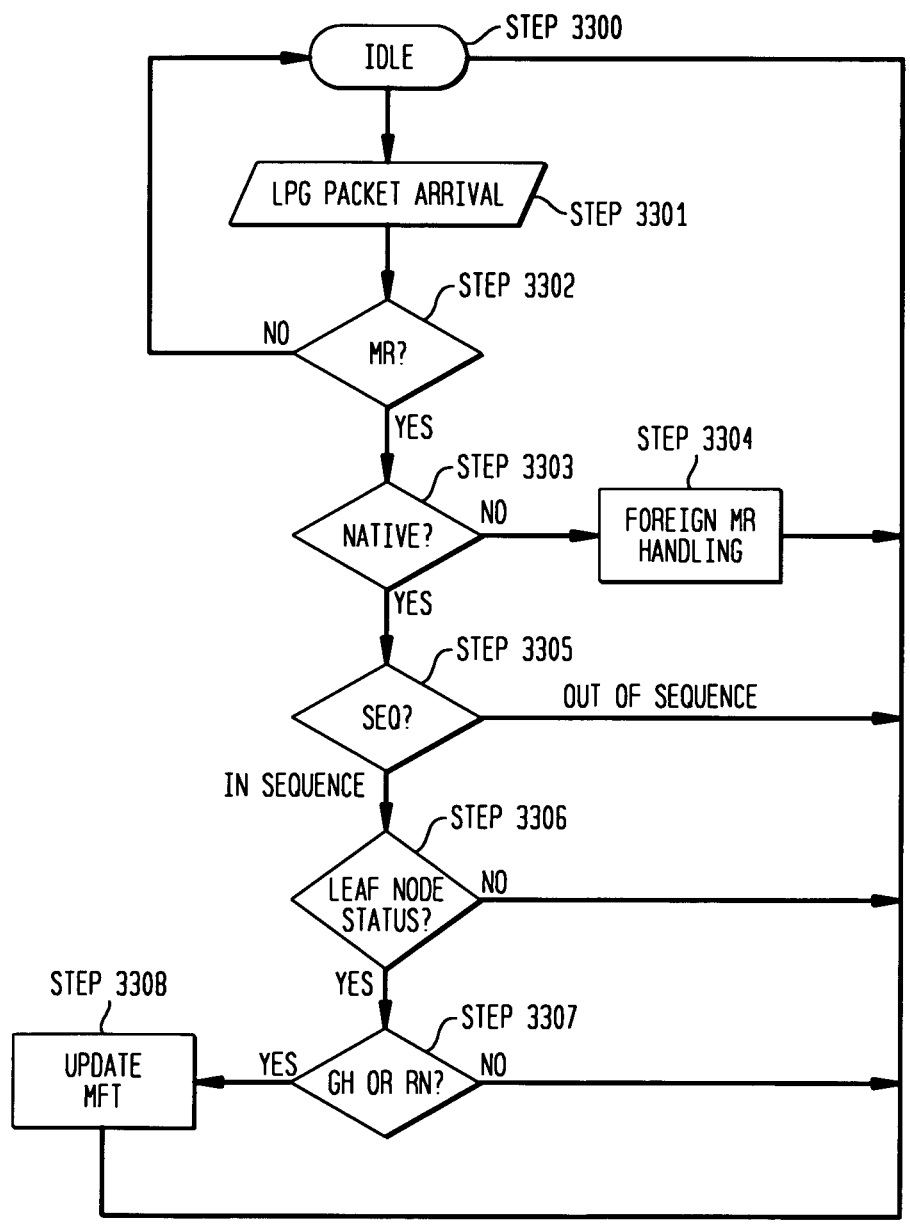
FIG. 33 is a flow chart for generating and maintaining a multicast forwarding table using the second embodiment of the invention.

FIG. 33 illustrates the LPG based routing method for a multicast messaging in accordance with this embodiment of the invention. Initially, each node is idle 3300. When a packet arrives 3301, the node determines whether the packet is a heartbeat control packet 1700 or an MR 1800. Depending on the type of control packet, the node performs special packet processing. The node determines the type of control packet as step 3302. If the control packet is an MR 1800 the node processes the packet starting with step 3303. The node determines if the packet is native, step 3303. A packet is native if the packet is for the same LPG 115, i.e., the packet has the same GID 1705. The node will compare the GID 1705 with the group identification stored in memory. If the GID does not match the identification stored in memory, the node will initiate Foreign MR handling, at step 3304. Typically, foreign MR handling will result in the node ignoring the packet.

If the packet is native, the node will then determine if the MR 1800 is in sequence, at step 3305. The node will compare the Seq. No. with the sequence number in memory. If the Seq. No. is less than the value stored in memory, the node will ignore the packet, at step 3305. If the Seq. No. is greater than or equal to the value stored in memory, the MR 1800 is in sequence and the node will decide if the MR 1800 was originally sent from a leaf node 2405, at step 3306. If the MR 1800 was not sent from a leaf node 2405, the node will ignore the MR 1800 for the purposes of multicast routing. If the MR 1800 was sent from a leaf node 2405, the node will then determine if the node is either a GH 1300 or RN, at step 3307. If the node is not in either state, the node will ignore the MR 1800 for the purposes of multicast routing. If the node is either a GH 1300 or RN, the node will update the MFT 3100, i.e., become an FN 2410, at step 3308. This updating includes adding the multicast group 2400 to the MFT 3100.

Figure 34:
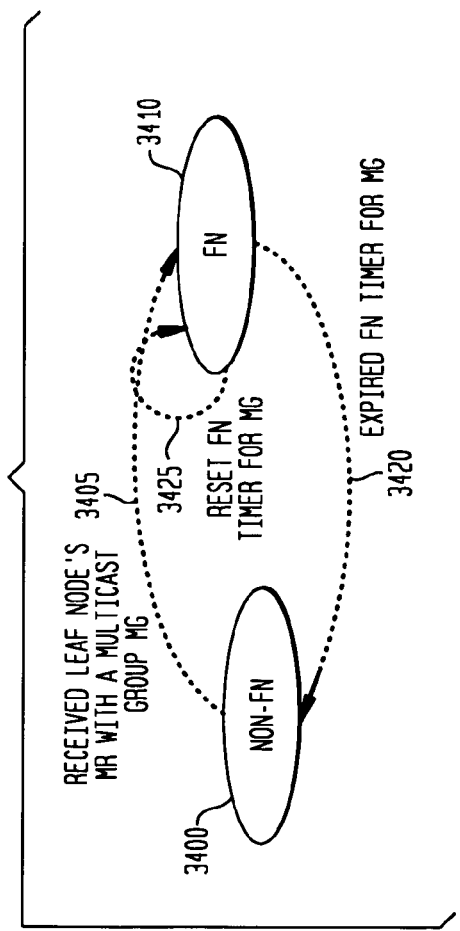
FIG. 34 is a function state transition chart for a node in accordance with the second embodiment of the invention.

FIG. 34 illustrates a functional state transition diagram for a node in accordance with this embodiment. A node can be in either Non-FN state 3400 or FN state 3410 for a multicast group 2400. If a node in state 3400 receives an MR 1800 with Leaf Node status, the node will transition to state 3410 and become an FN 2410. The FN 2410 will set the FN timer for the multicast session. If the FN time for the multicast group 2400 expires, the FN 2410 changes its state from 3410 to 3400 and becomes a Non-FN (i.e., regular node) via transition 3420. While in state 3410, i.e., while being an FN, if the timer does not expire, the FN 2410 remains an FN, via transition 3425.

In third multicast embodiment, GH 1300 can prune the scope of the multicast group 2400 created in accordance with the above embodiment to increase the efficiency for the routing. The prune operation removes unnecessary FNs. After collecting the MRs 1800 from leaf nodes 2405, the GH 1300 defines the effective prune coverage and sends a prune message 3500, if required. The prune message 3500 is separate from the heartbeat control packet 1700. The effective prune coverage is conveyed as a hop count from GH to the closest leaf node. A prune message 3500 is processed and relayed by only FNs within the effective prune coverage. The FNs located in the effective prune coverage remove the associated multicast forwarding entry in their MFTs 3100 and become regular nodes.

Figure 35:
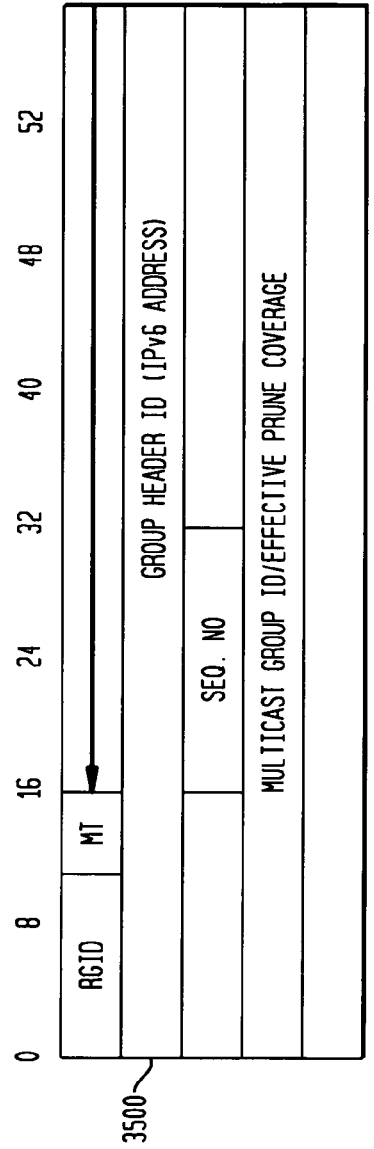
FIG. 35 illustrates an example of a prune packet used to create a multicast tree in accordance with a third embodiment of the invention.

FIG. 35 illustrates an example of the prune message packet 3500. The prune message packet 3500 includes the group identification, group header, identifying a sequence number, the multicast member identification and the effective prune coverage. The multicast member identification is the IP address for the multicast group 2400.

Figure 36:
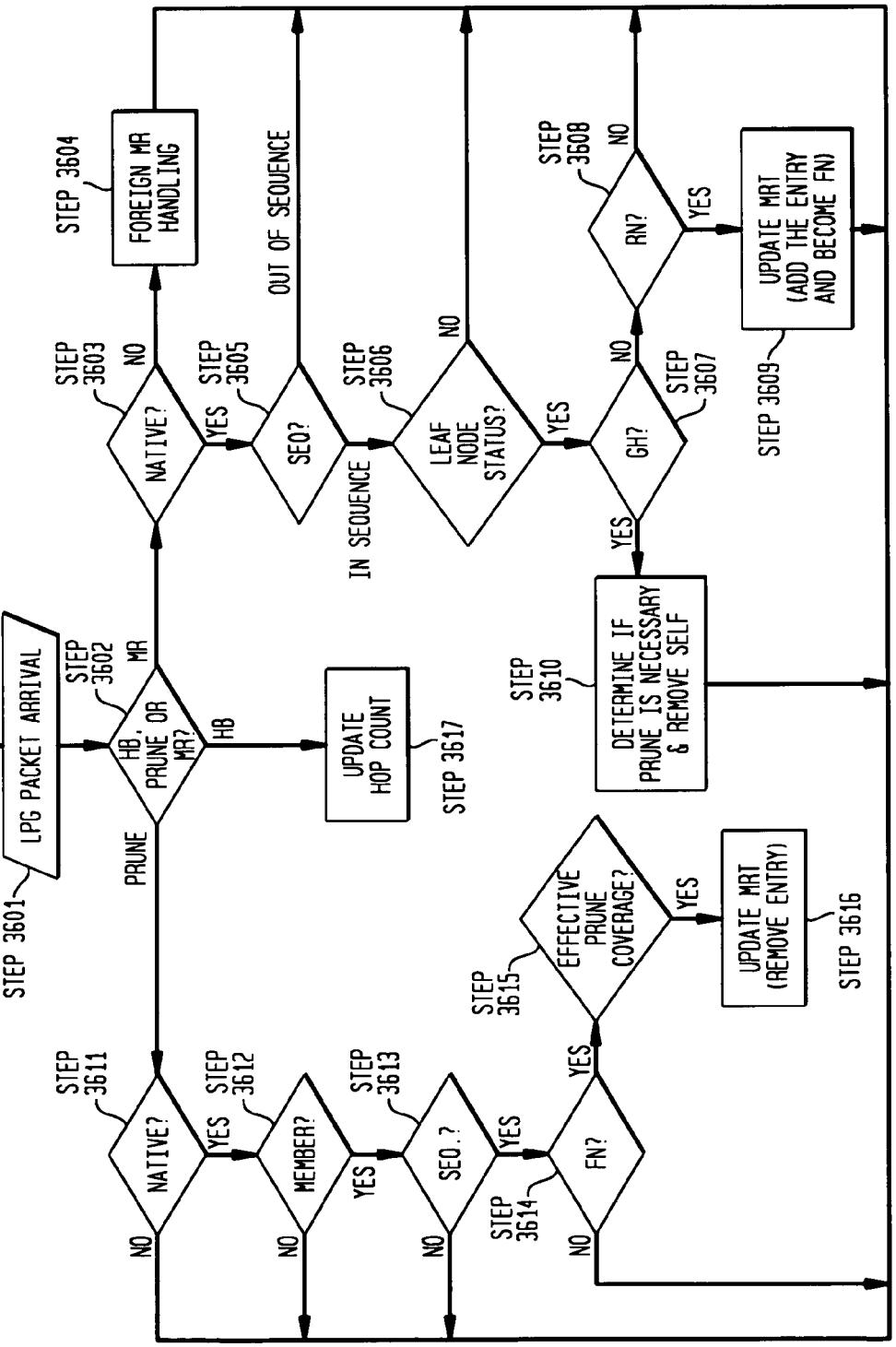
FIG. 36 is a flow chart for generating and maintaining a multicast forwarding table in accordance with the third embodiment.

FIG. 36 illustrates the LPG based routing method for a multicast messaging in accordance with this embodiment of the invention. Initially, each node is idle 3600. When a packet arrives at 3601, the node determines whether the packet is a heartbeat control packet 1700 or an MR 1800 or a prune message packet 3500. Depending on the type of control packet, the node performs special packet processing. The node determines the type of control packet as step 3602. If the control packet is an MR 1800, the node processes the packet starting with step 3603. The node determines if the packet is native, step 3603. A packet is native if the packet is for the same LPG 115, i.e., the packet has the same GID. The node will compare the GID with the group identification stored in memory. If the GID does not match the identification stored in memory, the node will initiate Foreign MR handling, at step 3604. If the packet is native, the node will then determine if the MR 1800 is in sequence, at step 3605. The node will compare the Seq. No. with the sequence number in memory. If the Seq. No. is less than the value stored in memory, the node will ignore the packet, at step 3605. If the Seq. No. is greater than or equal to the value stored in memory, then MR 1800 is in sequence and the node will decide if the M was originally sent from a leaf node 2405, at step 3606. If the MR 1800 was not sent from a leaf node 2405, the node will ignore the MR 1800 for the purposes of multicast routing. If the M 1800 was sent from a leaf node 2405, the node will then determine if the node is a GH 1300, at step 3607. If the node is not a GH, the node will then determine if the node is an RN, at step 3608. If the node is neither a GH nor an RN, the node will ignore the MR 1800 for the purposes of multicast routing. If the node is an RN, at step 3609, the node will update the MFT 3100, i.e., become an FN 2410, at step 3609. This updating includes adding the multicast group 2400 to the MFT 3100.

If the node is a GH 1300, then the GH 1300 will determine if there is a need for pruning based upon a preset parameter, at step 3610. The preset parameter can be that there are only multicast members on one side of the GH 1300. The GH 1300 will determine that the GH is not needed to be in the multicast group 2400. The GH 1300 will remove the multicast group 2400 id from the MFT 3100. Additionally, the GH 1300 will determine the closest multicast member to the GH. This determination will be based upon the hop count from GH. Any FN 2410 that is located within the prune coverage will be pruned when it receives a prune message which is originated from the GH. A prune message is relayed by pruning FNs (FN with no leaf nodes and located within the prune coverage), and the FN with leaf nodes, which is closest to the GH, stops relaying a prune message.

If, at step 3602, the node determines that the packet is a prune message packet 3500, the packet processing will start at step 3611. The node determines if the packet is native, at step 3611. A packet is native if the packet is for the same LPG 115, i.e., the packet has the same GID. The node will compare the GID with the group identification stored in memory. If the GID does not match the identification stored in memory, the node will ignore the packet and become idle. The node will then determine if the prune message packet 3500 is in sequence, at step 3612. The node will compare the Seq. No. with the sequence number in memory. If the Seq. No. is less than the value stored in memory, the node will ignore the packet, at step 3613. If the Seq. No. is greater than or equal to the value stored in memory, the prune message packet 3500 is in sequence and the node will then determine if it is an FN 2410, at step 3614. If the node is not an FN, the node will ignore the packet and become idle. If the node is an FN 2410, then the node will determine if it is within the effective prune coverage at step 3615. Any FN 2410 that is closer to the GH 1300 than the closest leaf node is in the effective prune coverage. This determination is based upon the hop count to GH. The node will compare the hop count to GH previously stored in memory with the hop count information in the effective prune coverage. If the hop count to GH is less than the hop count from the effective prune coverage, the FN becomes a non-FN, at step 3616. The node will update the MFT 3100 and remove the multicast identification from the MFT 3100. If the hop count to GH is greater than the hop count from the effective prune coverage the node will remain an FN 2410.

If, at step 3602, the node determines that the packet is a heartbeat control packet 1700, the node will just update the hop count information and other information that is stored in memory, at step 3617.

Figure 37A:
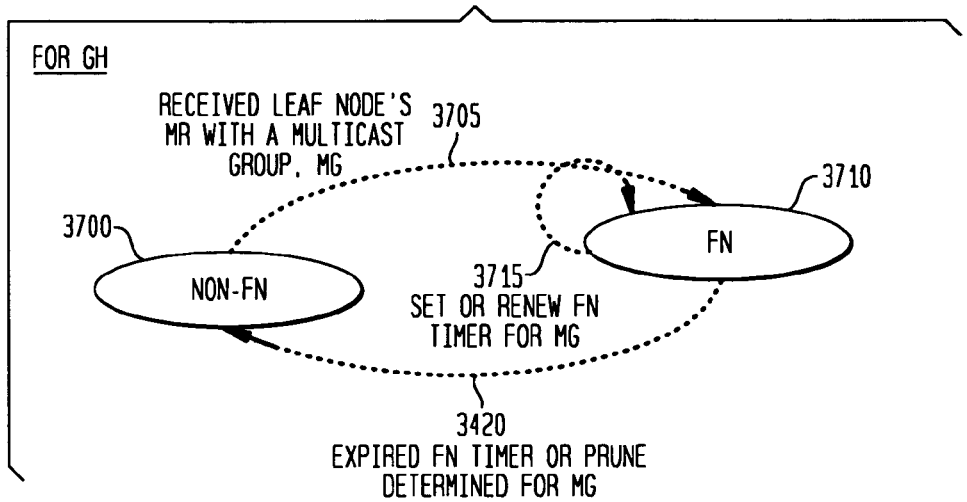
FIG. 37A is a functional state transition chart for a Group Header in accordance with the third embodiment.
Figure 37B:
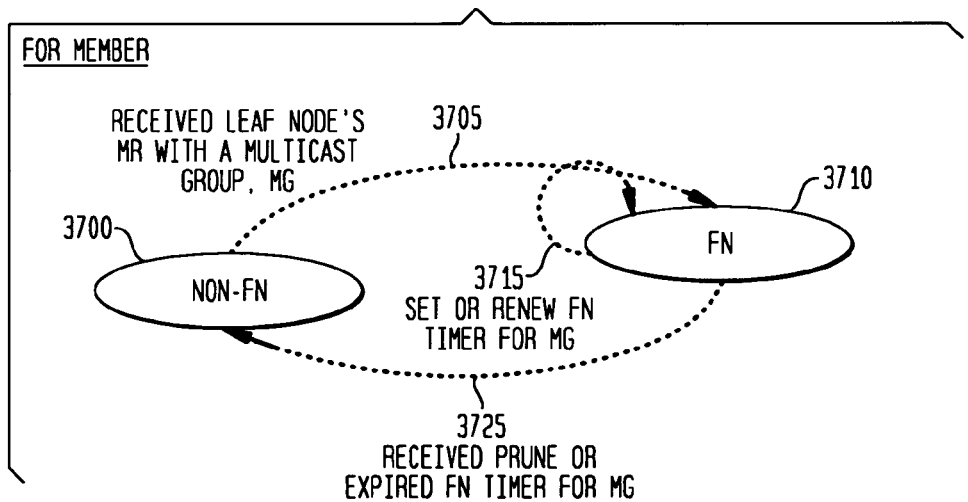
FIG. 37B is a functional state transition chart for a Group Member in accordance with the third embodiment.

FIGS. 37A and 37B illustrate functional state transition diagrams for a GH 1300 (FIG. 37A) and an RN (FIG. 37B) in accordance with this embodiment. As illustrated in FIG. 37A, a GH 1300 can be in either Non-FN state 3700 or FN state 3710 for a multicast group 2400. If a node in state 3700 receives an MR 1800 with Leaf Node status, the node will transition to state 3710 and become an FN 2410 via transition 3705. The FN 2410 will set the FN timer for the multicast session. If the FN timer for the multicast group 2400 expires or if a prune is determined, the FN 2410 changes it state from 3710 to 3700 and becomes a Non-FN (i.e., regular node) via transition 3720. While in state 3710, i.e., while being an FN, if the timer does not expire or is reset, the FN 2410 remains an FN, via transition 3715.

Similarly, RN can be in either Non-FN state 3700 or FN state 3710 for a multicast group 2400. If a node in state 3700 receives an MR with Leaf Node status, the node will transition to state 3710 and become an FN 2410 via transition 3705. The FN 2410 will set the FN timer for the multicast session. If the FN time for the multicast group 2400 expires or if a prune message packet 3500 is received, the FN 2410 changes it state from 3710 to 3700 and becomes a Non-FN (i.e., regular node) via transition 3725. While in state 3710, i.e., while being an FN, if the timer does not expire or is reset, the FN 2410 remains an FN, via transition 3715.

Due to mobility of most of the nodes, the paths taken by an MR 1800 from a leaf node 2405 to the GH 1300 at different periods of time are different resulting in a different set of FNs 2410 for every MR period. Therefore, the multicast mesh or MFT 3100 is updated by FN timer and periodic MR messages. The efficiency for updating the MFT 3100 can be achieved by controlling the time for FN timer and the interval for periodic MR 1800. By controlling these parameters, the MFT 3100 can be updated to account for mobility of both the leaf nodes 2405 and the FNs 2410.

When a new multicast member wants to join the on-going multicast session, it sends its MR 1800 with Leaf Node status for that multicast session, as well as the multicast identification for the session it wants to join.

FIGS. 38A and 38B illustrate two multicast groups, one group formed solely based upon MRs 1800 (FIG. 38A) and one group formed based upon MRs 1800 and prune message packet 3500. As depicted in FIG. 38A, leaf nodes, LN1, LN2 and LN3 $2405_{1-3}$ join the multicast group 2400 by sending MRs 1800 towards the GH 1300. All relaying nodes (RNs) between each leaf node and the GH 1300 become FNs 2410, e.g., FN1, FN2, FN3 and FN4 ($2410_{1-4}$). The formed multicast group 2400 includes five hops, size 5. However, since all three leaf nodes, LN1, LN2 and LN3 $2405_{1-3}$ are close together, i.e., on the same side of the GH 1300, the GH 1300 is not needed to be in the multicast group 2400. Accordingly the GH 1300 initiates pruning by pruning itself first, resulting in the GH 1300 becoming a Non-FN (FIG. 38B). Based upon the multicast information collected, the GH 1300 determines the effective prune coverage. In this case, since LN3 $2405_3$ is the closest to the GH 1300 and is 2 hops away, the prune takes place up to 2 hops: FN4 $2410_4$ and FN3 $2410_3$ become regular nodes. The mesh consists of only FN1 $2410_1$ and FN2 $2410_2$. Only FN1 $2410_1$ and FN2 $2410_2$ will have the multicast group identification in the MFT 3100.

Figure 39:
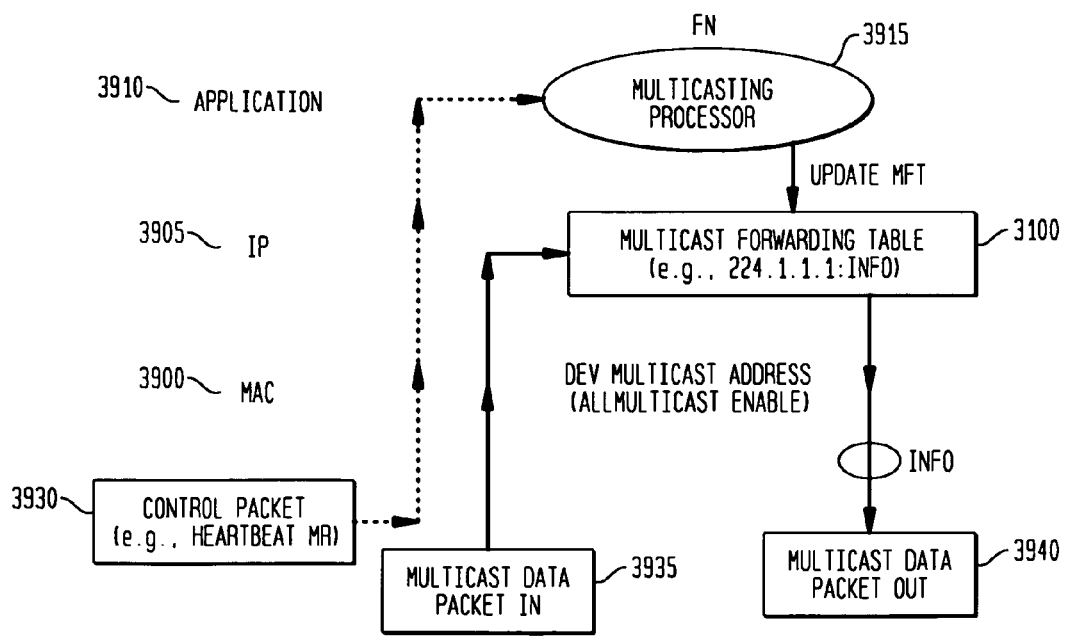
FIG. 39 illustrates the hierarchical functionality for a forwarding node in multicast mode in accordance with an embodiment of the invention.

FIG. 39 illustrates an example of the multicast forwarding function for an FN for each hierarchical layer. Control packets 3930 are delivered through UDP to the Multicasting Processor 3915, running in the Applications layer 3910. The Multicasting Processor 3915 using any of the aforementioned methods, can update the Multicast Forwarding Table (MFT) 3100 implemented in IP layer 3905, which is the part of the IP Multicast Forwarding Module. Multicast data packets in 3935 are received by the MAC layer 3900 initially and are forwarded to the IP layer 3905 to determine if the Multicast data packet in 3935 should be relayed or filtered out based on the MFT 3100, which is updated by the Multicasting Processor 3915. If the data packets in 3935 are determined to be forwarded, the FN 2410 forwards the packet as Multicast data packet out 3940. The multicast control packets 3930 and multicast data packets in 3935 are not filtered out by the MAC layer. 3900. An All Multicast mode must be enabled on the MAC layer 3900 so that all multicast frames in the MAC can be accepted, i.e., not filtered out by the MAC layer 3900 and forwarded to the IP layer 3905. By enabling AllMulticast mode on an interface, all multicast packets (regardless of multicast addresses in the packets) to the network will be received by the interface. If AllMulticast mode is not enabled, the interface accepts only multicast packets whose multicast addresses are matched with those assigned on the interface.

Figure 40:
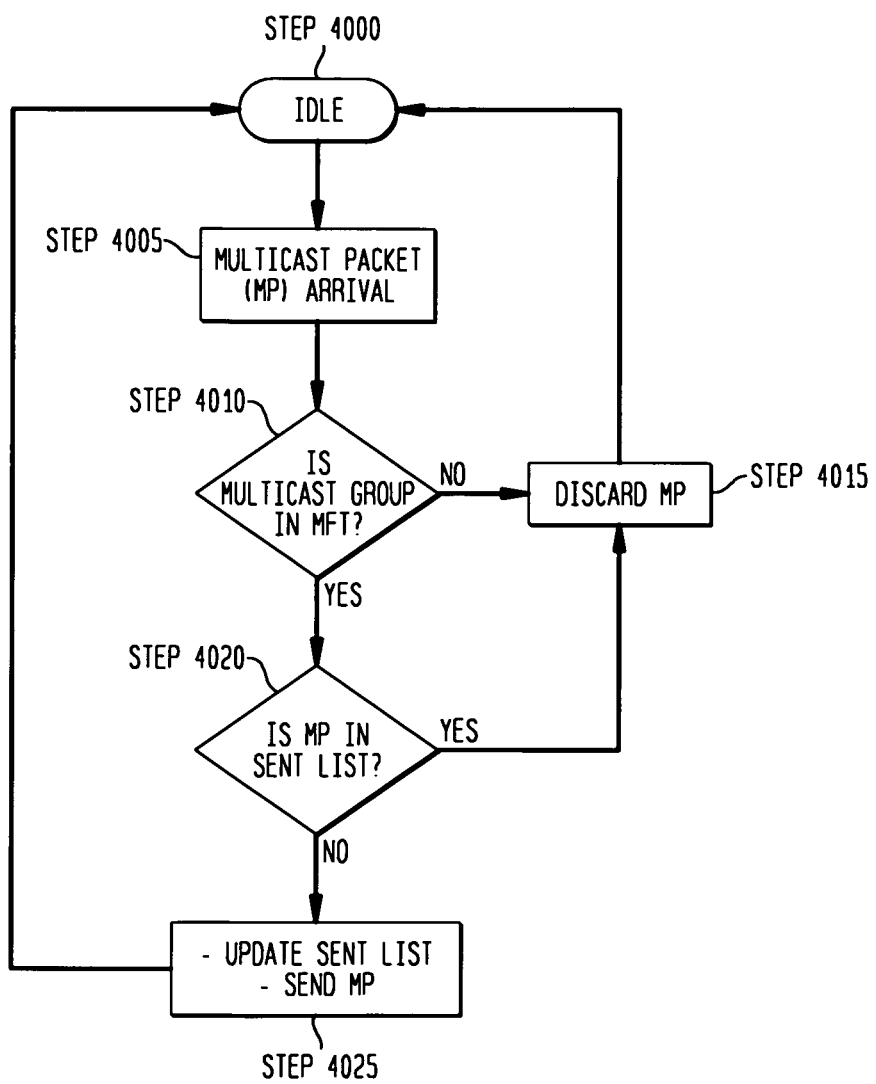
FIG. 40 is a flow chart for the process of routing a multicast packet in accordance with an embodiment of the invention.

FIG. 40 illustrates a flow chart for the forwarding function of the FN 2410 in accordance with an embodiment of the invention. Initially, the FN 2410 is idle, at step 4000. At step 4005, the FN 2410 receives a Multicast data packet in 3935. The IP layer 3905 will then determine if the multicast group 2400 is in the MFT 3100, at step 4010. The IP layer 3905 will compare the IP address of the multicast group 2400 from the Multicast data packet in 3935 with the IP addresses stored in the MFT 3100. Based upon the results of the comparison, the FN will either discard the Multicast data packet in 3935 at step 4015 or determine if the Multicast data packet in 3935 has already been sent by the FN 2410. Each FN 2410 has a sent list for all Multicast data packets in 3935 that are sent, stored in memory. Specifically, the sent list includes the identification for all Multicast data packet in 3935 that are sent within a preset period of time. The packet identification includes the source address of the Multicast data packets in 3935 and the identification information from the IP packet header. This preset period of time can be controlled to avoid the sent list from becoming excessively large. The function of the sent list is to prevent duplicative multicast packet transmission. Therefore, a Multicast data packet in 3935 only needs to be listed on the sent list for a short period of time, long enough to ensure that the packet is not a duplicate. At step 4020, the IP layer 3905 will determine if the Multicast data packet in 3935 has already been sent by comparing the source, i.e., source IP address in IP Header, and id, i.e., Identification in IP Header, for the received Multicast data packet in 3935 with the source and identification in the sent list. If there is a match, the FN 2410 will discard the Multicast data packet in 3935, at step 4015 and become idle, at step 4000. If there is no match, the Multicast data packet in 3935 is not previously sent and the FN 2410 will send the Multicast data packet in 3935, at step 4025. The FN 2410 will also update the sent list, at step 4025, by adding the source and id from the Multicast data packet in 3935 to the sent list.

In another embodiment of the invention, in order to prevent unnecessary transmission of duplicate packets by co-located FNs, which is a waste of bandwidth, all of the co-located FNs, except one, will be prevented from sending the Multicast data packet in 3935, i.e., relaying the packet. A co-located FN is an FN within the same radio range, i.e., same hop. Duplicative multicast packets are sent when the same multicast data packet in 3935 is sent from the same source to the same recipient by two different FNs.

According to this embodiment, if an FN 2410 receives a multicast data packet in 3935, it will check a MAC back-off Queue for the multicast data packet in 3935. If the multicast data packet in 3935 is present in the queue, it will be removed from the queue and transmission of the packet will not occur, i.e., if FN 2410 receives the packet during the back-off period for the packet transmission, it will suppress the transmission. IP layer (IP forwarding module) must signal to the MAC to perform such suppression.

Figure 41:
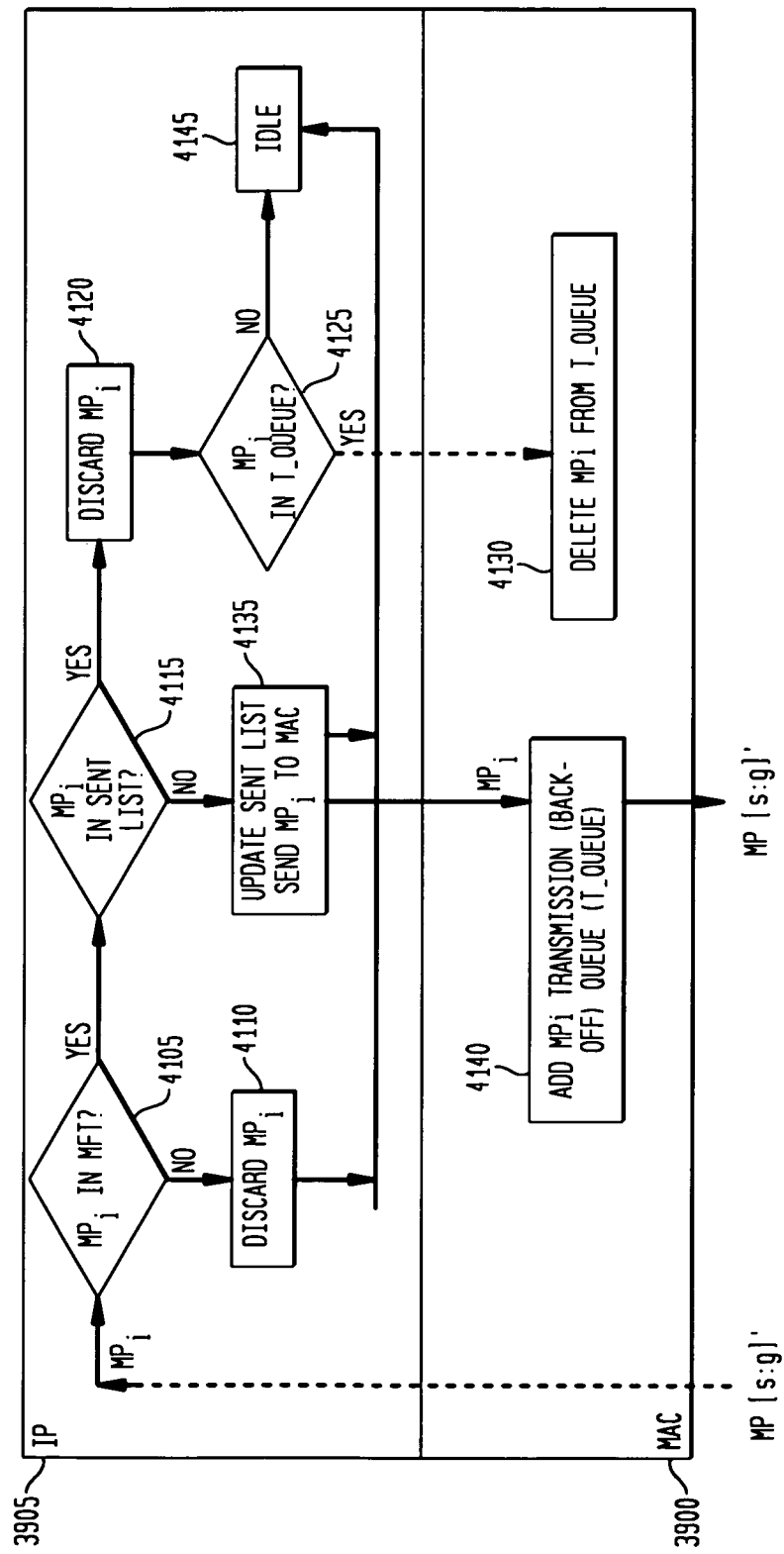
FIG. 41 is a hierarchical network layer flow chart for the process of routing a multicast packet in accordance with another embodiment of the invention.

FIG. 41 illustrates a flow chart for the forwarding process for the FN 2410 in accordance with this embodiment of the invention for a cross layer operation, i.e., MAC layer 3900 and IP layer 3905. Specifically, FIG. 41 illustrates the forwarding steps for the FN 2410, layer by layer.

Initially, the FN 2410 receives the multicast data packet (referenced as MP[s:g] in FIG. 41). The packet MP[s:g] is forwarded to the IP layer 3905 for processing. The IP layer 3905 determines if the multicast group 2400 is in the MFT 3100, at step 4105. The IP layer 3905 will compare the IP address of the multicast group 2400 from the MP[s:g] with the IP addresses stored in the MFT 3100. If the multicast IP address does not match the multicast IP addresses in the MFT 3100, then the IP layer discards the MP[s:g], at step 4110. If the multicast IP address does match the multicast IP addresses in the MFT 3100, then the IP layer 3905 will determine if the MP[s:g] was sent, at step 4115. The IP layer 3905 will then determine if the MP[s:g] has already been sent by comparing the source and id for the received MP[s:g] with the source and ids in the sent list. If there is a match, the IP layer 3905 will discard the MP[s:g], at step 4120 and the IP layer 3905 will determine if MP[s:g] is already in the Transmission back-off queue at MAC layer, at step 4125. If the packet is not in the Transmission back-off queue, then the node will become idle, at step 4140. If there is a match, then the MP[s:g] is in the Transmission back-off queue, the MAC layer will delete the packet from the Transmission back-off queue, at step 4130. If there isn't a match in the sent list, then the MP[s:g] will be added in the sent list and added to the Transmission back-off queue at step 4135 for transmission. MP[s:g] is forwarded at step 4140.

In another embodiment, to improve efficiency for relaying a message and to ensure timely delivery a passive acknowledgement will be added. In the above-described embodiment, there is no acknowledgement from a node that the packet was received. Therefore, there is no guarantee that a leaf node received the packet. Accordingly, there is no indication that the packet should be retransmitted.

According to this embodiment, after transmitting a packet, an FN 2410 waits for the packet to be forwarded a second time by a neighboring FN. When the neighboring FN 2410 forwards the packet, the initial FN 2410 will receive the packet. This received packet is a passive acknowledgement that the neighboring FN received the initial forward. If the acknowledgement is not received with a preset period of time, the initial FN can retransmit the packet.

Figure 42:
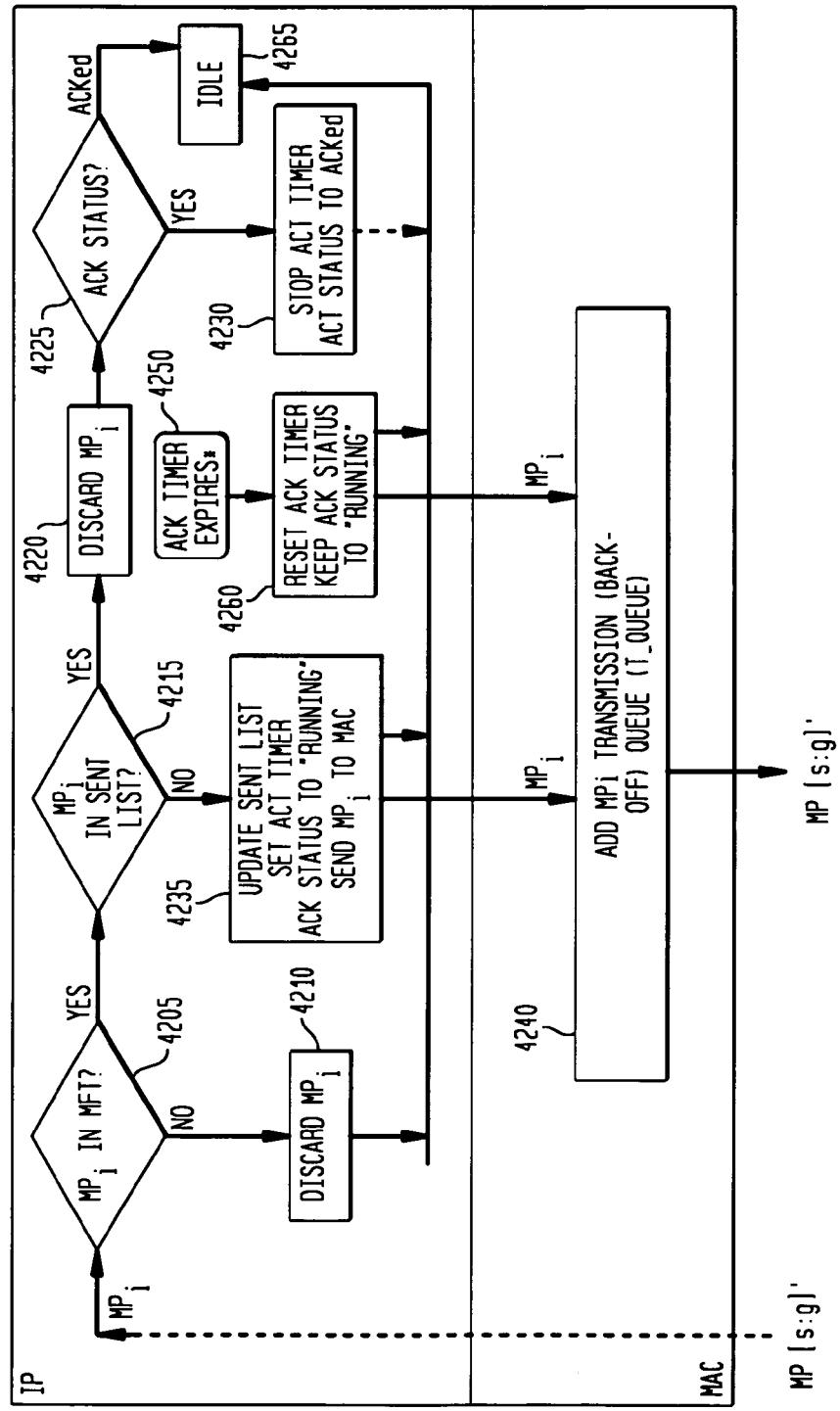
FIG. 42 is a hierarchical network layer flow chart for the process of routing a multicast packet in accordance with yet another embodiment of the invention.

FIG. 42 illustrates a flow chart for the forwarding process, which includes passive acknowledgement, for the FN 2410 in accordance with this embodiment of the invention for a cross layer operation, i.e., MAC layer 3900 and IP layer 3905. Specifically, FIG. 42 illustrates the forwarding steps for the FN 2410 layer by layer.

Steps 4205-4215 are the same as the prior embodiment and, therefore, will not be described in detail again. If, at step 4215, the packet MP was already sent, the new MP will be discarded at step 4220. If, at step 4215, the packet MP was not sent, the node will update the sent list by adding the packet identification to the sent list and adding the destination to the list, at step 4235. Additionally, the node will set an acknowledgement timer and an acknowledgement status parameter to running. Furthermore, at step 4235, the node will send the packet (MP) to the MAC layer 3900 for queuing. Optionally, the node can increment a sent counter that counts the number of times that the packet is sent to a particular group within a predetermined period of time. The packet (MP) is added to the Transmission Back-off Queue, at step 4240.

If the packet was already sent and if the new MP was discarded, the node will then determine the status of the acknowledgement, i.e., if the packet was acknowledged, at step 4225. A packet is acknowledged if a sent packet is received within a predetermined time. If the status is running, i.e., not acknowledged, the node will stop the acknowledgement timer and modify the acknowledgement status to acknowledged, at step 4230. If the status is acknowledged, then the node will become idle at step 4265. Simultaneously, the node will monitor the acknowledgment timer to determine if the timer expires without receiving the acknowledgement. When the acknowledgement timer expires, without an acknowledgement of the packet, the node will resend the packet, at step 4260. Additionally, at step 4260, the node will reset the acknowledgement timer and maintain the acknowledgement status as "running". The packet will be added to the transmission back off queue at step 4240.

In general the moving vehicles 110 can forward packets using either a single channel transmission or multiple channel transmission. For multiple channel transmission, the moving vehicles can use one transmitter with multiple destination receivers or one transceiver. In the former case, a moving vehicle 110 is able to transmit on either one of two channels and to receive through both channels. But it cannot simultaneously transmit on and receive through the same channel. In the later case, a moving vehicle 110 is restricted to transmit on and receive through a particular channel, but the transmitting and receiving channels don't have to be the same.

In the preferred embodiment, the transmission will occur using multiple channels. For multicasting, the FNs and Leaf nodes actively select a channel(s) for transmitting and receiving multicast packets. With a multi-channel system, throughput is increased and delay is reduced. However, a multichannel system requires prior channel coordination among FNs 4210.

In an embodiment of the invention, the FNs 4210 coordinate the multi-channel environment such that multicast forwarding is a Channel-alternate Forwarding. The FNs arranges transmission and reception channels in an alternate pattern so that the transmission and reception channels are always different: If an FN 2410 receives a multicast packet from CHA, it will forward the multicast packet through CHB, vice versa.

Figure 43:
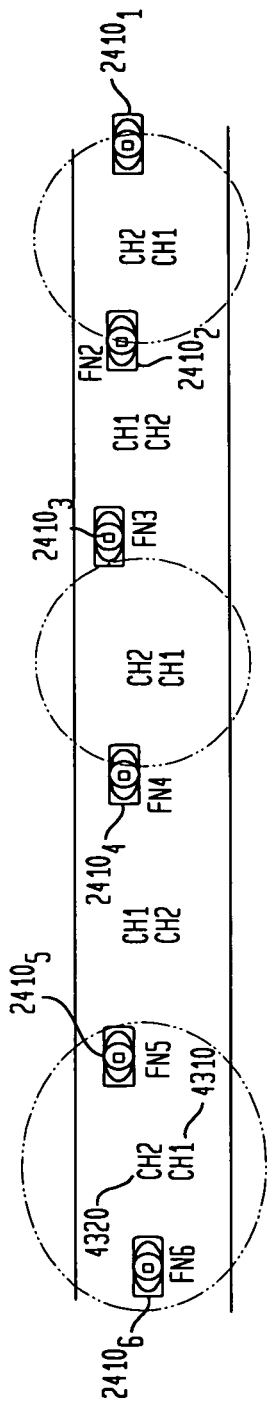
FIG. 43 illustrates a channel assignment scheme in accordance with an embodiment of the invention.

FIG. 43 illustrates an example of the Channel-alternate forwarding assignment according to this embodiment of the invention. As depicted in FIG. 43, there are two channels CH1 and CH2, 4310 and 4320, respectively. There are six FNs, FN1-FN6 ($2410_{1-6}$). The shaded areas between the FNs indicate five radio coverage regions. Each FN, i.e., FN1-FN6 ($2410_{1-6}$) can transmit and receive a packet via CH1 4310 and CH2 4320. However, when a packet is received in CH1 4310, it will be forwarded through CH2. Similarly, when a packet is received in CH2 4320, it will be forwarded through CH1 4310. Therefore, linearly connected FNs 2410 will use the two channels alternately.

If the moving vehicles 115 have a single channel reception device, the alternate arrangement of the transmission and reception channels is achieved through the transmission and reception of heartbeat control packets 1700 and MRs 1800. The heartbeat control packet 1700 will have channel information, i.e., the transmission and reception channels for the GH 1300. The heartbeat control packet 1700 is broadcast and received by all FNs. The closest FNs to the GH 1300, i.e., smallest hop count to GH, will set their channels first based upon the information in the heartbeat control packet 1700. The transmission and reception channels for these FNs will be selected to alternate with the GH's channels. Once the closest FNs have set their channels, the next closest FNs will assign their transmission and reception channels accordingly. This will continue until all of the channels are set for all FNs.

Figure 44:
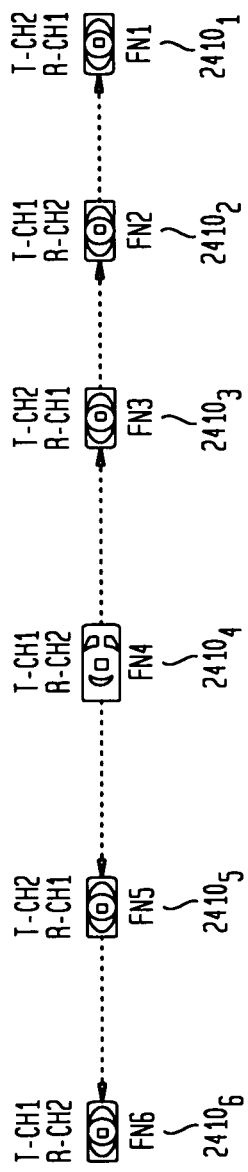
FIG. 44 illustrates an example of channel assignment for the transmission and reception channels in accordance with a channel alternating assignment scheme.

FIG. 44 illustrates an example of the channel assignment for the transmission and reception channels in accordance with this embodiment. FIG. 44 uses the same FNs as depicted in FIG. 43. FN4 $2410_4$ is the GH 1300. The GH 1300 assigns itself Transmission channel 1 T-CH1 and Reception channels 2 (R-CH2). GH/FN4 $2410_4$ broadcasts its heartbeat control packet 1700 with the transmission and reception channel information. FN3 $2410_3$ and FN5 $2410_5$ assign their transmission and reception channels to alternate with the GH/FN4 $2410_4$. FN3 $2410_3$ and FN5 $2410_5$ assign T-CH2 and R-CH1 for their transmission and reception channel, respectively. FN2 $2410_2$ and FN6 $2410_6$ then assign their transmission and reception channels based on the information in the heartbeat control packet and hop count from GH. FN2 $2410_2$ and FN6 $2410_6$ assign T-CH1 and R-CH2. Lastly, FN1 $2410_1$ assigns its transmission and reception channel. FN1 $2410_1$ assigns T-CH2 and R-CH1. If the moving vehicle 110 has a two channel reception device, the above-identified assignment is not required. Every FN 2410 would be able to send on either CH1 or CH2 and receive on both channels.

The channel information of a received multicast packet is provided from a channel access module in the MAC layer 3900. An incoming multicast packet is first marked with the reception channel. This allows for the multicast packet to be identified and forwarded with the transmission channel that is different from the reception channel. If a multicast packet is marked with CH1, the multicast packet will be forwarded through CH2. A leaf node 2405 will synchronize its transmission and reception channels with their FNs 2410 though internal Channel Access Mechanisms.

The single channel alternate forwarding process can result in a hidden terminal problem when packets are simultaneously received on the same channel, i.e., FN3 $2410_3$ receives a packet from both FN4 $2410_4$ and FN2 $2410_2$ on channel 1.

In another embodiment, transmission and reception channels will be assigned in a double channel alternate manner. Double Channel-alternate Forwarding channel assignment has the advantage that hidden terminal conditions are avoided. This method arranges transmission channels in a double-alternate pattern. It creates regions of an exclusive transmission channel and arranges such regions in a double-alternate pattern. An exclusive region with the same transmission channel appears every two-hops. FNs 2410 can receive multicast packets through both Channels. When a multicast packet is received, it will be forwarded through the given transmission channel.

Figure 45:
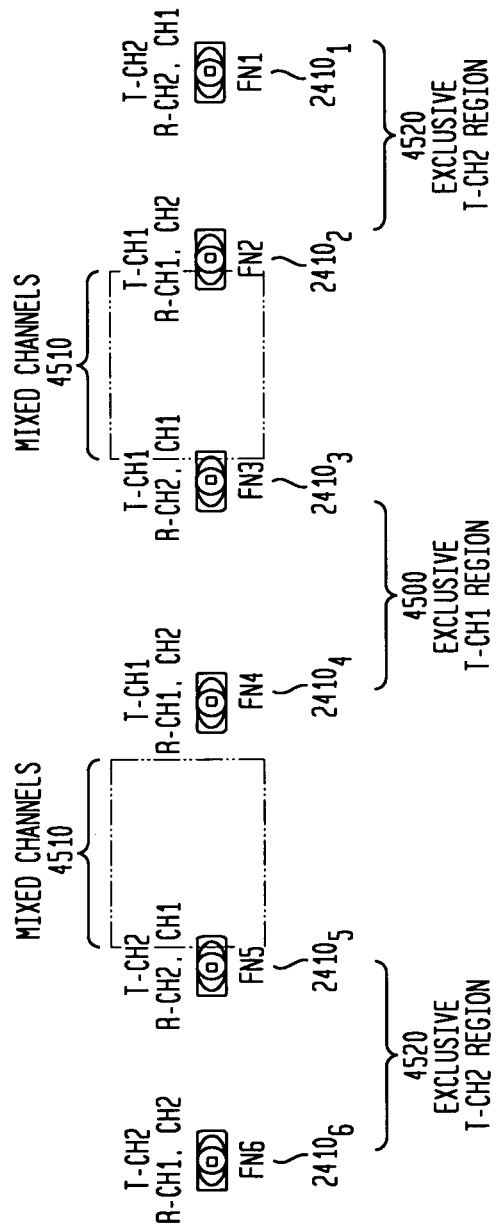
FIG. 45 illustrates an example of channel assignment for the transmission and reception channels in accordance with a double channel alternating assignment scheme.

FIG. 45 illustrates an example of the channel assignment for the transmission and reception channels in accordance with this embodiment for the FN mesh. FIG. 45 uses the same FNs as depicted in FIG. 43, i.e., FN1-FN6 ($2410_{1-6}$). In this example, the channels are assigned such that there is one exclusive transmission channel area for T-CH1 4500. There are two exclusive transmission channel areas for T-CH2 4520. Additionally, there are two mixed channel areas 4510. FN1 $2410_1$ and FN2 $2410_2$ will transmit on T-Ch2; FN3 $2410_3$ and FN4 $2410_4$ will transmit on T-CH1; and FN5 $2410_5$ and FN6 $2410_6$ will transmit on T-CH2. Each FN, i.e., FN1-FN6 ($2410_{1-6}$) can receive on either R-CH1 or R-CH2.

Figure 46:
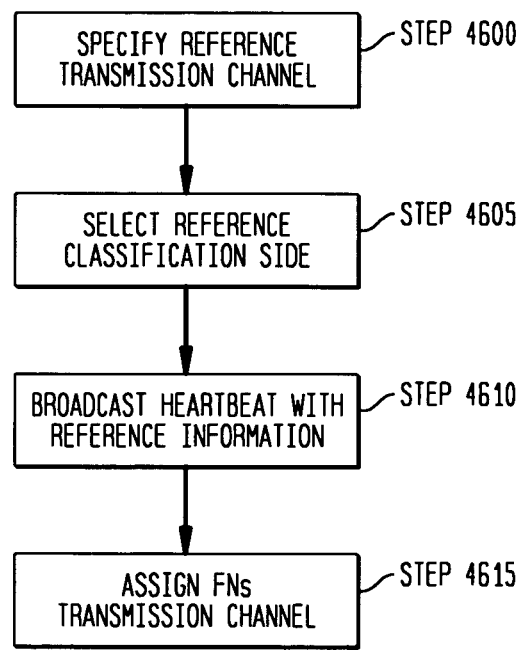
FIG. 46 is a flow chart of the process of assigning the transmission and reception channels in accordance with a double channel alternating assignment scheme.

FIG. 46 illustrates a flow chart for the channel assignment of both the reception and transmission channels in accordance with an embodiment of the invention. At step 4600, the GH 1300 specifies its own transmission channel, i.e., T-CH1. This transmission channel will be used as a reference transmission channel for the remaining FNs 2410 to set their transmission channel. The GH 1300 will then select one classification side (e.g., red or blue), at step 4605. The selected classification site will be used as a reference classification side. The GH 1300 will then broadcast a heartbeat control packet 1700 to all FNs 2410, at step 4610. In this embodiment, the information of the reference transmission channel and classification side will be included in the heartbeat control packet 1700.

At step 4615, all other FNs 2410 will receive the heartbeat control packet 1700 and proactively assign their own transmission channel based upon the information of the reference transmission channel, the classification side and hop distance from the GH. If FNs 2410 are located within the reference side (i.e., the both classifications of the reference classification side and the FNs are the same), then they will determine their transmission channels based on the formula, mod(int [(1+h)/2], 2), where mod (a, b) is the positive reminder in the division of a by b, int[ ] takes a number and chops off any decimal points, and h is the hop distance from the GH. If FNs 2410 are located on the side other than the reference classification side, they will use the formula, mod(int[h/2], 2), to determine their transmission channels. If the output of the formula is 1 (for either cases), the FNs 2410 assign their transmission channels as different from the reference transmission channel, i.e., if the reference transmission channel is T-CH1, then they will set their transmission channels as T-CH2. If the output of the formula is 0, they will set their transmission channels as the reference transmission channel.

Using the hop count to GH information stored in memory and the received information from the heartbeat control packet 1700, the FNs 2410 will assign their transmission channels keeping with the double-alternate pattern assignment.

While multicast routing and unicast routing have been described as separate processes, both of the routing methods can be performed by the same moving vehicles 110. Accordingly, a received packet might not be relevant to one routing method, but will be relevant to another. Therefore, if a control packet was described as being ignored and the node becoming idle for a specific routing process, the packet might not be ignored for the other and the node might not become idle. For example, for unicasting routing, both the heartbeat control packet 1700 and the MR 1800 are used to update the routing table 2300, whereas, depending on the embodiment, for multicast routing, only one of the two control packets might be needed.

Additionally, the unicast and multicast routing processes were mainly described with respect to moving vehicles and moving nodes, however, the unicast and multicast routing processes can be performed by any node, e.g., RSUs 100.

A wireless communication device in a moving vehicle performs the above-described protocols and methods, e.g., unicasting and multicasting. This wireless communication device is similar to the communication device in the RSU 100 as depicted in FIG. 11. The wireless communication device includes a broadcasting means or transmission and reception means, such as a wireless transceiver, for providing wireless communication between nodes in a radio coverage range. Additionally, a controlling means, e.g., microcontroller, microprocessor, etc., is configured for receiving signals from other nodes through the transmission and reception means and transmitting signals to other nodes through the transmission and reception means. The controlling means also provides operational control by executing the above-described protocols as processor-executable instructions. A storage means is disposed within the wireless communication device and in operational communication with the controlling means. The storage means may be memory modules, removable media, a combination of multiple storage devices, etc. and is dimensioned to store the processor-executable instructions necessary for the performance of the protocols of the described embodiments. Further, a timing means is provided either as a separate component or via a function of the controlling means. The timing means provides the time interval tracking necessary for each of the timers referred to in the described embodiments. An energizing means, such as a power supply, is electrically connected to all the components of the wireless communication device for providing operational power to the components as necessary.

The processor-executable instructions for performing the described embodiments may be embedded in the storage means in a form such as an EPROM, Flash memory or other such non-volatile storage. Additionally, the processor-executable instructions may be stored on a computer readable media such as an optical or magnetic medium, or may be downloadable over a network (e.g., Internet). Preferably, the processor-executable instructions can be updated by a user periodically, as necessary, in order to provide additional enhancements to the system as they become available.

Inter-LPG Routing Service Vian RSU

In an embodiment of the invention, the RSU 100 can relay packets between multiple LPGs 115 within its radio coverage. In this embodiment, the RSU 100 is not a part of one specific LPG 115, but rather used as a boundary node by the multiple LPG 115 to propagate information, unicast or multicast, to other LPGs 115 within RSU radio coverage. The GHs 1300, FNs 2410, GN 1500 would forward all inter-LPG packets, unicast or multicast, to the RSU 100. The RSU 100 would then relay the packet to the appropriate LPG 115 or node. Within each LPG 115, each node would communicate with each other using the above-described routing processes. RSUs 100 can be linked to each other to share information. Linked RSUs 100 relay information to nearby RSUs 100 to reach a large number of local LPGs 115. RSUs 100 that are edge nodes to the backbone network can relay inter-LPG 115 packets to a large number of LPGs 115 and to backbone servers that collect such information.

According to this embodiment, the RSU 100 is only an inter-LPG relay node and not a member of the LPG 115. This reduces the organization and role assignment time in LPG 115 to incorporate the RSU 100. Since the RSU is not fully participating in the LPG 115, the initial LPG structure is maintained. Additionally, the selection process of boundary nodes (BN) for a moving vehicle 110 within a LPG 115 within the RSU 100 coverage is eliminated. However, boundary nodes will be needed once outside RSU area. LPGs 115 and individual vehicles discover the RSU in several ways. Vehicles can have apriori knowledge of RSU 100 allowing them to identify the inter-LPG relays in advance. This knowledge is provided by other RSUs 100 (in the linked RSU case) or perhaps by preceding moving vehicles 110. In addition, the RSU locations and information can be pre-configured in the moving vehicles 110, or the RSU 100 can be dynamically discovered via beacons from the RSU 100 designating it as an inter-LPG relay node.

The RSU 100 can track LPGs 115 in its area by listening for heartbeat control packets 1700 from the GHs 1300. The moving vehicles 115 or nodes send heartbeat control packets 1700 over both V-R and V-V channels. The V-V channel is used exclusively for intra-LPG related traffic, while the V-R channel is used for the inter-LPG traffic.

Other RSU Services

The RSU 100 can be used for a plurality of network services and vehicle services. For example, the RSU 100 can provide authentication assistance for nodes, network information collection such as locations and IP addresses of RSUs, configuration assistance for LPG 115 and RSU 100 connections and mobile node roaming assistance. Additionally, the RSU 100 can be used for vehicle safety alerts, RSU-based positioning, vehicle maintenance information, toll collection and location information regarding goods and services within the area. Some of the above-identified services can function without a backbone, however, other services need backbone connectivity.

Figure 47:
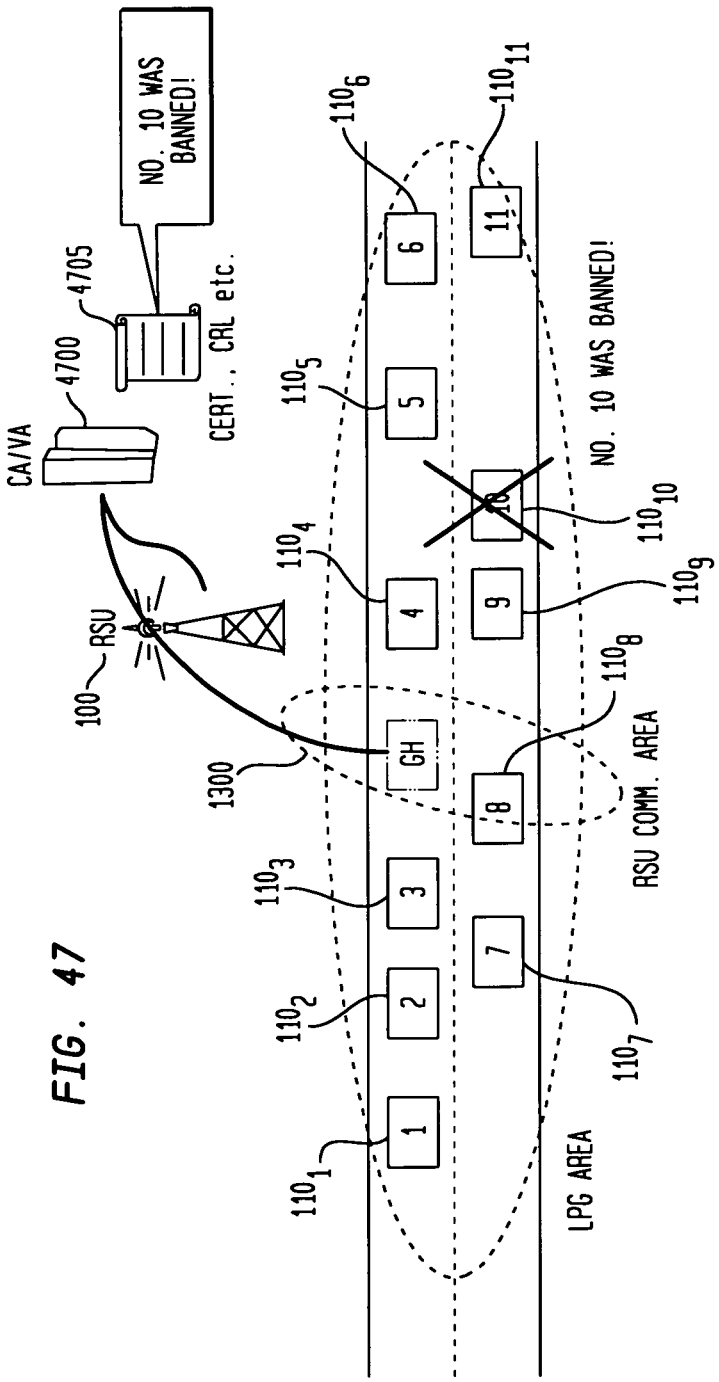
FIG. 47 illustrates an example of a roadside unit providing authentication services in accordance with an embodiment of the invention.

In one embodiment the RSU 100 supports and network authentication for moving vehicles 110. FIG. 47 illustrates an example of the RSU 100 supporting the authentication process. A remote certification/validation authority (CA/VA) 4700 maintains a list of certified and authorized nodes 4705 and provides authentication services. Typically, each node entering network individually authenticates itself through the CA/VA 4700. However, in a highly mobile environment, the authentication must be performed in a short period of time, because a moving vehicle is only within range of the CA/VA 4700 for a short connection period, i.e., while the node is within radio coverage of the CA/VA 4700 or another standard stationary node. According to this embodiment of the invention, the RSU 100 helps the CA/VA 4700 by off-loading the authentication information to the GH 1300 while the GH 1300 is in communication with the RSU 100, i.e., within the radio coverage area for the RSU 100. In FIG. 47, a dashed line indicates the radio coverage area for the RSU 100. After the list is off-loaded to the GH 1300, the GH 1300 will act like the CA/VA 4700. The GH 1300 will authenticate the other nodes using the heartbeat control packet 1700 and MR 1800. Therefore, the authenticate process can still occur when the LPG 115 is not within the radio coverage for the RSU 100. In this embodiment, the heartbeat control packet 1700 and the MR 1800 will be modified to include parameters for the authentication process. However, there is no need for any other modifications or overhead for the authentication process. The GH 1300 can collectively authenticate the members of the LPG 115. As depicted, the GH 1300 authenticated moving vehicles 110₁-100₉ and 110₁₁, but denied 110₁₀, i.e., the moving vehicle 110₁₀ was banned. If a GN 1500 cannot use GH 1300 to authenticate, the GN 1500 can use the RSU 100 directly to complete authentication with the CA/VA 4700. This redundancy mechanism allows for cases when the GH 1300 moves out of range of the LPG 115 or RSU 100 before list offload or authentication handshake is completed.

In another embodiment, the RSU 100 can be used to assist in the network configuration process and LPG 115 formation. Specifically, since the RSUs 100 are aware of other RSUs 100 within the network and all LPGs 115 within its radio coverage, the RSU 100 can pre-configure moving vehicles 110 for upcoming RSUs 100 or assist LPG 115 formation. The network configuration parameters can includes timeslot assignment, channel assignment, IP address for upcoming, i.e., downstream RSUs 100, and ESSID.

The RSU 100 can also help assign the V-V channels for the LPGs 115, and assist a moving vehicle 110 in finding a LPG 115 to join. Additionally, the RSU 100 can assist in a merging and splitting of LPGs 115.

Figure 48:
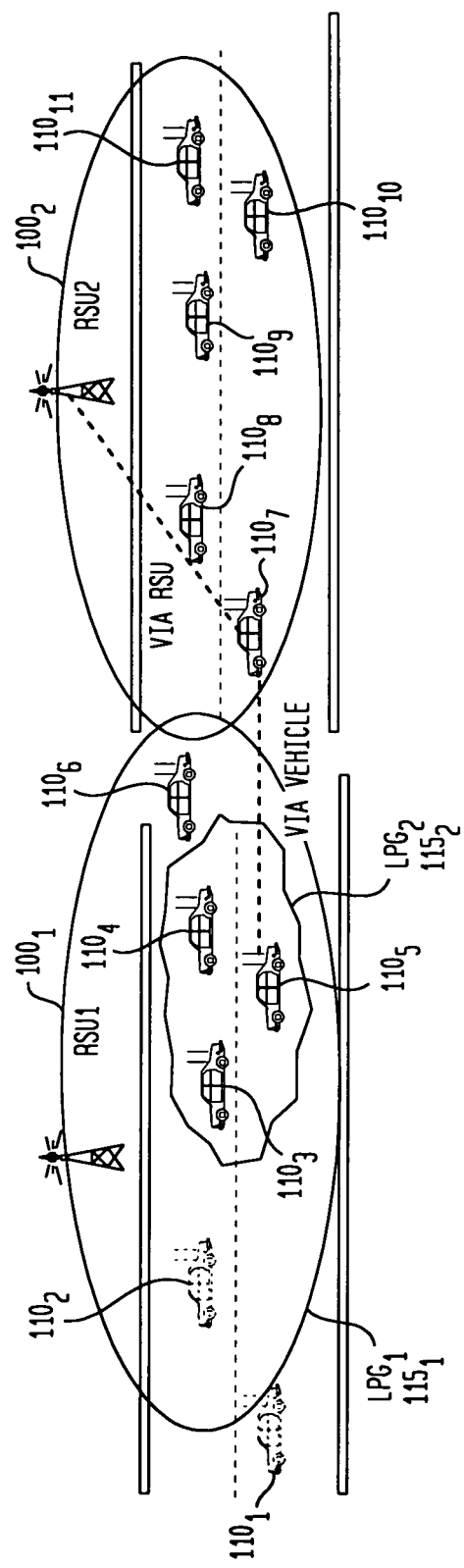
FIG. 48 illustrates an example of a roadside unit providing network configuration assistance in accordance with an embodiment of the invention.

FIG. 48 illustrates an example of multiple RSUs 100 assisting in the LPG maintenance, formation and providing network configuration assistance.

RSU2 100₂ is capable of pre-configuring moving vehicles 110₇-110₁₁ for the network settings for RSU1 100₁. This helps reduce connection delay time, giving nodes a more effective communication time once it enters the radio coverage area for RSU1 100₁. The shaded areas indicate the radio coverage area for the RSUs 100. For example, RSU2 100₂ broadcasts the pre-configuring settings to moving vehicle 110₇. This information can be relayed to other moving vehicles 110 within the LPG 115 or received from the RSU 100 directly. Using the RSU 100 pre-configuration assistance, the nodes can maintain a virtual connection with the entire network as it moves through various RSU areas. RSU2 100₂ would need to be aware of the direction that the moving vehicles were traveling so it can determine the appropriate downstream RSU 100, i.e., RSU1 100₁ in FIG. 48. While FIG. 48 depicts a network without a backbone 200, the network can include a backbone that includes a database of all RSU 100 configuration parameters.

Additionally, the RSU 100 can select V-V channels for intra-LPG communication to avoid channel interference The RSUs 100 will use the V-R channel to inform the LPGs 115 which channel is available for use. The RSU 100 will transmit the channel assignment to the GH 1300 for relaying to the members. For example, LPG1 115₁ can be assigned Channel A by RSU1 100₁ by broadcasting this information to moving vehicle 110₂. Similarly, LPG2 115₂ can be assigned Channel B by RSU1 100₁ by broadcasting this information to moving vehicle 110₅. Moving vehicles 110₁ and 110₅ will relay the message for the other vehicles within each respective LPGs 115.

If the RSU detects a conflict due to the mobility of the LPGs 115, the RSU 100 can send an updated channel assignment to the LPGs 115. This will prevent interference, help both formed LPGs 115 and newly created LPGs 115. For newly created LPGs 115, the RSU 100 will assign an available channel to the newly created LPG 115.

Additionally, the RSU 100 can assist a moving vehicle 110 to find a LPG 115. The RSU 100 can broadcast information regarding LPGs 115, such as LPG identifications, channel assignments, and number of members using the V-R channel. For example, RSU1 100₁ can broadcast this information to moving vehicle 110₆ for LPG1 115₁ and LPG2 115₂. In this embodiment, new members can join a LPG 115 before hearing a heartbeat control packet 1700. If the RSU 100 is isolated, the RSU 100 can only assist local LPGs 115 in formation, i.e., vehicles and LPGs 115 within radio coverage area per the RSU 100. However, if the RSUs 100 are linked, new moving vehicles 110 moving from one RSU 100 to another can be pre-configured to join another LPG via the RSU 100.

RSU 100 can control merging of two LPGs 115. RSU 100 will broadcast a control packet to one of the GHs requiring the GH 1300 to stop broadcasting the heartbeat control packet 1700 and invoke the other GH to expand the scope (Hop counts) of the heartbeat control packet 1700 so that the moving vehicles 110 in the other LPG 115 can hear the range-expanded heartbeat control packet 1700 and join the LPG 115. Similarly, the RSU 100 can control splitting of one LPG 115.

In another embodiment, the RSU 100 can serve as a temporary message repository and information collection device. All passing moving vehicles 110 can deposit information to the RSU 100 for pick-up by other moving vehicles 110. The RSU 100 will collect and aggregate information for its local area. Additionally, if linked to other RSUs 100 the RSUs 100 can share the locally collected information. Furthermore, if connected to a backbone 200, then the information can be relayed to the backbone 200 for storage.

The collected information can range from traffic information, accident alerts, weather information and road conditions. This information can be broadcast to passing moving vehicles 110 without a request. Alternatively, the moving vehicles 110 can actively request this information. If the RSUs 100 are isolated, the moving vehicles need to upload the same information to each RSU 100 that the moving vehicle 110 encounters. The information can also include information regarding other RSUs 100 that the moving vehicle 110 encounters to build a database of RSUs 100, i.e., learn about other RSUs via passing moving vehicles 110.

Figure 49:
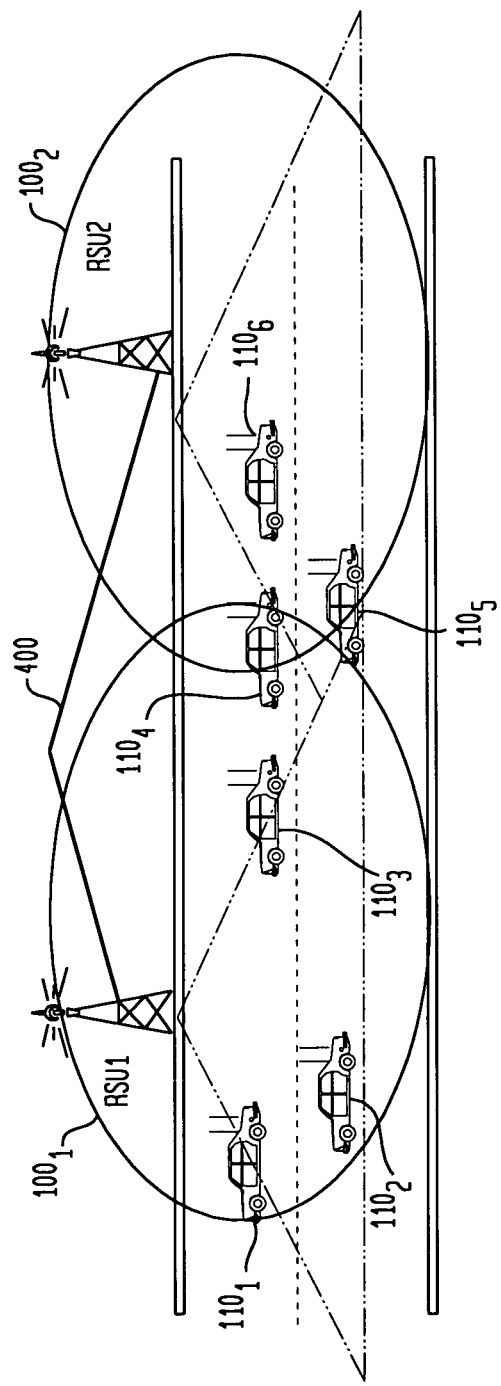
FIG. 49 illustrates an example of a roadside unit used as an information collection device.

FIG. 49 illustrates an example of the information collection process with two linked RSUs. (RSU $100_1$ and RSU2 $100_2$). RSU1 $100_1$ and RSU2 $100_2$ are linked by connection 400. This connection 400 can be a wired connection or wireless. Both RSU1 $100_1$ and RSU2 $100_2$ broadcast the collected information on the V-R channel. In this embodiment, the RSU 100 is not a node of the LPG 115. Individual nodes can deposit and receive the information using the LPG routing process described above or directly broadcast the information of the V-R channel. The moving vehicles 110 will discover the RSU 100 by a beacon as a depositing point. Alternatively, the moving vehicles can discover other RSUs via an upstream RSU. As depicted in FIG. 49, moving vehicles $110_5$ and $110_6$ can discover RSU1 $100_1$ from RSU2 $100_2$. RSU1 $100_1$ is the deposit point for moving vehicles $110_1$-$110_4$ and RSU2 $100_2$ is the deposit point for moving vehicles $110_4$-$110_6$. Moving vehicle $110_4$ can deposit information to both RSU1 $100_1$ and RSU2 $100_2$. Since RSU1 $100_1$ and RSU2 $100_2$ are linked, all of the deposited information can be received by all of the moving vehicles $110_1$-$110_6$.

Figure 50:
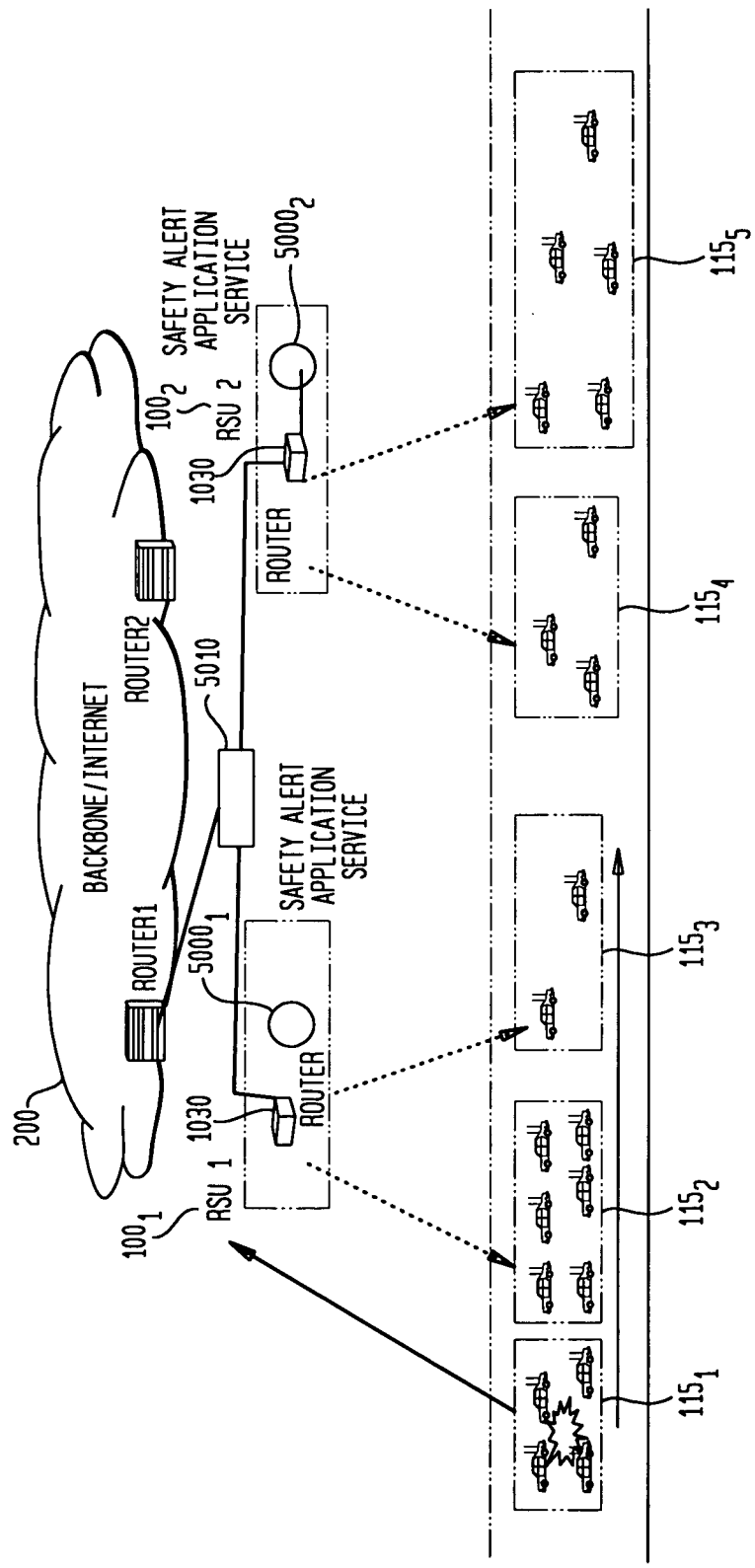
FIG. 50 illustrates an example of a roadside unit providing safety alert routing in accordance with an embodiment of the invention.

In another embodiment, the RSU 100 can be used to relay safety information to multiple LPGs 115. FIG. 50 illustrates an example of the network configuration and forwarding process for routing the safety information for two RSUs: RSU1 $100_1$ and RSU2 $100_2$. Each RSU 100 includes a router 1030 and a Safety Alert Application Service 5000. The safety alert message is handled by Safety Alert Application Service 5000. The Safety Alert Application Service 5000 processes the message according to the type of message and the content in the message. It determines whether to route the message or stop routing the message.

In the preferred embodiment for routing the safety message, the network includes a backbone 200. The backbone 200 includes a router for each RSU 100. Between the backbone 200 and the RSUs 100 is an RSU hub 5010 that directs the information accordingly.

FIG. 50 depicts five LPGs, $115_{1-5}$, each having at least one moving vehicle 110. FIG. 50 depicts an accident in LPG1 $115_1$. The safety alert message is forwarded within LPG1 $115_1$ via intra-LPG routing according to one of the routing process described above. The message is also routed between the LPGs 115 via inter-LPG routing procedures. Furthermore, the message is routed between the LPGs 115 using the RSU 100 and Safety Alert Application Services 5000. For example, one node within LPG1 $115_1$ broadcasts the safety message to RSU1 $100_1$. RSU1 $100_1$ processes the message using Safety Alert Application Services $5000_1$ to determine if the message should be forwarded. RSU1 $100_1$ can forward the message to LPG2 $115_2$ and LPG3 $115_3$, if necessary. Additionally, RSU1 $100_1$ sends the safety message to the backbone 200. The message is then routed to RSU2 $100_2$ via an RSU hub 5010. RSU2 $100_2$ processes the safety message using the Safety Alert Application Service $5000_2$ to determine if the message should be forwarded. RSU2 $100_2$ can forward the message to LPG4 $115_4$ and LPG5 $115_5$. As depicted, both RSUs, RSU1 $100_1$ and RSU2 $100_2$, determine that the safety message should be relayed to the remaining LPGs $115_{1-5}$. The dashed lines represent the relaying of the safety message.

Figure 51:
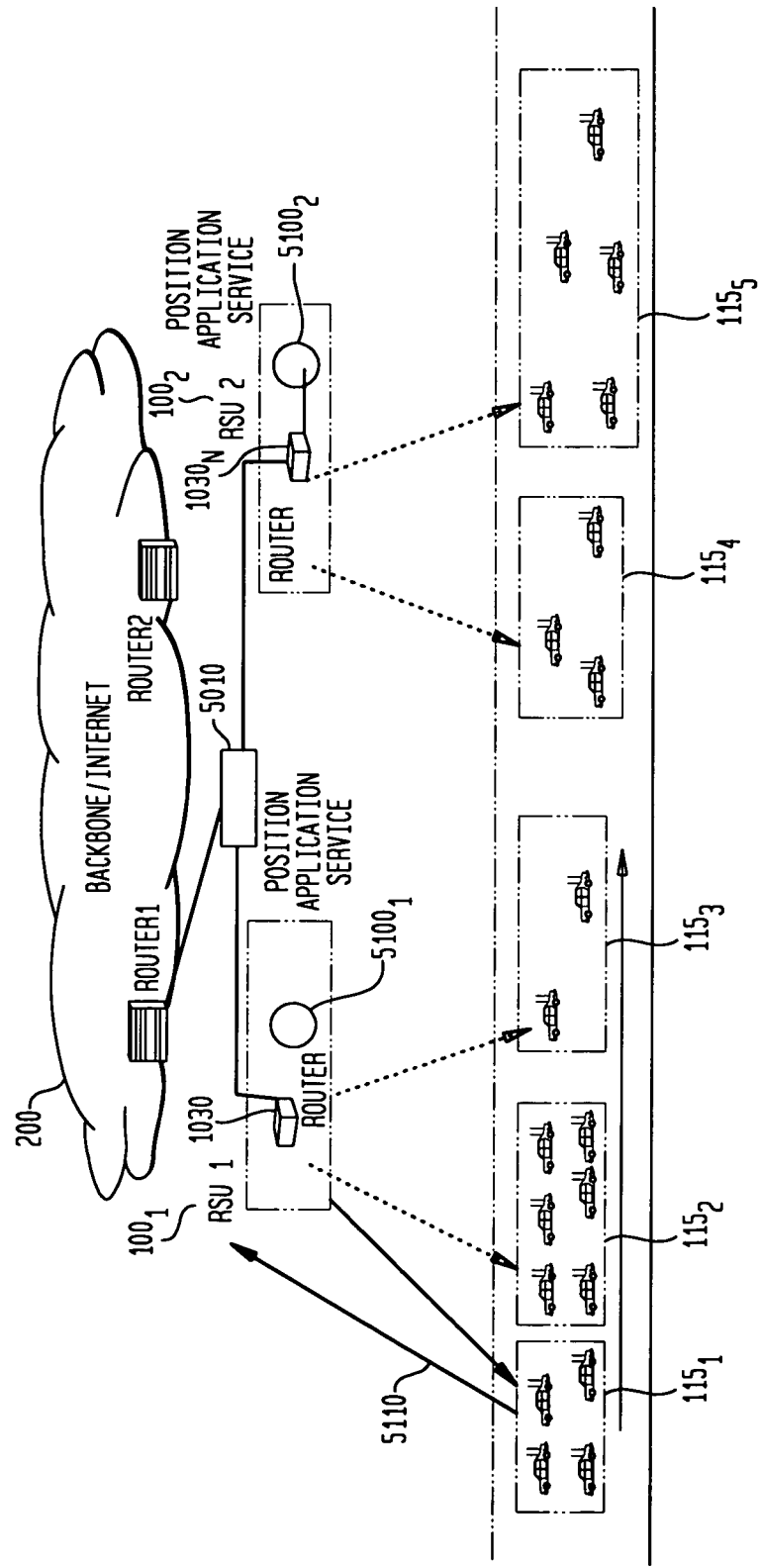
FIG. 51 illustrates an example of a roadside unit performing position and tracking functionality in accordance with an embodiment of the invention.

In another embodiment, the RSU 100 can be used to track the position of a moving vehicle 110 without the use of a GPS system. FIG. 51 illustrates an example of the network configuration for determining the position of moving vehicles 115 for two RSUs, RSU1 $100_1$ and RSU2 1002. The network configuration for this embodiment is substantially similar to the prior embodiment, as depicted in FIG. 50, except that instead of the Safety Alert Application Service 5000 in each RSU 100 a Position Application Service 5100 is included.

The Position Application Service 5100 periodically broadcasts its position 5110, i.e., position of the RSU 100, each moving vehicle 110 reports its presence to the Position Application Service 5100 in the RSU 100. The moving vehicle 110 sends the report via an MR 1800 directly to the RSU 100 via the V-R channel. Alternatively, each moving vehicle 110 can send the MR 1800 to the GH and the GH sends aggregate messages to the RSU 100. This will save bandwidth. Any moving vehicle 110 within radio coverage of the RSU1 $100_1$ is in Area 1, whereas any moving vehicle 110 within the radio coverage of RSU2 $100_2$ is in Area 2.

The position information is disseminated by the Position Application Service 5100 to all nodes. The position information is stored in the backbone 200 for use by other RSUs 100s. FIG. 51 depicts one beacon 5110 directed to LPG1 $115_1$ for illustration, however, the beacon 5110 is broadcast to all LPGs 115 and moving vehicles 110.

According to this embodiment, a moving vehicle's relative position can be tracked, i.e., area 1 verses area 2. For a more accurate position measurement, remote APs 330 are used for position tracking. The APs 330 will send out the position beacon 5110. The moving vehicles 110 within its coverage will respond with an MR 1800. The relative location information will be forwarded to the RSU 100 and position application service 5100. The relative location can be determined within a smaller area, i.e., area 1, sub A. Additionally, the frequency of the beacons 5110 and MR 1800 can be increased for a more accurate position tracking. The dashed lines from the routers 1030 represent the position information being forwarded to other LPGs $115_{2-5}$.

This feature is particularly useful for tracking cargo. Additionally, the features can be used to track mobile nodes to support one-to-one communication. For example, if a node moves out of a LPG 115, the LPG 115 does not have any information regarding the node. A node in the middle of communication will be disconnected. Therefore, this feature allows the node to maintain connection as a node moves out of the LPG 115. The RSU 100 will serve as a foreign agent. In this case, the RSU 100 sends the location information to server in the backbone 200 which stores this information for use in forwarding traffic to a mobile node.

Figure 52:
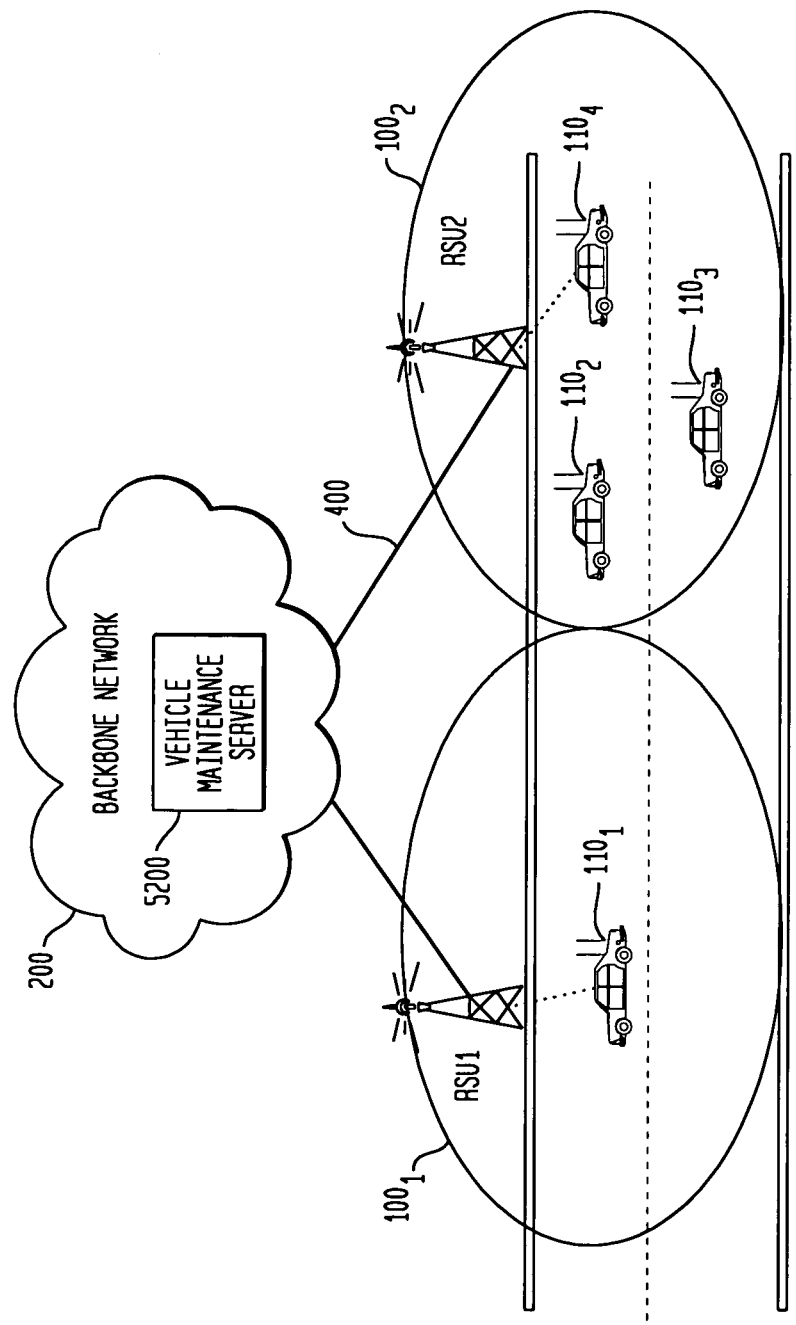
FIG. 52 illustrates an example of a roadside unit acting as a vehicle maintenance server and database in accordance with an embodiment of the invention.

In another embodiment, the RSU 100 can be used for moving vehicle maintenance services. FIG. 52 illustrates an example of two RSUs 100 used in maintenance services. In this configuration, a Vehicle Maintenance Server 5200 is installed in the backbone 200. Both RSU1 100$_1$ and RSU2 100$_2$ are linked and can communicate with the backbone 200. Moving vehicle 110$_1$ is in radio range of RSU1 100$_1$ and moving vehicles 110$_{2-4}$ are in radio range of RSU2 100$_2$. According to this embodiment, the RSUs 100 can receive diagnostic information from the moving vehicles 110 and provide emergency maintenance information. The diagnostic information will be sent to the vehicle maintenance server 5200 for storage. The RSU 100 will then provide information such as location of gas stations, hospitals, tire repair shops, oil stations, etc. This information will be based upon the relative position of the moving vehicle 110 determined based upon the above-identified process or the location of the RSU 100. For example, if moving vehicle 110$_1$ runs out of gas, the moving vehicle 110$_1$ can request information from the RSU 100 regarding the location of the nearest gas station. RSU1 100$_1$ will determine the nearest gas station and broadcast the information to moving vehicle 110$_1$. Similarly, if moving vehicle 110$_2$ gets a flat tire, the moving vehicle 110$_2$ can request information from the RSU2 100$_2$ regarding the location of the nearest gas station. RSU2 100$_2$ will determine the nearest tire replacement store and broadcast the information to moving vehicle 110$_2$.

Additionally, if moving vehicle 110$_3$ has a check engine signal indicator, the moving vehicle 110$_2$ can request information from the RSU2 100$_2$ regarding the location of the nearest gas station. RSU2 100$_2$ will determine the nearest gas station and broadcast the information to moving vehicle 110$_3$. The RSU 100 will also send a report to the vehicle maintenance server 5200 indicating the emergency event from moving vehicle 110$_3$ for storage.

The RSU 100 can also track recall information regarding the moving vehicles 110 in the vehicle maintenance server 5200 as well as service reminders. The service reminders can include oil changes, fluid replacements, tire rotations, and inspections. Each time a service is needed, the RSU 100 using the information from vehicle maintenance server 5200 can affirmatively send a reminder to the moving vehicle 110 indicating the need for a service and the type of service.

Figure 53:
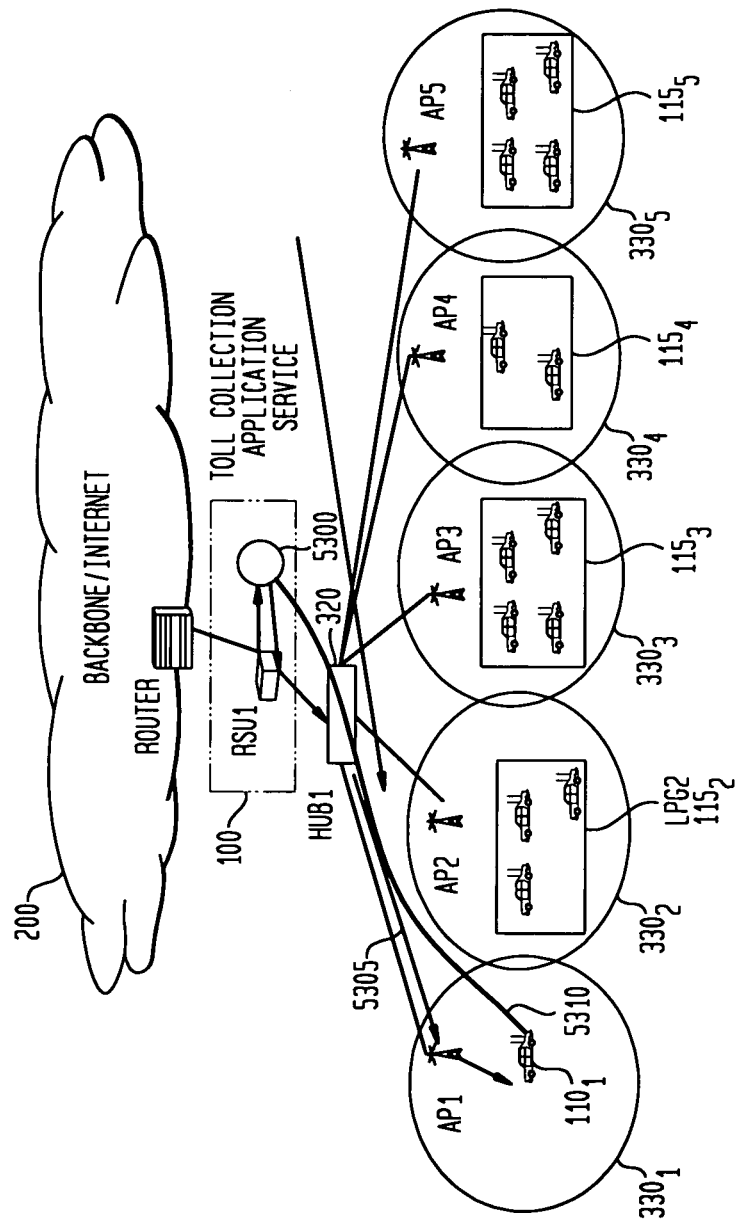
FIG. 53 illustrates an example of a roadside unit acting as a toll collection device in accordance with an embodiment of the invention.

In another embodiment of the invention, the RSU 100 can be used to facilitate and collect tolls. FIG. 53 illustrates an example of an RSU 100 configuration for the collection of a toll. The toll collection system includes a backbone 200, the RSU 100 and APs 330. As depicted, the system has five APs 330$_{1-5}$. The RSU1 100$_1$ is connected to the APs 330$_{1-5}$ via a hub 320. RSU1 100$_1$ includes a router and a toll collection application service 5300. One of the APs 330, e.g., AP1 330$_1$ is equipped with a toll scanning device. A moving vehicle entering the toll scanning region receives an initial toll collection signal 5305 from RSU1 100$_1$ via the toll collection application service 5300 relayed through AP1 330$_1$ to initiate the toll collection process. Upon receipt of the signal, the moving vehicle 110 invokes a toll paying transmission by relaying with its information such as a vehicle identification and credit card number 5310. In another embodiment, the credit card number is previously associated with the vehicle such that the credit card number is not needed. The toll collection application service 5300 completes the transaction. According to these embodiments, the moving vehicle 110 does not have to stop or slow down to pay a toll.

For example, moving vehicle 110$_1$ enters the radio coverage range of AP1 330$_1$, the toll scanning device detects the moving vehicle 110$_1$ and relays the detection to RSU1 100$_1$.

The toll collection application service 5300 sends a toll collection packet to the moving vehicle 110$_1$ through AP1 330$_1$. The moving vehicle 110$_1$ sends a response, including identification information to the RSU1 100$_1$, which forwarded the response to the toll collection application service 5300. The toll collection application service 5300 completes the transaction and stores the transaction in the backbone 200. The toll scanning device can be located in any of the APs 330.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for routing a multicast message in an ad-hoc wireless network comprising the steps of:

receiving the multicast message for forwarding;

determining if a multicast group destination for the multicast message is in a multicast forwarding table;

determining if the multicast message has been previously forwarded;

forwarding the multicast message if it is determined that the multicast message was not previously forwarded and if it is determined that the multicast group destination is in the multicast forwarding table;

adding the multicast message to a sent list after the multicast message is sent;

storing the sent multicast message in memory for a predetermined time;

detecting if the sent multicast message is received from a neighboring forwarding node within the predetermined time;

repeating the forwarding of the multicast message if the sent multicast message is not detected within the predetermined time, wherein the multicast message is discarded from memory if the sent multicast message is detected within the predetermined time;

counting a number of times that the forwarding step is repeated;

comparing the counted number of times with a preset threshold value; and discarding the multicast message if the counted number of times is greater than the preset threshold;

wherein transmission and reception channels are selected to alternate in a double alternate pattern.

2. The method for routing a multicast message according to claim 1, wherein the method for setting the double alternate pattern including the steps of:

(a) specifying a reference transmission channel;

(b) selecting a reference classification side;

(c) broadcasting a heartbeat control packet including the reference transmission channel and the reference classification side; and (d) assigning transmission channels based upon said reference classification side and reference transmission channel.

3. The method for routing a multicast message according to claim 2, wherein step (d) includes the sub-steps of:

determining a classification side for a forwarding node;

determining its hop distance from the group header;

assigning the transmission channels based upon a comparison of the classification side with the reference classification side and the hop distance from the group header.

* * * * *

UNITED STATES PATENT AND TRADEMARK OFFICE
CERTIFICATE OF CORRECTION

PATENT NO. : 8,520,673 B2
APPLICATION NO. : 11/585047
DATED : August 27, 2013
INVENTOR(S) : Chen et al.

It is certified that error appears in the above-identified patent and that said Letters Patent is hereby corrected as shown below:

In the Drawings

In Fig. 24, Sheet 24 of 50, delete "2405" and insert -- $2405_1$ --, therefor.

In the Specification

In Column 11, Line 59, delete "moving vehicle 100" and insert -- moving vehicle 110 --, therefor.

In Column 12, Line 46, delete "100," and insert -- $100_1$ --, therefor.

In Column 16, Line 18, delete "moving vehicle 100" and insert -- moving vehicle 110 --, therefor.

In Column 17, Line 8, delete "GH 1500." and insert -- GH 1300. --, therefor.

In Column 18, Line 46, delete "RSUs 110" and insert -- RSUs 100 --, therefor.

In Column 18, Line 53, delete "RSU1 $100_2$" and insert -- RSU2 $100_2$ --, therefor.

In Column 18, Line 61, delete "$115_2$)" and insert -- LPG2 $115_2$) --, therefor.

In Column 19, Line 21, delete "LPG1 $100_1$." and insert -- LPG1 $115_1$. --, therefor.

In Column 19, Line 37, delete "RSUs 110" and insert -- RSUs 100 --, therefor.

In Column 21, Line 7, delete "D for" and insert -- ID for --, therefor.

In Column 23, Line 22, delete "HC 1700" and insert -- HC 1730 --, therefor.

Signed and Sealed this
Twenty-first Day of July, 2015

Michelle K. Lee
*Director of the United States Patent and Trademark Office*

CERTIFICATE OF CORRECTION (continued)
U.S. Pat. No. 8,520,673 B2

In Column 23, Line 23, delete "HC 1700," and insert -- HC 1730, --, therefor.

In Column 23, Line 23, delete "HC 1700" and insert -- HC 1730 --, therefor.

In Column 23, Line 24, delete "HC 1700," and insert -- HC 1730, --, therefor.

In Column 25, Line 7, delete "M 1800," and insert -- MR 1800, --, therefor.

In Column 31, Line 12, delete "packets" and insert -- packets. --, therefor.

In Column 33, Line 20, delete "M was" and insert -- MR was --, therefor.

In Column 33, Line 23, delete "the M" and insert -- the MR --, therefor.

In Column 35, Lines 22-23, delete "MAC layer." and insert -- MAC layer --, therefor.

In Column 42, Line 34, delete "interference" and insert -- interference. --, therefor.

In Column 43, Line 27, delete "RSUs. (RSU $100_1$" and insert -- RSUs (RSU1 $100_1$ --, therefor.

In Column 44, Line 4, delete "RSU $100_1$" and insert -- RSU1 $100_1$ --, therefor.

In Column 44, Line 56, delete "LPGs $115_{2-5}$" and insert -- LPGs $115_{2-5}$. --, therefor.

In the Claims

In Column 46, Line 63, in Claim 3, delete "header;" and insert -- header; and --, therefor.